(12) United States Patent
Davis et al.

(10) Patent No.: US 12,118,501 B2
(45) Date of Patent: *Oct. 15, 2024

(54) SHIPPING PACKAGE TRACKING OR MONITORING SYSTEM AND METHOD

(71) Applicant: PACKAGE, INC., San Francisco, CA (US)

(72) Inventors: Bryan Jonathan Davis, San Francisco, CA (US); Ronald Eugene Fisher, San Francisco, CA (US); James Mark Fisher, Walnut Creek, CA (US); David Fraser, Ottawa (CA); Andrew David Cater, Julian, CA (US); Mark Joseph Meyer, Commerce Township, MI (US)

(73) Assignee: PACKAGE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/080,733

(22) Filed: Dec. 13, 2022

(65) Prior Publication Data

US 2023/0110148 A1  Apr. 13, 2023

Related U.S. Application Data

(63) Continuation of application No. 16/536,108, filed on Aug. 8, 2019, now Pat. No. 11,568,353.
(Continued)

(51) Int. Cl.
*G06Q 10/0833* (2023.01)
*G06K 19/07* (2006.01)
*G06Q 10/08* (2023.01)

(52) U.S. Cl.
CPC ..... *G06Q 10/0833* (2013.01); *G06K 19/0723* (2013.01); *G06Q 10/08* (2013.01); *B65D 2203/10* (2013.01); *B65D 2401/00* (2020.05)

(58) Field of Classification Search
CPC ... G06Q 10/833; G06Q 50/28; G06K 19/0723
(Continued)

(56) References Cited

U.S. PATENT DOCUMENTS 6,975,941 B1   12/2005  Lau et al.
7,212,829 B1   5/2007   Lau et al.
(Continued)

FOREIGN PATENT DOCUMENTS

CN   101609138 A   12/2009
CN   101855932 A   10/2010
(Continued)

OTHER PUBLICATIONS

European Search Report dated Apr. 29, 2022, on a European Patent No. EP19848240.8 in the name of TrakingPaking Inc.
(Continued)

*Primary Examiner* — Ahshik Kim
(74) *Attorney, Agent, or Firm* — Franklin & Associates International Inc; Matthew F. Lambrinos

(57) ABSTRACT

A shipping package (1) comprises an enclosure for receiving content within, a closure (14) for sealing the enclosure, a label comprising shipping information, a network module (380), a sensor module (382), and a battery module (384). The battery module provides power to the network module and the sensor module. The sensor module (382) providing location information to the network module, the network module transmits a shipping status message to an external device.

18 Claims, 29 Drawing Sheets

Related U.S. Application Data

(60) Provisional application No. 62/716,279, filed on Aug. 8, 2018.

(58) Field of Classification Search
USPC .......................................................... 705/333
See application file for complete search history.

(56) References Cited

U.S. PATENT DOCUMENTS

| | | |
|---|---|---|
| 7,218,938 B1 | 5/2007 | Lau et al. |
| 7,321,774 B1 | 1/2008 | Lau et al. |
| 7,339,469 B2 | 3/2008 | Braun |
| 7,366,522 B2 | 4/2008 | Thomas |
| 7,403,972 B1 | 7/2008 | Lau et al. |
| 7,711,654 B2 | 5/2010 | Schmidtberg et al. |
| 7,809,377 B1 | 10/2010 | Lau et al. |
| 7,905,832 B1 | 3/2011 | Lau et al. |
| 7,953,809 B2 | 5/2011 | Lau et al. |
| 8,078,139 B2 | 12/2011 | Twitchell, Jr. |
| 8,126,675 B2 | 2/2012 | Vock et al. |
| 8,176,135 B2 | 5/2012 | Lau et al. |
| 8,285,484 B1 | 10/2012 | Lau et al. |
| 8,301,158 B1 | 10/2012 | Thomas |
| 8,447,822 B2 | 5/2013 | Lau et al. |
| 8,611,920 B2 | 12/2013 | Lau et al. |
| 8,620,343 B1 | 12/2013 | Lau et al. |
| 8,665,083 B2 | 3/2014 | Easley et al. |
| 8,700,050 B1 | 4/2014 | Thomas |
| 8,725,165 B2 | 5/2014 | Lau et al. |
| 8,753,273 B1 | 6/2014 | Lau et al. |
| 8,868,103 B2 | 10/2014 | Thomas |
| 8,886,220 B2 | 11/2014 | Lau et al. |
| 9,074,903 B1 | 7/2015 | Lau et al. |
| 9,219,988 B2 | 12/2015 | Lau et al. |
| 9,607,462 B2 | 3/2017 | Blemel et al. |
| 9,723,442 B2 | 8/2017 | Lau et al. |
| 9,846,854 B1 | 12/2017 | Lee et al. |
| 9,847,008 B2 | 12/2017 | Hunter et al. |
| 9,990,866 B2 | 6/2018 | Sanchez et al. |
| 11,568,353 B2 * | 1/2023 | Davis ................ G06Q 10/0833 |
| 2002/0067264 A1 | 6/2002 | Soehnlen |
| 2003/0137968 A1 | 7/2003 | Lareau et al. |
| 2003/0227382 A1 | 12/2003 | Breed |
| 2005/0034420 A1 | 2/2005 | Radlinger et al. |
| 2005/0080566 A1 | 4/2005 | Vock et al. |
| 2007/0001854 A1 | 1/2007 | Chung et al. |
| 2007/0138272 A1 | 6/2007 | Saperstein et al. |
| 2008/0030326 A1 * | 2/2008 | Gal ........................ G06Q 10/08 700/215 |
| 2008/0067227 A1 | 3/2008 | Poss et al. |
| 2009/0115202 A1 | 5/2009 | Terry et al. |
| 2009/0299520 A1 | 12/2009 | Binding et al. |
| 2009/0322510 A1 | 12/2009 | Berger et al. |
| 2010/0052215 A1 * | 3/2010 | Emond ............. B29C 45/14065 264/275 |
| 2010/0102964 A1 | 4/2010 | Steer |
| 2010/0299278 A1 | 11/2010 | Kriss et al. |
| 2013/0057694 A1 | 3/2013 | Petricoin, Jr. |
| 2013/0297524 A1 | 11/2013 | Lau et al. |
| 2013/0342343 A1 | 12/2013 | Harring et al. |
| 2014/0151173 A1 | 6/2014 | Reh et al. |
| 2014/0296659 A1 | 10/2014 | Lau et al. |
| 2015/0120602 A1 | 4/2015 | Huffman et al. |
| 2015/0254603 A1 | 9/2015 | Bashkin |
| 2015/0317896 A1 | 11/2015 | Planton et al. |
| 2016/0029160 A1 | 1/2016 | Theurer et al. |
| 2016/0328900 A1 | 11/2016 | Yong et al. |
| 2017/0004445 A1 * | 1/2017 | Lazier ................... G06Q 10/08 |
| 2017/0074002 A1 | 3/2017 | Cooper |
| 2018/0096288 A1 | 4/2018 | Quan |
| 2018/0211216 A1 | 7/2018 | Lau et al. |
| 2023/0110148 A1 | 4/2023 | Davis et al. |

FOREIGN PATENT DOCUMENTS

| | | |
|---|---|---|
| CN | 102197663 A | 9/2011 |
| CN | 106022700 A | 10/2016 |
| CN | 107852588 A | 3/2018 |
| CN | 112770648 A | 5/2021 |
| EP | 3833214 A4 | 5/2022 |
| JP | 2010089967 | 4/2010 |
| JP | 2010089967 A | 4/2010 |
| JP | 2015168481 A | 3/2014 |
| JP | 2014132747 | 7/2014 |
| JP | 2014132747 A | 7/2014 |
| JP | 2015168481 | 9/2015 |
| JP | 2018104085 | 7/2018 |
| JP | 2018104085 A | 7/2018 |
| JP | 2021533052 A | 12/2021 |
| KR | 20210056345 A | 5/2021 |
| WO | 2017079743 A1 | 5/2017 |
| WO | 2020033745 A1 | 2/2020 |

OTHER PUBLICATIONS

First Office Action dated Apr. 6, 2022, on a Chinese Paten No. CN2019800636018 in the name of TrakingPaking Inc. English abstract attached.

Second Office Action dated Feb. 12, 2023, on a Chinesse Paten No. CN2019800636018 in the name of TrakingPaking Inc. English abstract attached.

Third Office Action dated Aug. 31, 2023, on a Chinesse Paten No. CN2019800636018 in the name of TrakingPaking Inc. English abstract attached.

International Search Report dated Nov. 21, 2019, on PCT Application No. PCT/US2019/045778, filed Aug. 8, 2019, in the name of Package Inc.

Written Opinion dated Nov. 21, 2019, on PCT Application No. PCT/US2019/045778, filed Aug. 8, 2019, in the name of Package Inc.

Non Final Rejection dated Oct. 7, 2021, on a U.S. Appl. No. 16/536,108 filed Aug. 8, 2019, in the name of Package Inc.

Notice of Allowance dated Mar. 30, 2022, on a U.S. Appl. No. 16/536,108 filed Aug. 8, 2019, in the name of Package Inc.

Notice of Allowance dated Sep. 15, 2022, on a U.S. Appl. No. 16/536,108 filed Aug. 8, 2019, in the name of Package Inc.

Schaefer, Secure Trade Lane: A Sensor Network Solution for More Predictable and More Secure Container Shipments, Reference Notes, https://www.researchgate.net/profile/Steffen_Schaefer2/publication/221321727_Secure_trade_lane_a_sensor_network_solution_for_more_predictable_and_more_secure_corainer_shipments/links/56eef88308ae4b8b5e754fe9.pdf, Mar. 20, 2016.

Lee et al., Smart Insulating Container with Anti-Thell Features by M2M Tracking, http://citeseerx.isl.psu.edu/viewdoc/download?doi=10.1.1.431.4563&rep=rep1&type=pdf, Citation: https://ieeexplore.ieee.org/document/7059654/, Mar. 16, 2015.

U.S. Appl. No. 62/716,279, filed Aug. 8, 2018, in the name of Package Inc.

English Translation of Third Office Action issued Aug. 31, 2023, on a Chinesse Paten No. CN2019800636018 in the name of TrakingPaking INC.

Notice of Reasons for Refusal issued on Japanese Patent Application No. 2021-505777 Date of Drafting: Reiwa 5(2023) Sep. 29.

* cited by examiner

SHIPPING PACKAGE TRACKING OR MONITORING SYSTEM AND METHOD

CROSS-REFERENCE TO RELATED APPLICATION

This application is a continuation of U.S. Non-Provisional patent application Ser. No. 16/536,108, filed Aug. 8, 2019, which claims the benefit of priority under 35 U.S.C. § 119(e) based upon U.S. provisional patent application Ser. No. 62/716,279 filed on Aug. 8, 2018. The entire disclosure of each of the prior applications is incorporated herein by reference.

BACKGROUND

Technical Field

The present technology relates to the tracking and/or monitoring of packages and specifically to the use of a smart tracking device or package and package operating, networking, communications, shipping, logistics and transactions platform to enable sophisticated and responsive tracking technologies.

Background Description

Conventional package tracking is well known in the art, being used by postal services, couriers, and other shipping and delivery services, to determine the location of a package. A package, letter, or box is assigned a tracking number or code when it is first given by a sender to the delivery service. Typically, a barcode is affixed to the package and may be scanned with an optical reader. Alternatively, other technology such as magnetic strips, Radio-frequency identification (RFID) or Near-field communication (NFC) tags may be used.

At key points in the package's journey to its destination, the package is scanned, with the location and progress of the package being made available to anyone with the barcode.

When the package is delivered to the receiver, it is scanned one final time and the receiver may be required to provide a signature.

There are several drawbacks with presently used technology. One is that packages are only scanned at predefined points in their journey. Another is that once a package is marked as delivered, it is no longer tracked. If it has been delivered to the wrong location or signed for by the wrong person, it is easy for the package to become lost. Additionally, if a package is opened on route or tampered with, this is not detected by the scanning process.

Large items, such as shipping containers may contain active tracking modules that are networked and provide detection of tampering such as the door opening. However, these solutions are bulky and are not feasible for small packages.

For over 30 years, the standard tracking system in the shipping industry has been the utilization of barcode scanning technology to identify and process packages. This necessitates each package being scanned multiple times during a single journey in order to verify package identity, sender, receiver and other package information and verify courier, transport vehicle, location, estimated time of arrival and other shipping and logistics information, adding up to millions of hours per week in package scanning and processing for leading package shipping and delivery companies and is very costly in both human recourses and time.

Current barcode scanning and logistics systems are also limited in the amount of real-time package data and networking capabilities available for each package. Existing package monitoring services are primarily dependent on whether the vehicle the package is being transported in has location and networking capabilities.

With package theft becoming an increasing issue, there is currently no way for a sending or receiving party or shipping company to verify whether each person picking up a package is an authorized courier or receiving party or to identify who is opening a package after it has been delivered. In addition to package theft, with the continuing growth in Internet retail, e-commerce, overnight shipping and same day delivery, there is also a huge growth in misplaced packages and package returns and there is presently no way to automatically re-route packages once they are en route other than to return a package to the sender. The present technology is in part in response to a need for a peer-to-peer distributed package operating, networking and intelligence system in which each package has attached, enclosed, embedded or otherwise assigned onboard computing and networking functionality capable of receiving and displaying and/or networking dynamic package shipping and logistics information, location and other package sensor data and/or data from package contents such as networked devices or systems attached, enclosed, embedded or otherwise assigned to product(s), device(s), people, pet(s), food or other perishable item(s), object(s) or other material(s) inside of a package, container or vehicle with other packages, local and remote networked devices, vehicles, systems, networks, the Internet and/or other Cloud Platform and with the assigned courier, sender, receiver, shipping and/or delivery companies and other authorized parties at scheduled or unscheduled intervals and/or in real-time.

Existing wireless package identification systems such as Radio Frequency Identification (RFID) tags and Near Field Communication (NFC) are limited in the amount of data that may be transmitted and the signal strength and close proximity necessary to receive the RFID or NFC signal and both have significant limitations in real-time data, self-tracking and self-reporting and peer-to-peer networking capabilities.

Existing package tracking and networking systems such as GPS tracking devices that may be placed inside of a package to continuously monitor package location and may also include motion, shock, temperature and other sensors and wireless data uploading via a Cellular or LAN network are presently designed to track a single package with limited or no peer-to-peer wireless package networking, identification and verification capabilities as well as limited or no external package monitoring, audio-video and data streaming, bi-directional or multi-channel communications nor do they provide a ubiquitous distributed package operating and intelligence system, data networking and security solution for package to package identification, coordination, package contents and sensor monitoring and alerts, real-time video streaming, sender, receiver and courier verification, data processing, storage, networking, transactions, and communications and remote device interfacing and control across a wide array of package tracking, monitoring and communications devices, networks and package delivery vehicles with varying onboard processing and networking capabilities.

While the above-described devices fulfill their respective, particular objectives and requirements, the aforementioned patents do not describe a precise statistics computation for communication networks that allows for tracking or monitoring of a device or package using condition detection and notification. There exists a need for an economical, active tracking and tamper detection solution to improve the security and reliability of the shipping of small packages and letters.

SUMMARY

In view of the foregoing disadvantages inherent in the known types of package tracking systems now present in the prior art, the present technology provides a novel shipping package tracking or monitoring system and method, and overcomes one or more of the mentioned disadvantages and drawbacks of the prior art. As such, the general purpose of the present technology, which will be described subsequently in greater detail, is to provide a new and novel shipping package tracking or monitoring system and method which has all the advantages of the prior art mentioned heretofore and many novel features that result in a shipping package tracking or monitoring system and method which is not anticipated, rendered obvious, suggested, or even implied by the prior art, either alone or in any combination thereof.

According to one aspect of the present technology, the present technology can include a shipping package comprising an enclosure for receiving content, a closure for sealing the enclosure, a network module, a sensor module, and a battery module. The battery module provides power to the network module and the sensor module. The sensor module provides location information to the network module. The network module transmits a shipping status message to an external device. A label comprising shipping information can be included with the shipping package.

According to another aspect of the present technology, a method of tracking a shipping package can include an enclosure for receiving content within, a closure for sealing the enclosure, a network module, a sensor module, a memory module, and a battery module. The battery module providing power to the network module, the memory module, and the sensor module. The method can include the steps of receiving level of service parameters in the memory module, conformance to the level of service parameters being detectable by the sensor module. Monitoring, while the shipping package is travelling between a source and a destination, sensor data obtained from the sensor module. Transmitting a shipping status message, through the network module, to an external device, the shipping status message based on the sensor data. A label comprising shipping information can be included with the shipping package.

According to still another aspect of the present technology, the present technology can include a kit comprising the following parts: an enclosure; a network module; a sensor module; and a battery module. It can be appreciated that the kit can be provided without the enclosure as an aftermarket kit that is attachable to an enclosure. It can further be appreciated that the network module, the sensor module, and the battery module are incorporated into a single electronics and sensor unit or are individual connectable modules. The kit can include instructions such that functional relationships are detailed in relation to the structure of the present technology (such that the present technology can be used, maintained, or the like in a preferred manner). A label comprising shipping information can be included with the shipping package.

According to still another aspect of the present technology, the present technology can include a shipping package system including an enclosure for receiving content within, and a closure for sealing the enclosure. A label can include shipping information. A network module can be configured or configurable for transmitting or receiving data to or from an external device or a network module of one or more additional shipping package systems. A sensor module can be configured or configurable for providing sensor information to the network module. A battery module can be configured or configurable for providing power to the network module and the sensor module. A memory module can be coupled to the network module, the battery module, and the sensor module.

According to still another aspect of the present technology, the present technology can include a shipping package system including an enclosure for receiving content within, and a closure for sealing the enclosure. A clip can be attached or integral with a closure flap or side wall of the enclosure. The clip can include a network module configured or configurable for transmitting or receiving data to or from an external device or a network module of one or more additional shipping package systems. The clip can include a sensor module configured or configurable for providing sensor information to the network module. The clip can include a battery module configured or configurable for providing power to the network module and the sensor module.

In yet other aspects, any of the present technology disclosed herein with reference to the shipping package or smart box can be embodied in shipping container rather than in the shipping package or smart box.

In yet other aspects, the smart box or other shipping package is configured to communicate with a shipping container. In some embodiments, the shipping container is additionally configured to communicate with a wireless or cellular network and thereby relay communications between a smart box or shipping package contained in the shipping container to the wireless or cellular network.

There are, of course, additional features of the present technology that will be described hereinafter and which will form the subject matter of the claims attached.

BRIEF DESCRIPTION OF THE DRAWINGS

The present technology will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE PREFERRED EMBODIMENTS

Figure 1A:
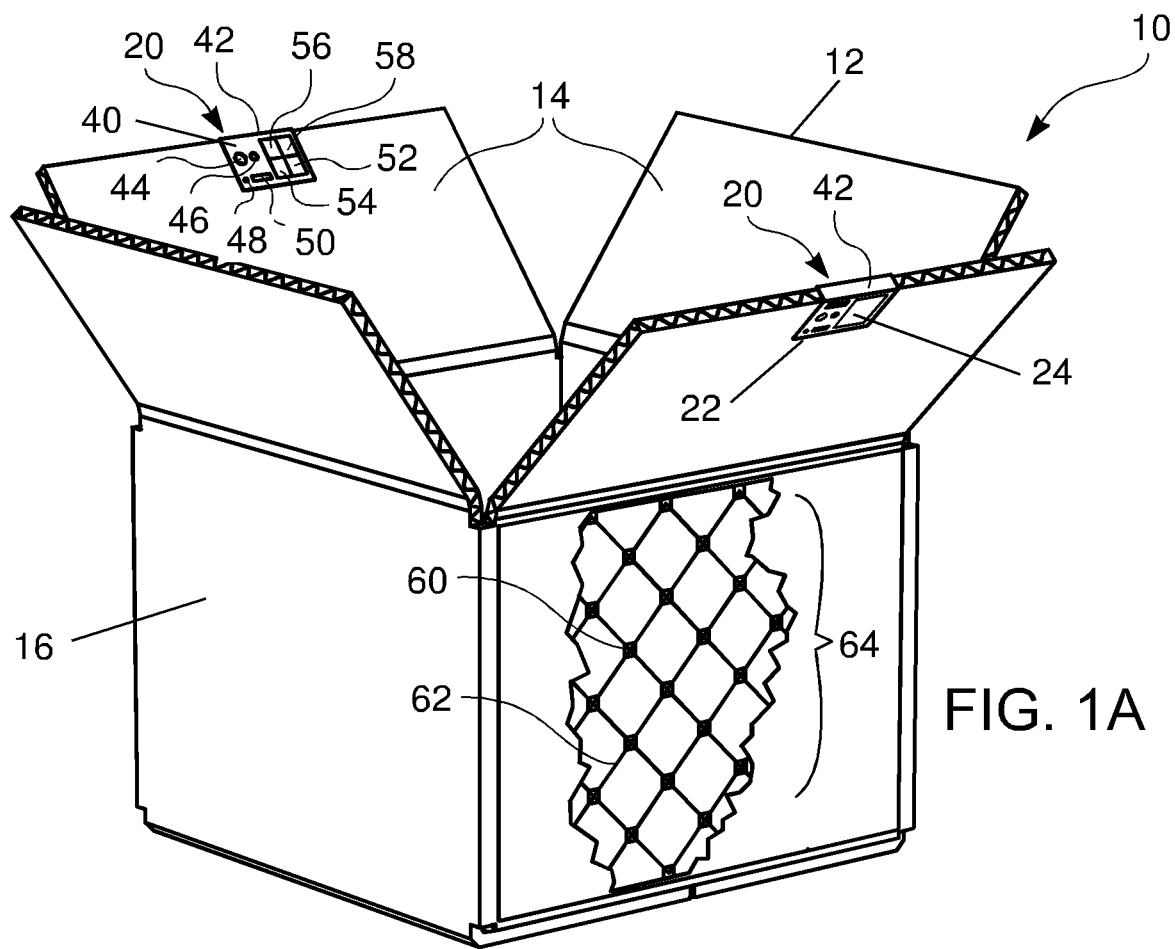
FIG. 1A is a perspective view of an embodiment of the package with the embedded micro shipping package computing hub attached to the closure flaps in an open position, with the interfacing layers exposed, and constructed in accordance with the principles of the present technology.

While the above-described devices fulfill their respective, particular objectives and requirements, the aforementioned devices or systems do not describe a precise statistics computation for communication networks that allows tracking of a device or package using condition detection and notification. The present technology additionally overcomes one or more of the disadvantages associated with the prior art.

A need exists for a new and novel precise statistics computation for communication networks that can be used for tracking of a device or package using condition detection and notification. In this regard, the present technology substantially fulfills this need. In this respect, the shipping package tracking or monitoring system and method according to the present technology substantially departs from the conventional concepts and designs of the prior art, and in doing so provides an apparatus primarily developed for the purpose of tracking of a device or package using condition detection and notification.

In the following description, for purposes of explanation and not limitation, specific details are set forth, such as particular embodiments, procedures, techniques, etc. in order to provide a thorough understanding of the present technology. However, it will be apparent to one skilled in the art that the present technology may be practiced in other embodiments that depart from these specific details.

Embodiments of the present technology provide active, smart packaging for letters and packages, small and large, which provide real-time tracking of the position, environment status, and security status of the package. These smart packages include active electronics incorporated into the packaging, sealing, or label connecting over a wireless network to send or receive position updates and status of the package.

Environmental status can include any of a number of criteria including temperature, humidity, maximum acceleration experienced, package orientation, and other factors that may affect the package and its contents while in transit or storage. These factors may be used to track the conditions experienced by the package during transit and to verify and enforce shipping contract provisions that define how a package will be treated while in transit. Environmental factors may also be used to activate alarms in the case of the factor is outside of normal ranges. Out of range environmental readings may be used to detect fires, water leakage, etc.

Security status includes detecting events such as the package being opened on route, a package being delivered to the wrong address or wrong person, a package being opened and perhaps being resealed, and other events. Security status may also include determining when a package is taken a different route than expected.

Smart packages incorporating embodiments of the present technology comprise electronic circuits, sensors, modules, and network interfaces that allow the package to connect to wireless networks. Electronic components include a CPU or microcontroller, volatile and non-volatile memory, interface and networking hardware, and sensors. Sensors may include temperature sensors, humidity sensors, light sensors, image sensors, spatial, motion, acceleration, orientation and relational position sensors such as an accelerometer, gyroscope, compass, altimeter and wireless and location sensors and systems such as global positioning system (GPS), Satellite, Cellular, wireless internet access (Wi-Fi), Bluetooth, NFC, RFID, Infrared (IR) and/or other wireless, optic or fiber optic networking sensors and systems, flight transmitters and sensors, optical and imaging sensors, accelerometers, gyroscope, altitude sensors and other motion, orientation and positioning sensors, air pressure, gas, chemical or biological contaminant sensors and others. In some cases, the smart package may access and read sensor data from external, networked sensors in proximity to itself. One example is a smart package in a truck where the smart package obtains the temperature over a Bluetooth or Wi-Fi wireless network from a thermometer in the truck itself. Another example may be where the growth of molds or bacteria in a food or medical package is detected and alerts accordingly sent via the system.

The foregoing and additional aspects and embodiments of the present disclosure will be apparent to those of ordinary skill in the art in view of the detailed description of various embodiments and/or aspects, which is made with reference to the drawings, a brief description of which is provided next.

In some embodiments, the sensor module can comprise a GPS and the shipping status message can comprise the location of the shipping package. In other embodiments, the sensor module can comprise a light detector and the shipping status message can comprise an alert indicating that light has entered the package.

In further embodiments, the shipping package can comprise a memory module coupled to the network module, the battery module, and the sensor module. The sensor module can comprise a light detector and the shipping status message can comprise an alert indicating that light entering the package had exceeded a predefined threshold.

In other embodiments, the enclosure can comprise a conductive element. The breaking of a portion of the conductive element during transit can be detected by the sensor module. The shipping status message can comprise an alert indicating that the enclosure has been damaged.

In further embodiments, the closure can comprise a second conductive element. The breaking of a portion of the second conductive element during transit can be detected by the sensor module. The shipping status message can further comprise an alert indicating that the second enclosure has been damaged.

In other embodiments, the enclosure can comprise a first conductive element and the closure comprises a second conductive element. The first conductive element and the second conductive element can form an electrical circuit when the closure is disposed to seal the package. The breaking of a portion of the electric circuit during transit can be detected by the sensor module. The shipping status message can further comprise an alert indicating that electric circuit has been damaged.

In further embodiments, the label can comprise a third conductive element and the electrical circuit further comprises the third conductive element when the label is fixed to the shipping package.

Further embodiments can comprise a memory module coupled to the network module, the battery module, and the sensor module. The memory module can be configured with a level of service. The sensor module can detect when the level of service is broken. The shipping status message can comprise an alert indicating that the level of service has been broken.

In some embodiments, the sensor module can comprise a motion detector and the level of service can comprise a maximum motion that the shipping package may experience.

Further embodiments, can comprise a memory module coupled to the network module, the battery module, and the sensor module. The memory module is configured with a shipping route. The sensor module comprises a GPS and detects when a traveled route of the shipping package deviates from the shipping route. The shipping status message comprises an alert indicating that the shipping package is not following the shipping route.

In other embodiments, the shipping route can comprise a destination. When an end point of the traveled route varies from the destination, the shipping status message can further comprise an alert indicating that the shipping package has been delivered to a wrong destination.

In further embodiments, the label can comprise a user interface. The user interface is configured or configurable for accepting an input comprising a delivery indication or a payment. In other embodiments, the user interface further can comprise a display to provide information to a human observer. In other embodiment, the user interface can further comprise a biometric sensor for authenticating a receiver of the shipping package.

In some embodiment, the battery module can be initially in a disabled state. The battery module can enter an enabled state when the enclosure is sealed with the closure, the battery module can provide power to the network module and the sensor module. In other embodiments, the battery module can enter the disabled state once the shipping package is detected to have reached its destination and detected to have been opened.

In further embodiment, the sensor module can comprise a camera module, and the camera module can be activated when the enclosure is opened. In some embodiments, the camera module can comprise a still camera. In other embodiments, the camera module can comprise a video camera.

In some embodiments, the shipping status message can comprise a photo of a person opening the package.

In some embodiments, the level of service can comprises a restriction on the orientation of the enclosure.

In some embodiments, the maximum motion can comprise an acceleration. In other embodiments, the maximum motion can comprise a speed. In still other embodiments, the maximum motion can comprise a condition selected from the group consisting of acceleration, speed, orientation, altitude, attitude and spatial position.

Further embodiments can comprise a memory module coupled to the network module, the battery module, and the sensor module. The shipping status message can be stored in the memory module and can be transmitted when queried by the external device.

Further embodiments can comprise a memory module coupled to the network module, the battery module, and the sensor module. The network module can be disconnected from a network in a first state. The network module can be connected to the network in a second state. The shipping status message can be stored in the memory module while in the first state. The shipping status message can be transmitted while in the second state.

In some embodiment, the network module can support a network protocol selected from the group consisting of Cellular, Wi-Fi, Bluetooth, NFC, RFID, IR radiation or other. In other embodiments, the network module can support a network topology selected from the group consisting of mesh, ad-hoc, or point-to-point.

In further embodiments, the shipping package can be stored or transported in a container configured or configurable for storing a plurality of other shipping packages.

The container can comprise a network relay and the network module relays communications through the network relay.

In other embodiments, the method of tracking the shipping package can include configuring the sensor module as a node for communicating with another node of another sensor module of another shipping package or with a sensor hub. Then creating a wireless sensor network with the node and the another node or sensor hub. Configuring the shipping status message to comprise an alert indicating that communications between one of the nodes changes in direction, intensity or is disconnected from the network.

In further embodiments, the shipping package can comprise a memory module coupled to the network module, the battery module, and the sensor module. The memory module can be configured with a shipping route, and the sensor module can include a temperature sensor, a chemical sensor or an environmental sensor configured to measure a condition status inside the shipping package, outside the shipping package or a status of content in the shipping package.

Some embodiments can include a biometric sensor is selected from the group consisting of a camera configured or configurable for facial recognition, a microphone configured or configurable for voice recognition, finger print reader, and a touchpad.

In other embodiments, the shipping package can be in proximity to a plurality of other shipping packages. The network module can form an ad-hoc network with the plurality of other shipping packages.

Embodiments may also include a full mesh sensor network that can be a mesh/grid of sensors lining the shipping package or may be fabric, paper wrapping or other embedded sensor network in the shipping package, envelope, bag or other container, which monitors the shape of the package and recognizes if the package has been broken, torn, cut or punctured. This can be determined when the mesh is altered in its, shape or form or when a section has been cut or broken an alert may be sent. The mesh sensor network may be wired through fiber optics or other micro connection or may be wireless where each sensor operates as a node in an wireless sensor group all communicating with each other and a wireless sensor hub and processor via RF, IR or other communications protocol.

Still further embodiments may include the package or carrier may incorporate or be assigned environmental and/or biometric sensors outside and/or inside of the shipping package such as temperature, chemical, electrical field, radiation, air quality, air pressure, water quality, humidity, bacterial decay or other measurement systems for monitoring the status of chemical, electronic, flammable, explosive or other potentially dangerous or non-stable contents or for monitoring the status or freshness of organic materials or food and/or may include biometric sensors such as heart rate, body temperature, blood sugar, body motion, stress and other biometric measurement systems and methods for continuously monitoring the status of an animal or pet in transport.

Some embodiments, the package or carrier may also incorporate or be assigned a heating, cooling, oxygen or other temperature and environmental control system for maintaining the correct environment for the transport of contents. The environmental control system may be incorporated into the carrier or package or may be attached or assigned to the package or carrier and may operate autonomously or may be controlled remotely.

In yet other embodiments, a method of tracking a shipping package can include providing a shipping package comprising an enclosure for receiving content within, a closure for sealing the enclosure, a label comprising shipping information, a network module, a sensor module, a memory module, and a battery module. The battery module providing power to the network module, the memory module, and the sensor module, the method performed by the shipping package. Receiving level of service parameters in the memory module. Detecting by the sensor module conformance to the level of service parameters. Monitoring, while the shipping package is travelling between a source and a destination, sensor data obtained from the sensor module. Transmitting a shipping status message, through the network module, to an external device, the shipping status message being in part based on the sensor data.

Some embodiments can include the monitoring light entering the shipping package by way of a light detector of the sensor module, and configuring the shipping status message to comprise an alert indicating that the light entering the shipping package had exceeded a predefined threshold.

Further embodiments can include the detecting, by the sensor module, a breaking of a portion of at least one conductive element associated with the enclosure, the closure and/or the label during transit, and configuring the shipping status message to comprise an alert indicating that the enclosure, closure and/or label has been damaged.

In some embodiment the network module can be configured or configurable as an ad hoc networking platform.

In some embodiment the network module can be configured or configurable as Blockchain networking and peer-to-peer topology.

In some embodiment the network module can be configured or configurable to communicate with the network module of the one or more additional shipping package systems to determine which of the network modules has the highest bandwidth.

Some embodiments of the present technology can include a data management system configured or configurable for at least one selected from the group consisting of duplex-directional data and multimedia networking, power optimization, dynamic device configuration, communications, and data management.

In some embodiment the data management system can be configured or configurable to assign a priority to the sensor information prior to sending or receiving the sensor information to or from the network module.

In some embodiment the data management system can be configured or configurable to assign one or more random key encryption codes to the sensor information, with each of the random key encryption codes including a public key that is shared on an external directory by way of the network module and a private key stored on the shipping package system for signing, encrypting and decrypting the sensor information.

There has thus been outlined, rather broadly, features of the present technology in order that the detailed description thereof that follows may be better understood and in order that the present contribution to the art may be better appreciated.

Numerous objects, features and advantages of the present technology will be readily apparent to those of ordinary skill in the art upon a reading of the following detailed description of the present technology, but nonetheless illustrative, embodiments of the present technology when taken in conjunction with the accompanying drawings.

As such, those skilled in the art will appreciate that the conception, upon which this disclosure is based, may readily be utilized as a basis for the designing of other structures, methods and systems for carrying out the several purposes of the present technology. It is, therefore, that the claims be regarded as including such equivalent constructions insofar as they do not depart from the spirit and scope of the present technology.

These together with other objects of the present technology, along with the various features of novelty that characterize the present technology, are pointed out with particularity in the claims annexed to and forming a part of this disclosure. For a better understanding of the present technology, its operating advantages and the specific objects attained by its uses, reference should be made to the accompanying drawings and descriptive matter in which there are illustrated embodiments of the present technology. Whilst multiple objects of the present technology have been identified herein, it will be understood that the claimed present technology is not limited to meeting most or all of the objects identified and that some embodiments of the present technology may meet only one such object or none at all.

Whilst multiple objects of the present technology have been identified herein, it will be understood that the claimed present technology is not limited to meeting most or all of the objects identified and that some embodiments of the present technology may meet only one such object or none of the objects mentioned herein Referring now to the drawings, and particularly to FIGS. 1-21, an embodiment of the system and method of the present technology is shown and generally designated by the reference numeral 10.

In FIG. 1A, an embodiment of a new and novel package monitoring system and method 10 of the present technology for tracking and/or monitoring a package according to one embodiment is illustrated and will be described. More particularly, the package monitoring system and method 10 essentially includes an enclosure of a package or a package 12 featuring closure flaps 14 and side walls 16, and an electronics and sensor unit 20.

Figure 1B:
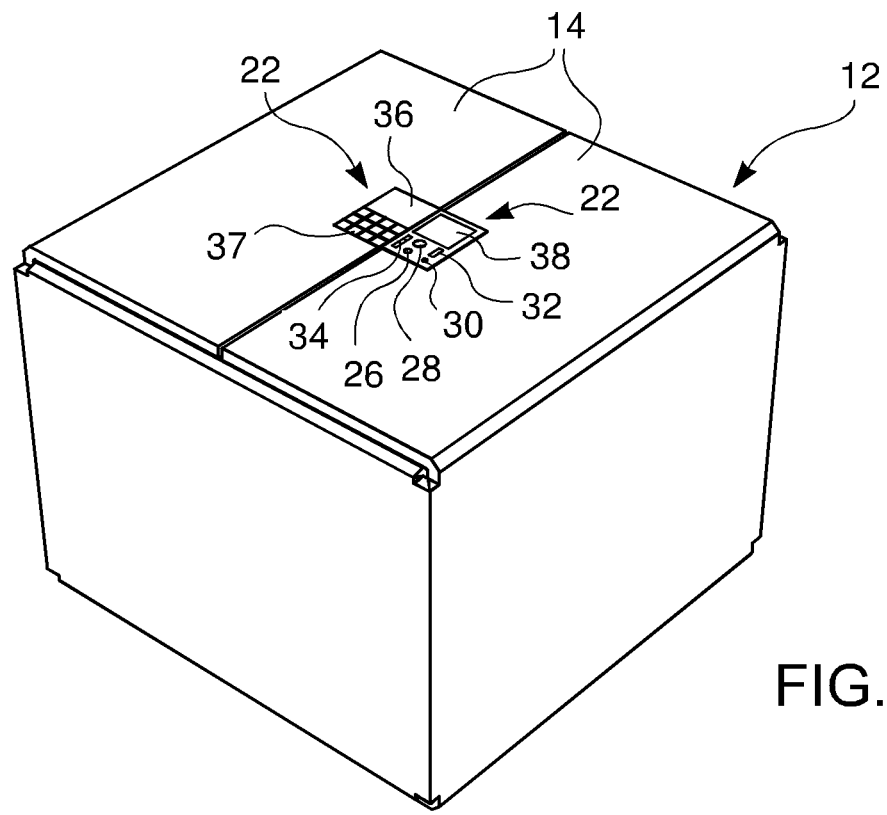
FIG. 1B is a perspective view of the package with the embedded micro shipping package computing hub attached to the closure flaps in a closed position.

In some embodiments, the electronic and sensor components can be fabricated as a single integrated circuit (IC) unit 20 packaged in such a way as to minimize the thickness and footprint of the IC. The electronics and sensor unit 20 can be in the form of one or more embedded micro shipping package computing hubs 22 embedded or integral with an edge of one or more of the closure flaps 14 and/or side walls 16 thereof. The hubs 22 can be included on oppositely located closure flaps 14 to be adjacent or in contact with each other when the closure flaps 14 are closed and sealed. Thereby creating or closing an electric circuit between adjacent hubs 22, when in a closed position, as best illustrated in FIG. 1B.

Each of the hubs 22 can include an external interfacing module 24 and an internal interfacing module 40. The external interfacing module 24 can include any one of a camera 26, a light 28, a microphone 30, a speaker 32, temperature, humidity and environmental sensors 34, a charging pad 36, a solar panel 37, and/or a touchscreen 38. The contact sensors 42 of the hubs 22 are configured to recognize when the package 12 is open, closed or sealed.

The internal interfacing module 40 can include one or more components, such as but not limited to, a contact sensor 42, an infrared (IR) sensor 44, an IR/near IR light 46, a microphone 48, a speaker 50, radiation sensors 52, electromagnetic sensors or magnetometer 54, temperature, humidity and environmental sensors 56, carbon dioxide ($CO^2$), and gas and chemical sensors 58.

The closure flaps 14 and/or the side walls 16 can include an interfacing layer 60 featuring sensor hubs/nodes 62. Alternatively, the interfacing layer 60 featuring sensor hubs/nodes 62 can be included with a printable cover layer 64 attachable to the closure flaps 14 and/or the side walls 16 of the package 12.

The electronics and sensor unit 20 included in the smart package 12 may be powered by a variety of sources including a battery, capacitor, external electromagnetic energy fields, photovoltaic, piezoelectric, or a combination of sources. In many embodiments, the battery will be rechargeable, with the battery being recharged by an integrated charging circuit that receives external electromagnetic energy, similar to a passive RFID tag or wireless charging pad. Batteries may be incorporated into the smart package enclosure 12, closure flaps 14 or side walls 16, and may be disabled until the package is sealed. In some embodiments, the battery or batteries may be attached or assigned to the package in the form of a label, packing tape, wrapping paper, fabric, device or module. Activating the battery may be done through a variety of means including mechanically pulling a tab, or detaching a segment, connecting, assigning, or contacting the battery to the electronic circuit or by activating it wirelessly. Wired or wireless charging may be provided in a variety of locations including warehouses, shipping containers, vehicles, etc.

In some cases, closing and sealing the smart package, will cause the electronic circuit to be completed, in order for the electronics to power up, and initialize. In some embodiments, boot code and configuration information may read from non-volatile memory. In other cases, boot code will be read from non-volatile memory and configuration information will be downloaded over a network interface. In yet other cases, a small memory card such as a SIM card or SD card may be inserted with configuration information. In yet another case, a handheld, wearable, vehicle or other wireless device, networked computing terminal or an Internet, VPN or other network based program or application may be used to configure the electronics.

Figure 2A:
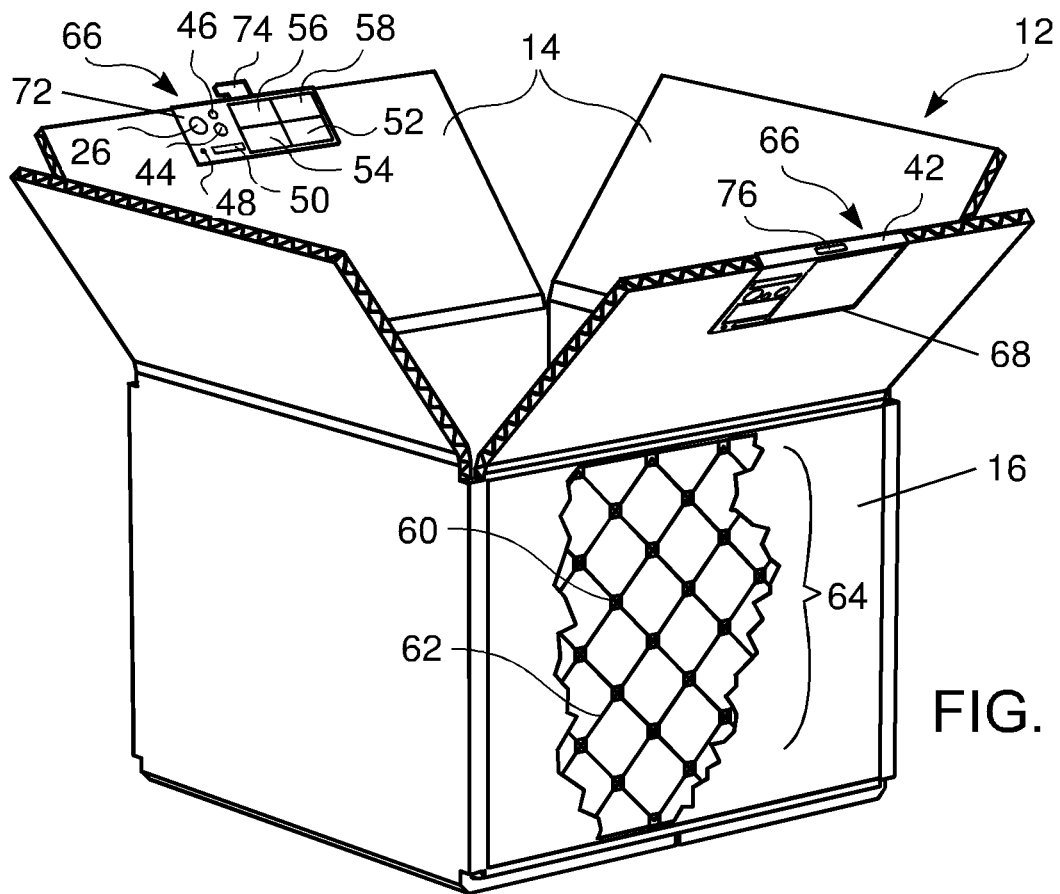
FIG. 2A is a perspective view of an embodiment of the package with the embedded advanced shipping package computing hub attached to the closure flaps in an open position, with the interfacing layers exposed, and constructed in accordance with the principles of the present technology.
Figure 2B:
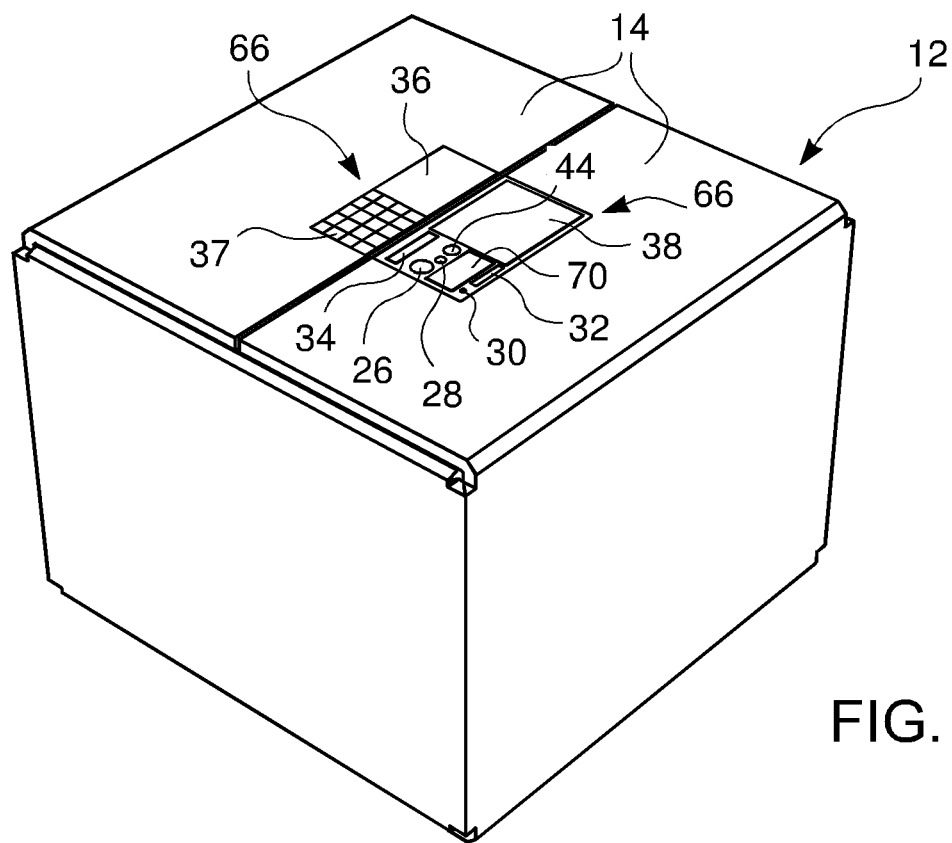
FIG. 2B is a perspective view of the package with the embedded advanced shipping package computing hub attached to the closure flaps in a closed position.

Referring to FIGS. 2A and 2B, the electronics and sensor unit 20 can be in the form of one or more embedded advanced shipping package computing hubs 66 embedded or integral with an edge of one or more of the closure flaps 14 and/or side walls 16 of the package 12. The hubs 66 can be included with oppositely located closure flaps 14 to be adjacent or in contact with each other when the closure flaps 14 are closed and sealed. Thus creating or closing an electric circuit between adjacent hubs 66, when in a closed position, as best illustrated in FIG. 2B.

Each of the hubs 66 can include an external interfacing module 68 and an internal interfacing module 72. The external interfacing module 68 can include one or more components, such as but not limited to, a camera 26, a light 28, a microphone 30, a speaker 32, temperature, humidity and environmental sensors 34, a charging pad 36, a solar panel 37, a touchscreen 38 and/or a fingerprint scanner 70. The contact sensors 42 of the hubs 22 are configured to recognize when the package 12 is open, closed or sealed.

The internal interfacing module 72 can include one or more components, such as but not limited to, a contact sensor 42, a camera 26, an infrared (IR) sensor 44, an IR/near IR light 46, a microphone 48, a speaker 50, radiation sensors 52, electromagnetic sensors or magnetometer 54, temperature, humidity and environmental sensors 56, carbon dioxide ($CO^2$), and gas and chemical sensors 58.

The hubs 66 can include a locking mechanism such as a magnetic, electronic or mechanic latch that may be locked and unlocked with a password, biometric identification, RFID chip, or other verification method or methods. An edge of a first of the hubs 66, which can include the contact sensors 42, can further include a locking bolt, latch or member 76. An edge of a second of the hubs 66, which can include the contact sensors 42, can further include a locking port 78. The locking member 76 is configured to be received in or engageable with the locking port 78, while a locking action can be utilized to lock the two adjacent hubs 66 together, thereby preventing unauthorized opening of the package 12.

Figure 3A:
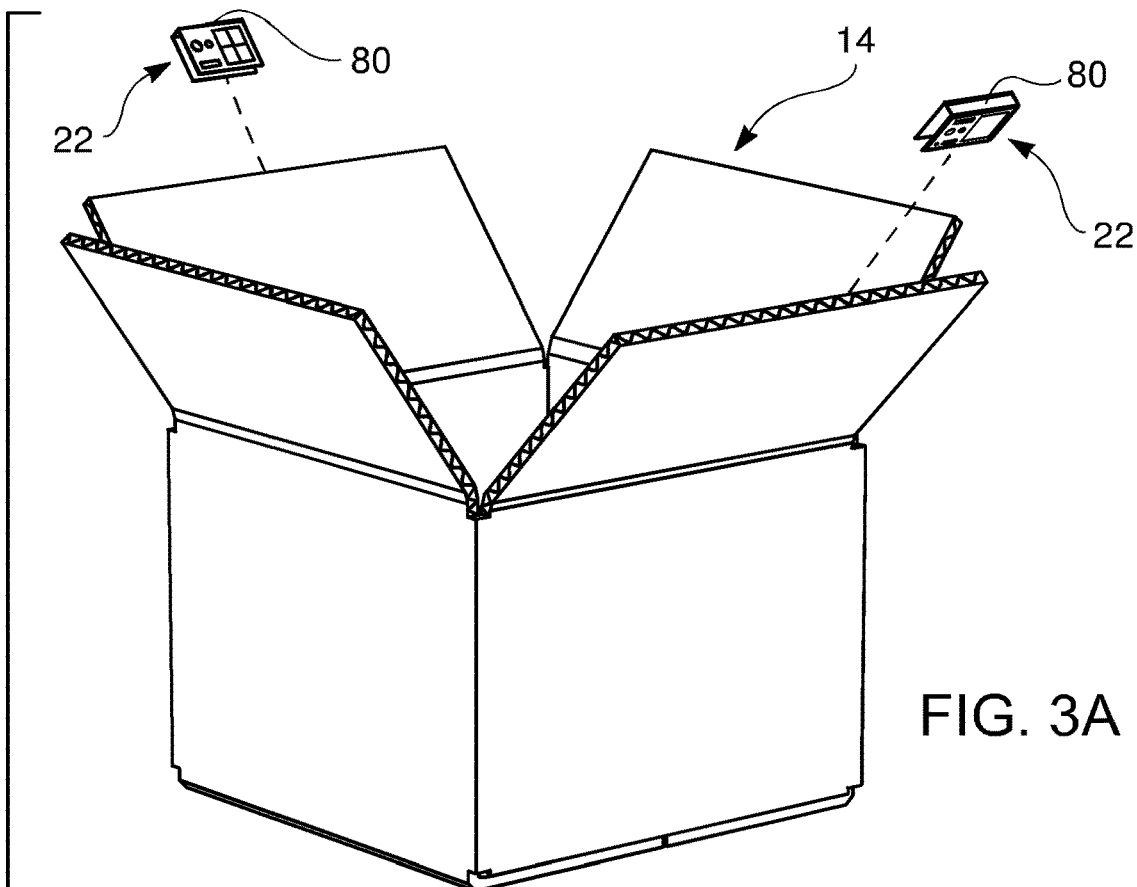
FIG. 3A is a perspective view of the package with the embedded micro shipping package computing hub removed from the closure flaps.
Figure 3B:
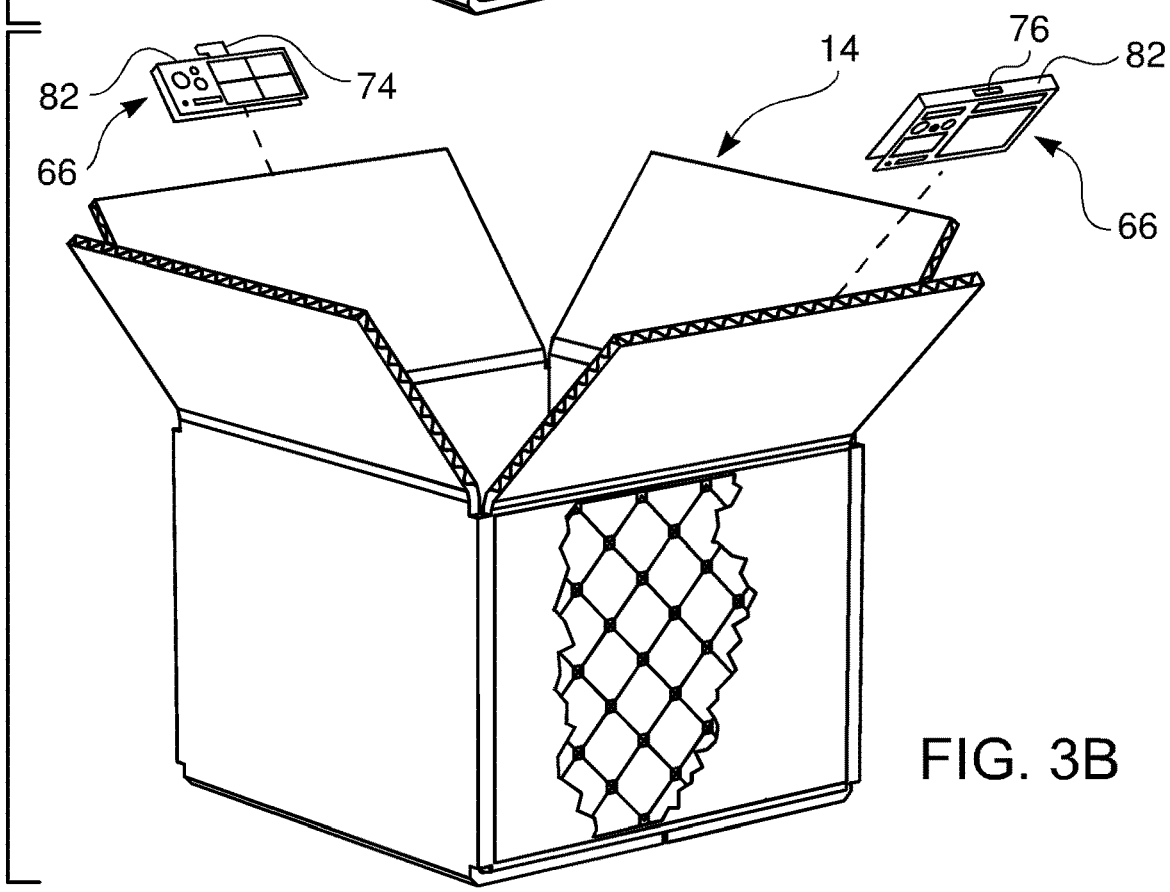
FIG. 3B is a perspective view of the package with the embedded advanced shipping package computing hub removed from the closure flaps.

The embedded micro shipping package computing hubs 22 and/or the embedded advanced shipping package computing hubs 66 can be in the form of one or more clips 80, 82, respectively, as best illustrated in FIGS. 3A, 3B. The clips 80, 82 can be embedded or integral with an edge of one or more of the closure flaps 14 and/or side walls 16 of the package 12. The clips 80, 82 can be attached to oppositely located closure flaps 14 to be adjacent or in contact with each other when the closure flaps 14 are closed and sealed.

Figure 4A:
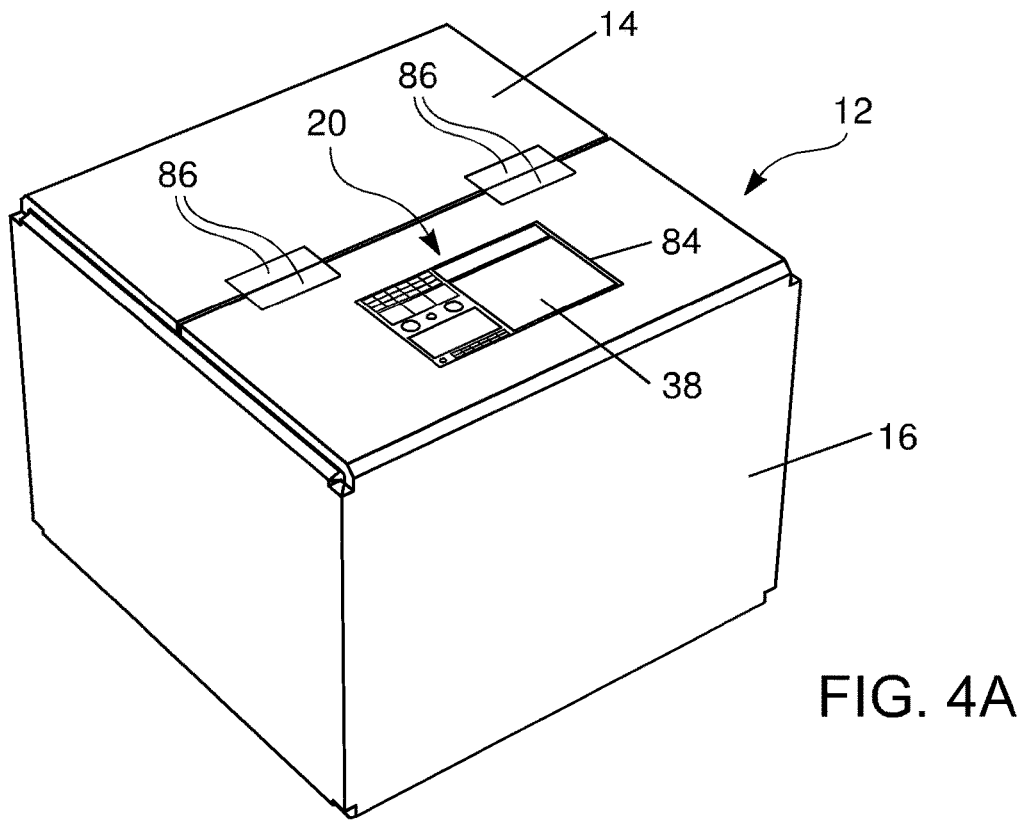
FIG. 4A is a perspective view of package including the smart label and the contact sensor module pair embedded with the closure flaps in a closed position.

FIG. 4A illustrates an example of the electronics and sensor unit 20 that can be in the form of an embedded smart label 84 including one or more components, such as but not limited to, a touch screen, a finger printer reader, a biometrics scanner, an imaging unit, a networking module, a camera, a light, a microphone, a speaker, temperature, humidity and environmental sensors, a charging pad, and/or a solar panel. The smart label 84 can be embedded on, to or with the closure flaps 14 and/or side walls 16 of the package 12. A pair of contact sensor modules 86 can be embedded on, with or to the edges of the closure flaps 14. The contact sensor modules 86 are configured to recognize when the package 12 is open, closed or sealed, and are in wireless communication with the smart label 84. The smart label 84 and the contact sensor modules 86 can include transmitters, receivers and/or transceivers configured or configurable for wireless communication with each other.

Figure 4B:
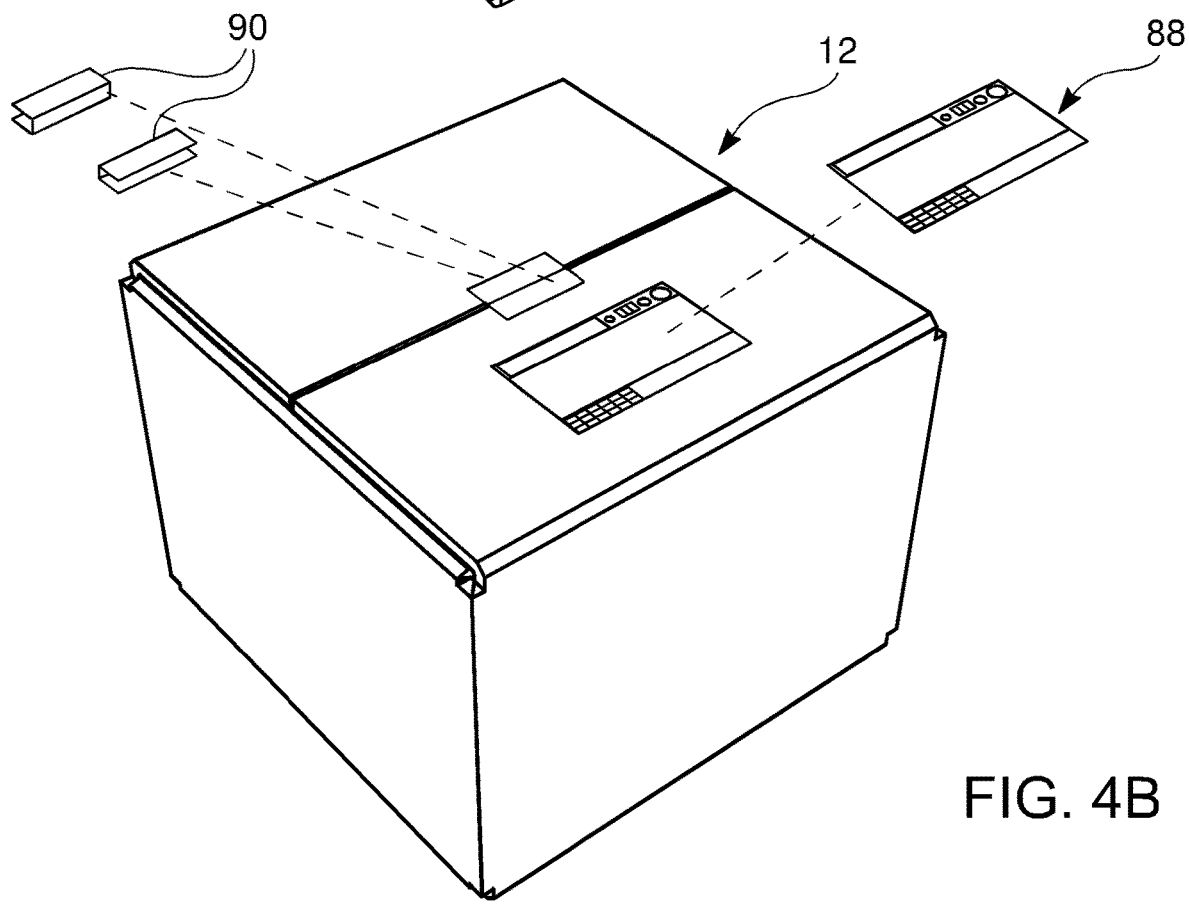
FIG. 4B is a perspective view of package with an exploded smart label and the contact sensor module pair.

FIG. 4B illustrates an example of the electronics and sensor unit 20 that can be in the form of an attachable smart label 88 including a low power display and one or more components, such as but not limited to, a touch screen, a finger printer reader, a biometrics scanner, an imaging unit, a networking module, a camera, a light, a microphone, a speaker, temperature, humidity and environmental sensors, a charging pad, and/or a solar panel. The smart label 88 can be attachable to the closure flaps 14 and/or side walls 16 of the package 12. A pair of attachable contact sensor modules 90 can be attached on, with or to the edges of the closure flaps 14. The contact sensor modules 90 are configured to recognize when the package 12 is open, closed or sealed, and are in wireless communication with the smart label 88. The smart label 88 and the contact sensor modules 90 can include transmitters, receivers and/or transceivers configured or configurable for wireless communication with each other.

Figure 5A:
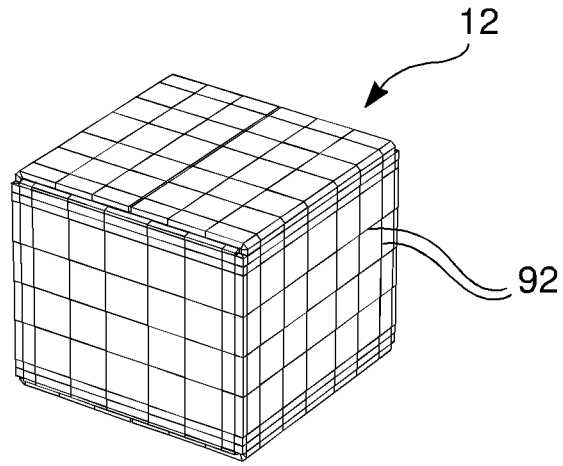
FIGS. 5A-C is perspective views of embedded sensor modules including mesh sensors, conductive circuit sensors, and fiber-optic sensors with the package of the present technology.
Figure 5B:
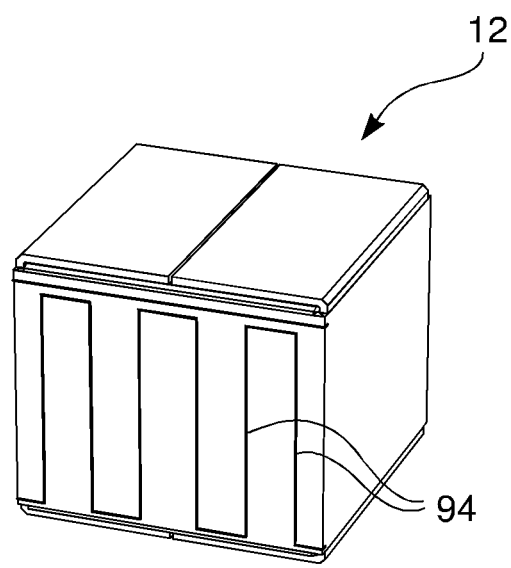
Figure 5C:
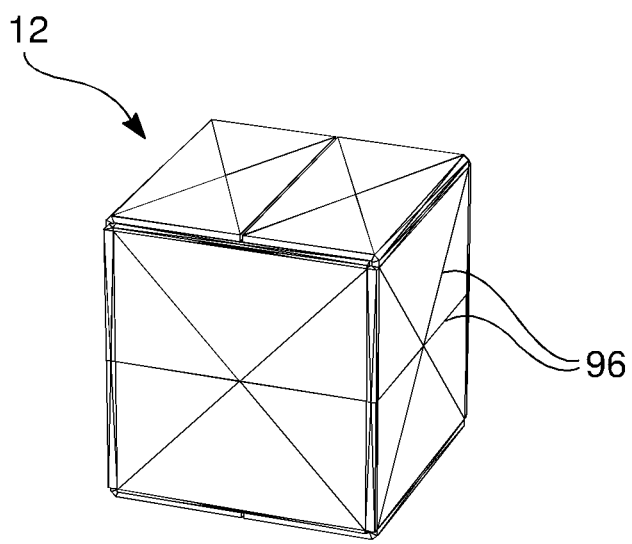

In some embodiments, the electronics and sensor unit may be disposed on the inside, outside or between inner layers of the enclosure material, as best illustrated in FIGS. 5A-C. In some embodiments, as illustrated in FIG. 5A, the enclosure 12 may comprise an embedded mesh sensor including conductive fabric, textiles, wires, strips, or elements 92 to form a conductive circuit, mesh, or sensor network, to enable detection of the enclosure being opened through unsealing the closure or by cutting a slot or hole in a surface of the enclosure.

In some embodiments, as illustrated in FIG. 5B, the enclosure 12 may comprise a circuit sensor 94 to form a conductive circuit, mesh, or sensor network, to enable detection of the enclosure being opened through unsealing the closure or by cutting a slot or hole in a surface of the enclosure.

In some embodiments, as illustrated in FIG. 5C, the enclosure 12 may comprise a fiber optic sensor 96 to form a conductive circuit, mesh, or sensor network, to enable detection of the enclosure being opened through unsealing the closure or by cutting a slot or hole in a surface of the enclosure. Any of the sensors 92, 94, 96 can be in communication with the electronics and sensor unit for detection of a break in the sensors 92, 94, 96. The sensors 92, 94, 96 can be positioned on the exterior or interior surface of the enclosure 12 or incorporated/embedded in the paneling that forms the enclosure 12.

Figure 6A:
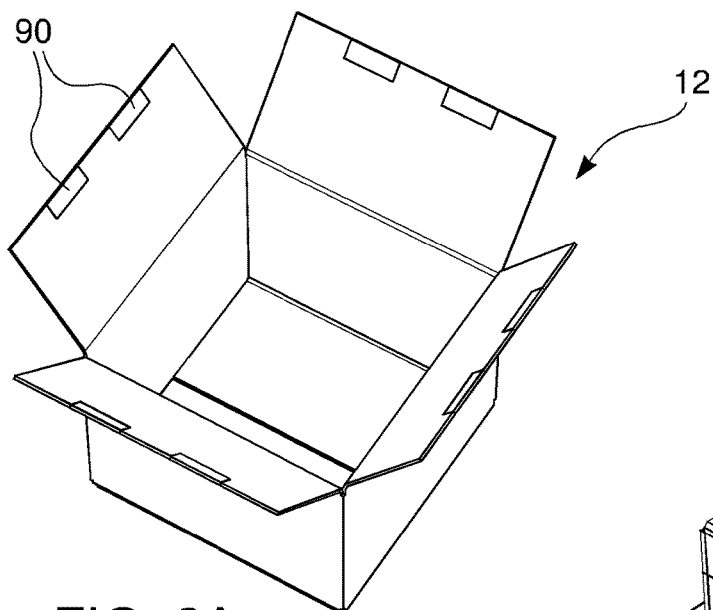
FIG. 6A is a perspective view of package with attachable and wireless contact sensor module pairs including with the closure flaps of the package.
Figure 6B:
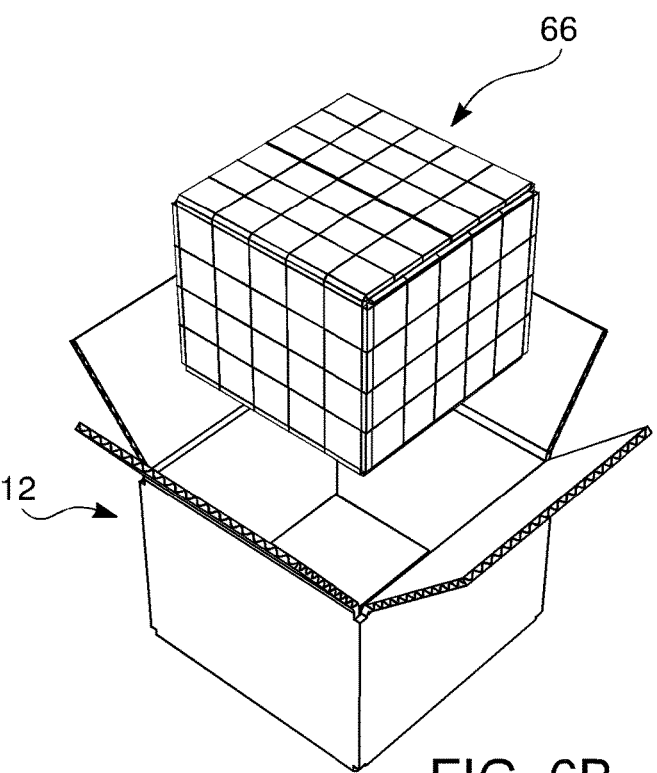
FIG. 6B is a perspective view of package with an embedded sensor packaged receivable therein.
Figure 6C:
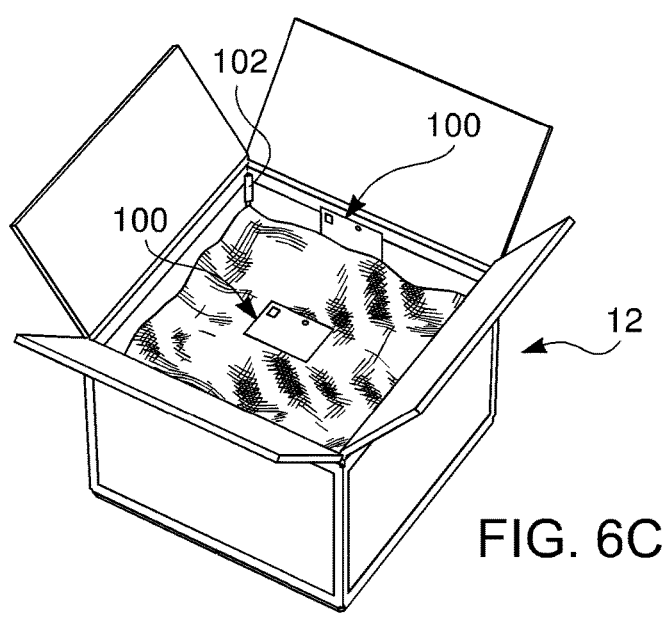
FIG. 6C is a perspective view of the internal package sensor hub including wall and/or corner sensors or associated with the interior or paper wrapping of the package of the present technology.

As best illustrated in FIG. 6B, the present technology can include an embedded sensor packaging 98 that is receivable in the package 12. The embedded sensor packaging 98 can be an openable or closable enclosure embedded with any of the sensors 92, 94, 96.

FIG. 6B illustrates an example of paper, packaging, fabric or wrapping that can include the electronics and sensor unit in the form of an internal package sensor hub 100 that can include internal package corner and/or wall mounted sensors 102. The sensors 102 can be in wire or wireless communication with each other and with the sensor hub 100. The corner and/or wall mounted sensors 102 can be any of the sensors described for utilization with the present technology.

Figure 7A:
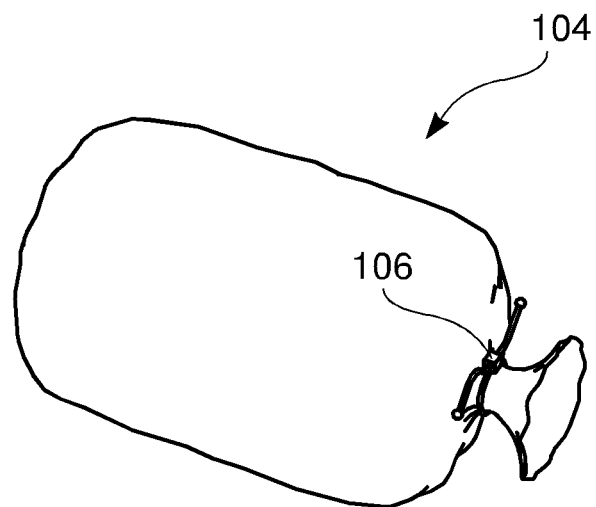
FIG. 7A is a perspective view of the package of the present technology in the form of a bag including an attachable smart tie sensor hub.

FIG. 7A illustrates an example of the package or enclosure in the form of a bag 104 including the electronics and sensor unit in the form of an attachable smart tie sensor hub 106. The sensor hub 106 is configured or configurable to be tied or secured around a portion of the bag 104, and to detect a condition, such as but not limited to, opening the bag 104.

Figure 7B:
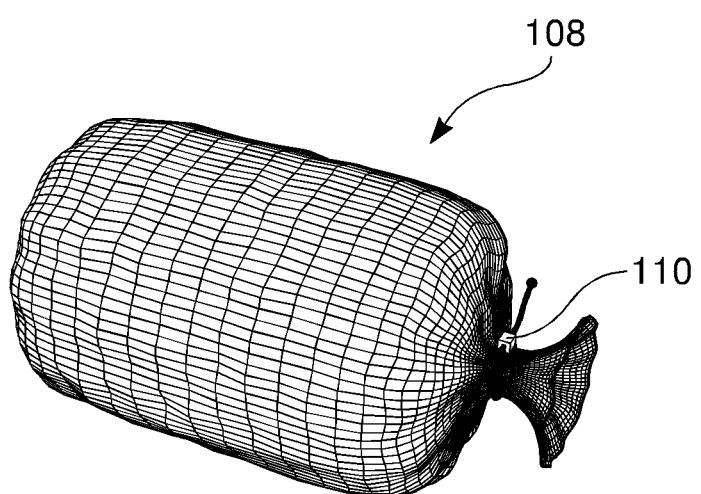
FIG. 7B is a perspective view of the package of the present technology in the form of a smart bag including an embedded smart tie sensor hub.

FIG. 7B illustrates an example of the package or enclosure in the form of a smart bag 108 including the electronics and sensor unit in the form of an embedded smart tie sensor hub 110. The sensor hub 110 is embedded with the smart bag 108 and has a portion that can be tied or secured around a portion of the bag 108. The smart bag 108 can be embedded with conductive strips that are in communication with the sensor hub 110, and are configured to detect a condition, such as but not limited to, opening or tearing of the bag 108.

Figure 8A:
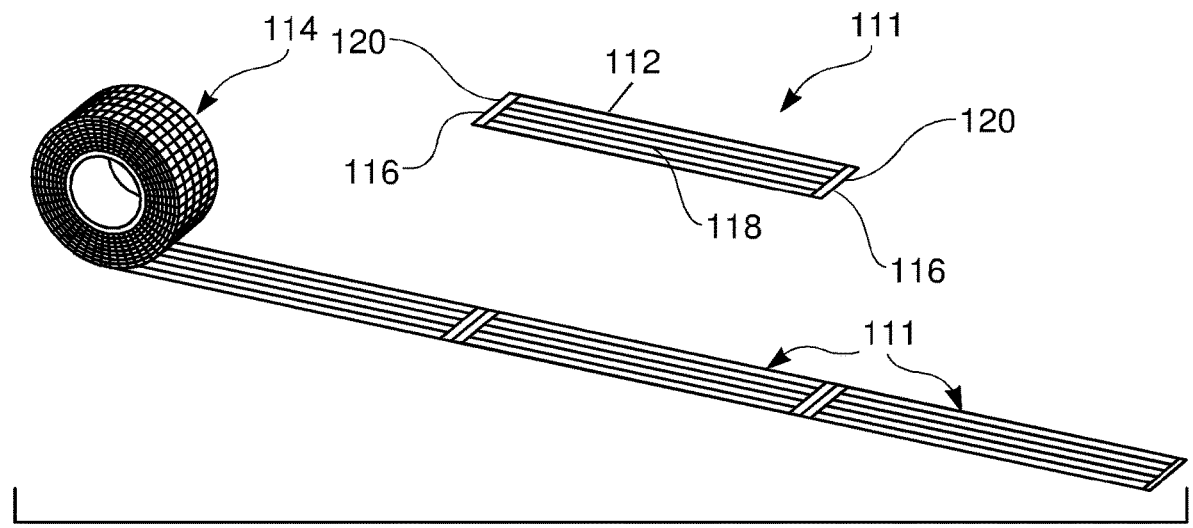
FIG. 8A is a perspective view of a smart tape including the embedded sensor network of the present technology.

Referring to FIG. 8A, the present technology can be in the form of smart packaging tape 111 including segments 112 supplied in a roll 114. Each segment 112 can include one or more smart tape end contacts sensor hubs 116 at each end thereof, and a wired and/or wireless sensor network 118 embedded therein or incorporated therewith. A wireless antenna 120 can be included with each of the contacts sensor hubs 116, to provide wireless communication with remote electronic devices or components.

Figure 8B:
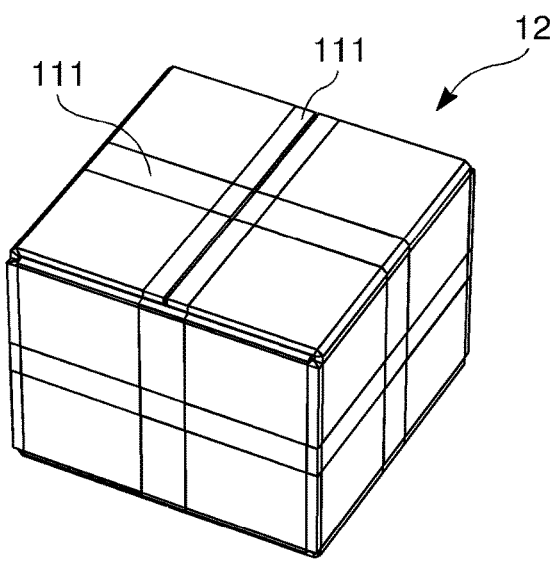
FIG. 8B is a perspective view of a sensor network with the interior and/or exterior of the package of the present technology.

It can be appreciated that the tape 111 can be used to secure edges or closure flaps of the package 12, as best illustrated in FIG. 8B, with lengths of the tape 111 being implemented so that at least one end contact sensor hub 116 is intact and useable.

Figure 9:
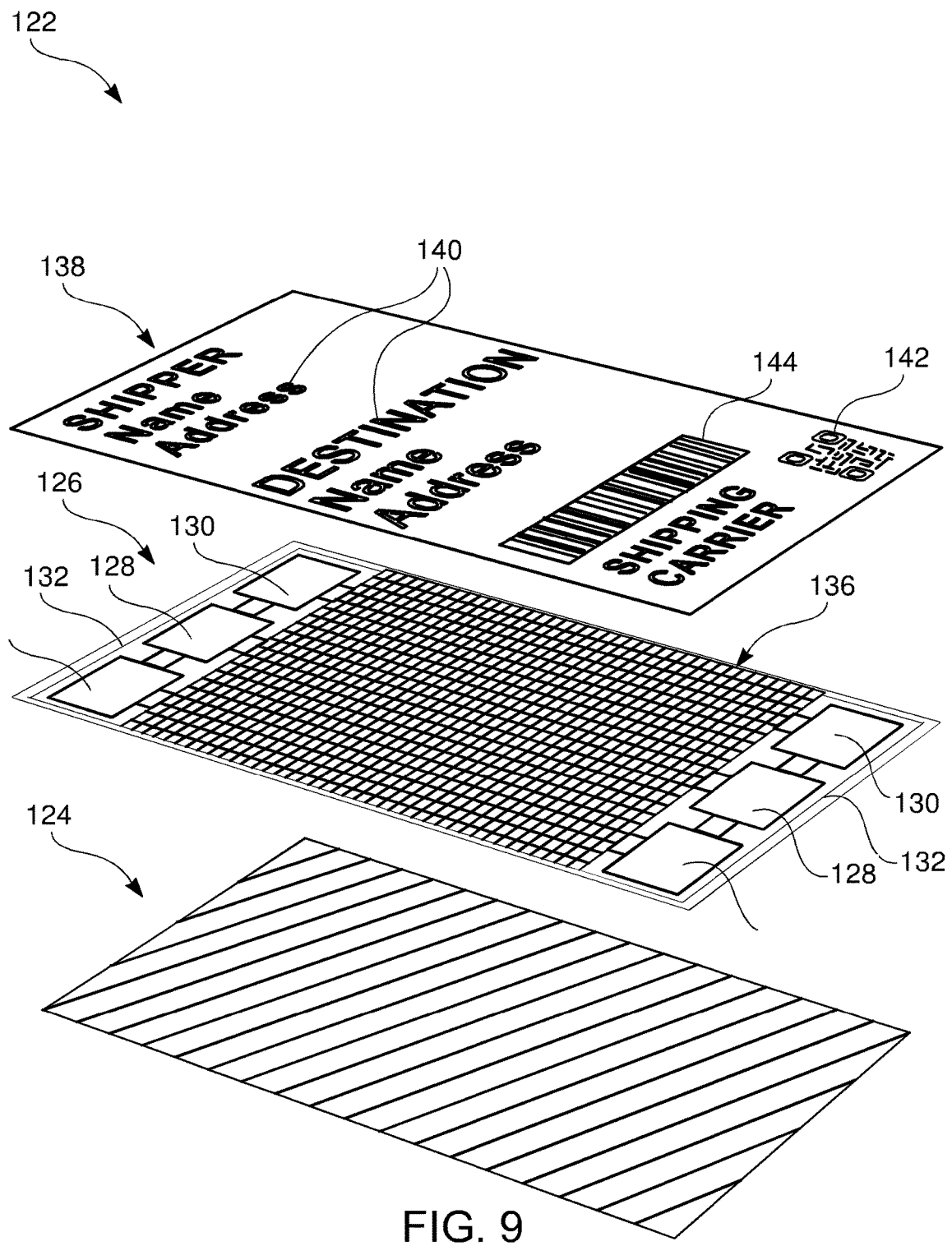
FIG. 9 is an exploded perspective view of the layers included with a single use attachable smart label that is printer friendly, including embedded sensors, and networking of the present technology.

Referring to FIG. 9, the present technology can be utilized with or as an attachable single use smart label 122 that can be printer friendly. The smart label 122 can include an attachment or adhesive layer 124 capable of securing the smart label 122 to a package.

Adjacent to adhesive layer 124 can be an electronics and power layer 126 including at least one central processing unit (CPU) or processor 128 located on at least one edge, a voice/data wireless communications module 130 operably connected to the CPU 128, a wireless antenna 132 operably connected to the communications module 130, a power source or battery 134 operably connected to the CPU 128, and/or a conductive fabric or textiles mesh sensor 136 operably connected to the CPU 128, the communications module 130 and/or the power source or battery 134.

Adjacent to the electronics and power layer 126 is a printable cover layer 138 that can include printed content, information and/or a logo 140, a Radio-frequency identification (RFID) tag 142, and/or a bar code 144. It can be appreciated that the adhesive layer 124, the electronics and power layer 126 and the printable cover layer 138 together can form the smart label 122. With the smart label 122 being attachable to the package.

Figure 10:
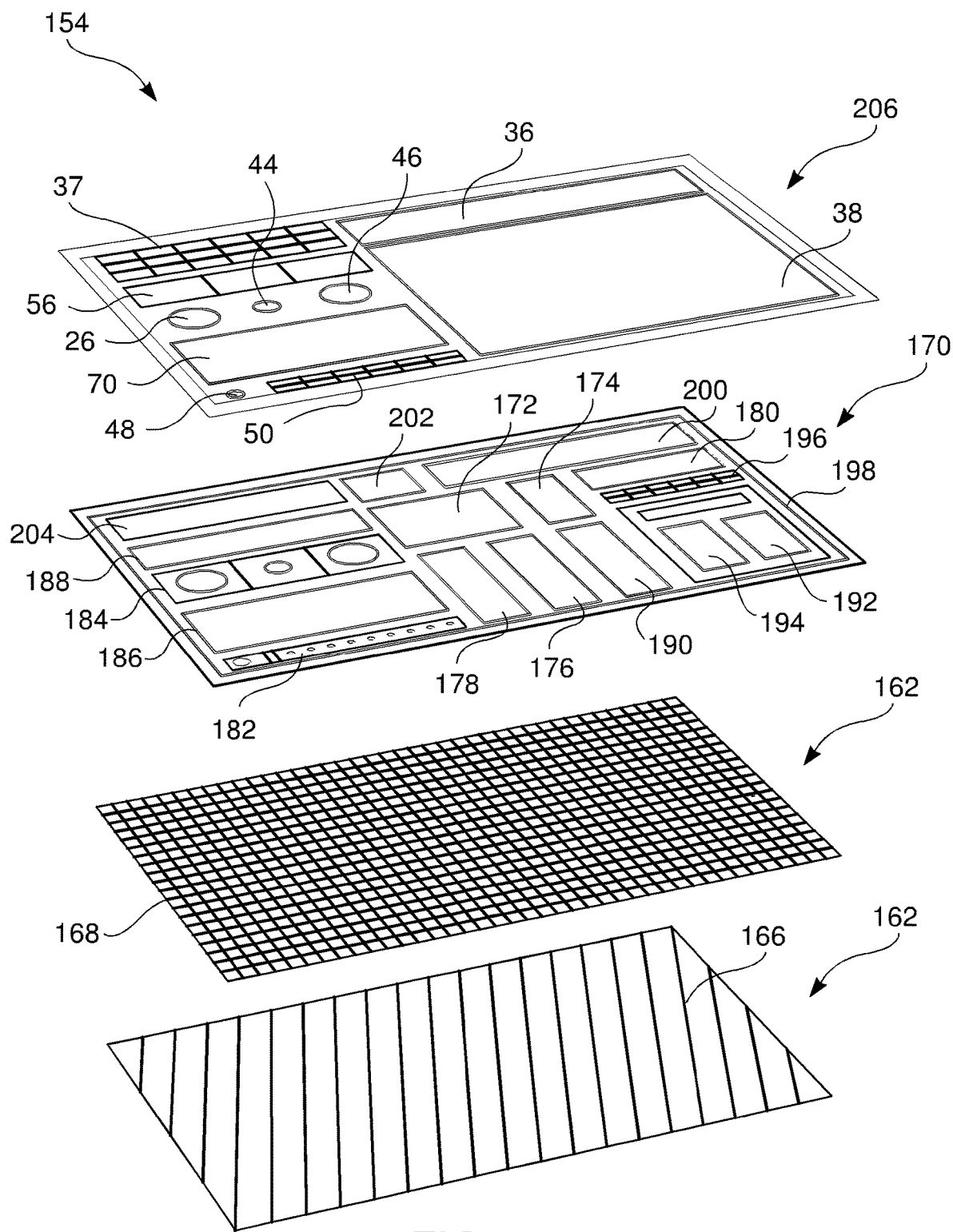
FIG. 10 is an exploded perspective view of the layers included with multi-use attachable smart label with touchscreen and biometrics systems of the present technology.

Referring to FIG. 10, the present technology can be utilized with or as an attachable multi-use smart label 154. The smart label 154 can include an attachment or adhesive layer 162 including an adhesive 164 capable of securing the smart label 154 to a package.

Adjacent to adhesive layer 154 can be an electronics and power layer 170 including at least one central processing unit (CPU) or processor 172 operably connected with components, such as but not limited to, a high-definition multimedia interface (HDMI)/video card 174, a flash memory storage/RAM 176, a replaceable flash memory 178, a touchscreen/UI/display module 180, a microphone/speaker audio driver 182, a camera/imagining sensor/video driver module 184, a finger print scanner module 186, an environmental sensors module 188, a subscriber identification module (SIM) card 190, a Global Navigation Satellite System (GNSS)/Global Positioning System (GPS) module 192, a voice/data wireless communications module 194, orientation sensors 196 such as but not limited to an accelerometer, gyroscope, altimeter, compass, etc., a wireless antenna 198, a battery 200, a power management module 202, and/or a power induction module 204.

Adjacent to the electronics and power layer 170 is an interfacing layer 206 that can include components, such as but not limited to, a camera 26, a charging pad 36, a solar panel or cell 37, an IR sensor 44, an IR/near IR light 46, a microphone 48, a speaker 50, temperature, humidity and environmental sensors 56, a finger print scanner 70, and a touchscreen 38.

Figure 11A:
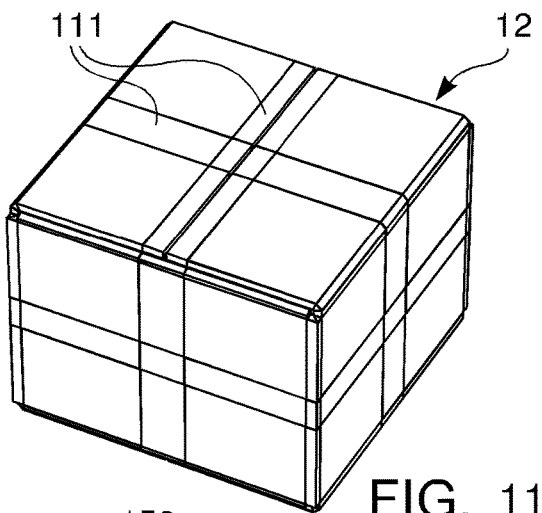
FIGS. 11A-F is perspective views of the package including the smart tape, the single use attachable smart label, a multi-use attachable smart label with touch pad/button array and associated with the smart tape, and a multi-use attachable smart label with touchscreen and biometrics systems of the present technology.
Figure 11B:
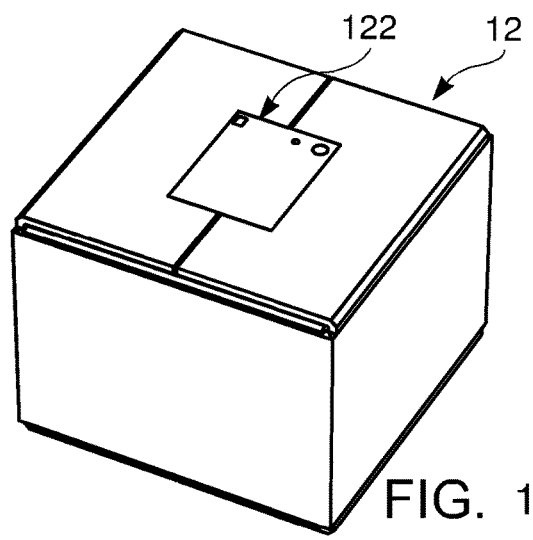
Figure 11C:
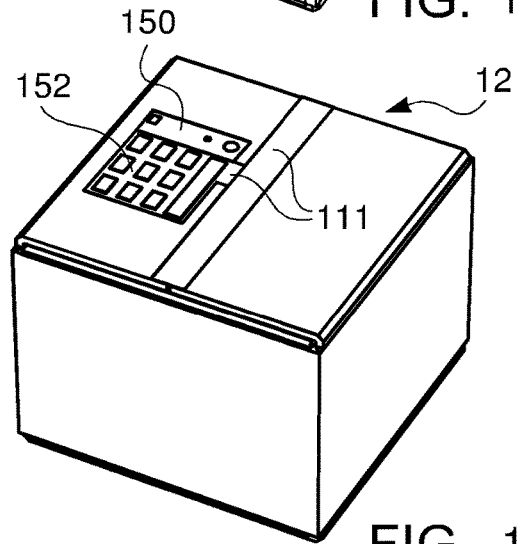
Figure 11D:
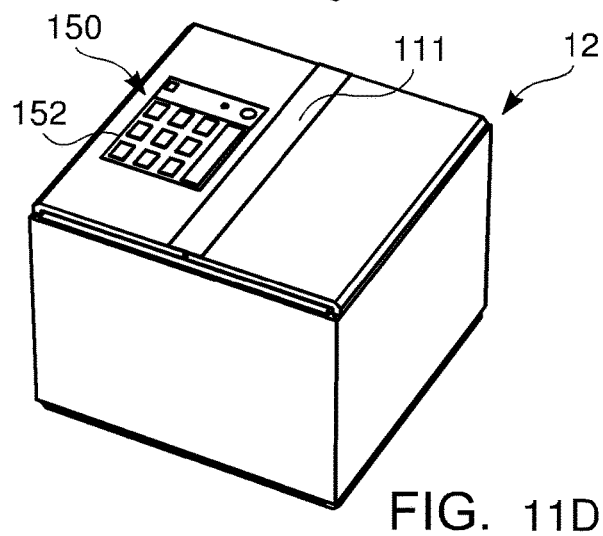
Figure 11E:
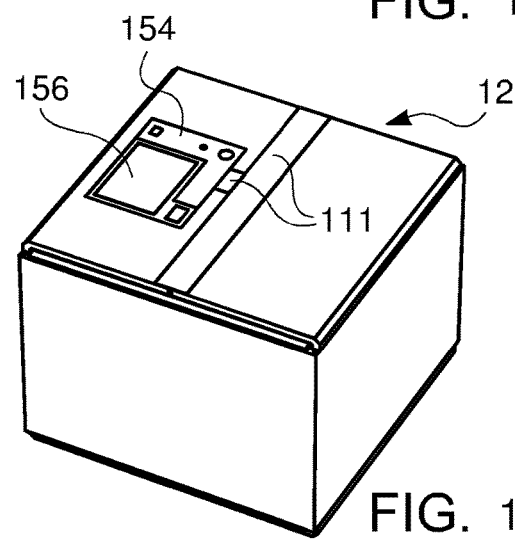
Figure 11F:
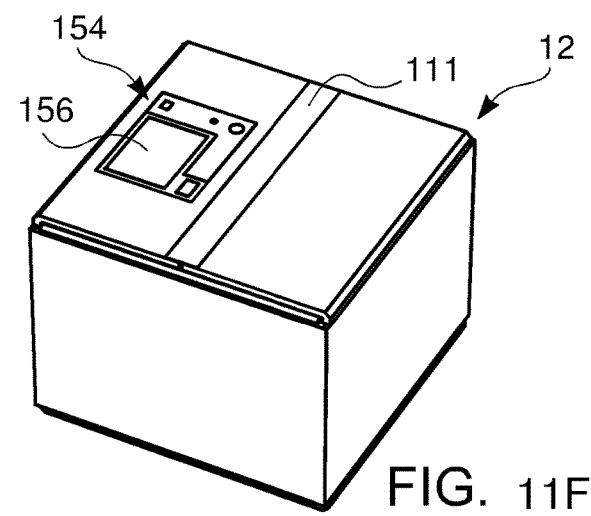

Referring to FIGS. 11A-F, in some embodiments the package 12 can include or be utilized with embodiments of the present technology. The smart tape 111 can be used to seal edges or flaps of the package, as illustrated in FIG. 11A. The single use smart label 122 can be attached to the package, as illustrated in FIG. 11B. An attachable multi-use smart label 150 in communication with the smart tape 111 can be used with the package, as illustrated in FIG. 1C. The multi-use smart label 150 can include a touch pad and/or button array 152. The multi-use smart label 150 can be in wireless communication with the smart tape 111, as illustrated in FIG. 1D. An alternative attachable multi-use smart label 154 in communication with the smart tape 111 can be used with the package, as illustrated in FIG. 11E. The multi-use smart label 154 can include a screen, display, touchscreen, fingerprint reader, biometrics scanner and/or imagining 156. The multi-use smart label 150 can be in wireless communication with the smart tape 111, as illustrated in FIG. 11F.

Figure 12A:
FIG. 12A is front side view of the single use attachable smart label of the present technology.

The attachable single use smart label 122, as illustrated in FIG. 12A, can include a printable cover layer 138 including printed content, information and/or a logo 140, a Radio-frequency identification (RFID) tag 142, and/or a bar code 144.

Figure 12B:
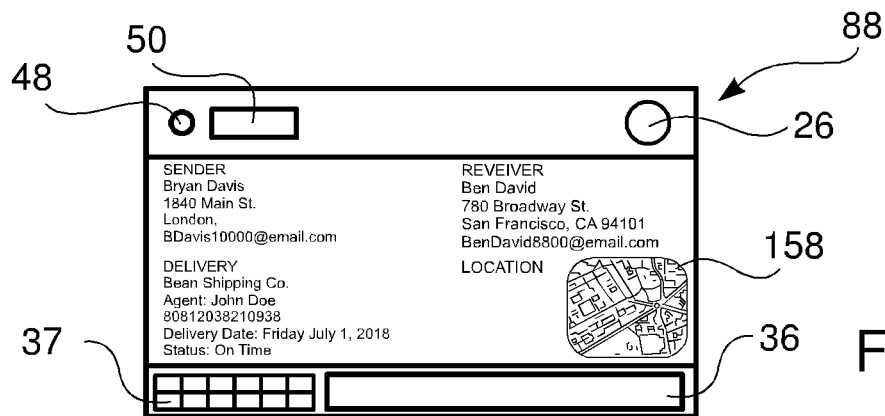
FIG. 12B is front side view of the multi-use attachable smart label with lower power display of the present technology.

The attachable multi-use smart label 88, as illustrated in FIG. 12B, can include components, such as but not limited to, a low power non-interactive user interface or graphic content display 158, a camera 26, a charging pad 36, a solar panel or cell 37, a microphone 48, and/or a speaker 50.

Figure 12C:
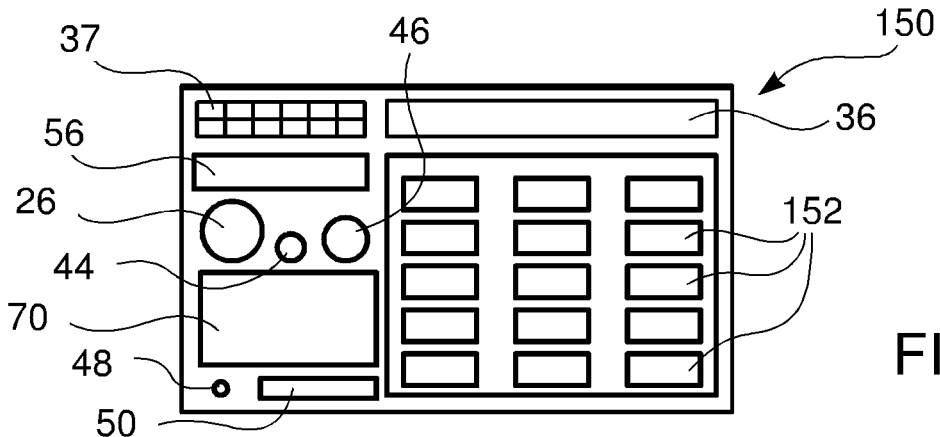
FIG. 12C is front side view of the multi-use attachable smart label with touch pad/button array of the present technology.

The attachable multi-use smart label 150, as illustrated in FIG. 12C, can include a camera 26, a charging pad 36, a solar panel or cell 37, an IR sensor 44, an IR/near IR light 46, a microphone 48, a speaker 50, temperature, humidity and environmental sensors 56, a finger print scanner 70, and a button array 152.

Figure 12D:
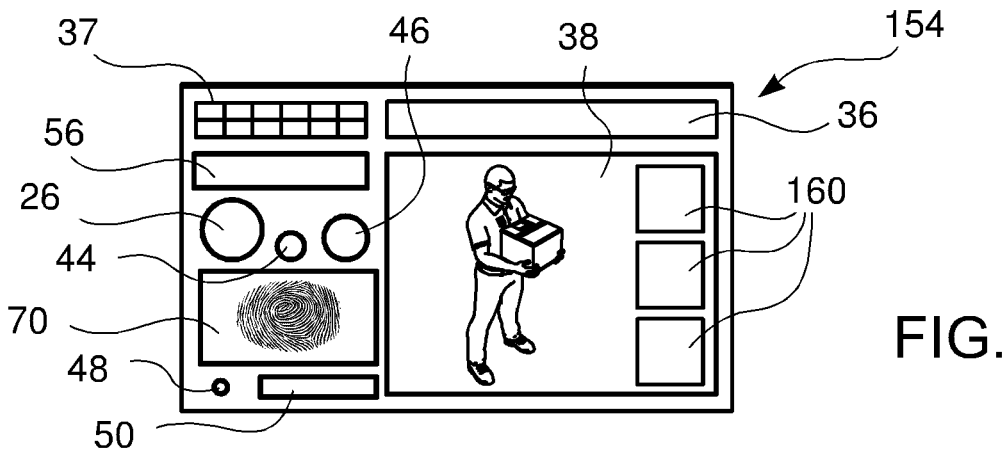
FIG. 12D is front side view of the multi-use attachable smart label with touchscreen and biometrics systems of the present technology.

The attachable multi-use smart label 154, as illustrated in FIG. 12D, can include components, such as but not limited to, a camera 26, a charging pad 30, a solar panel or cell 36, an IR sensor 44, an IR/near IR light 46, a microphone 48, a speaker 50, temperature, humidity and environmental sensors 56, a finger print scanner 70, and/or a touchscreen 38. The touchscreen 38 can utilize touchscreen icons or interface 160.

Figure 13:
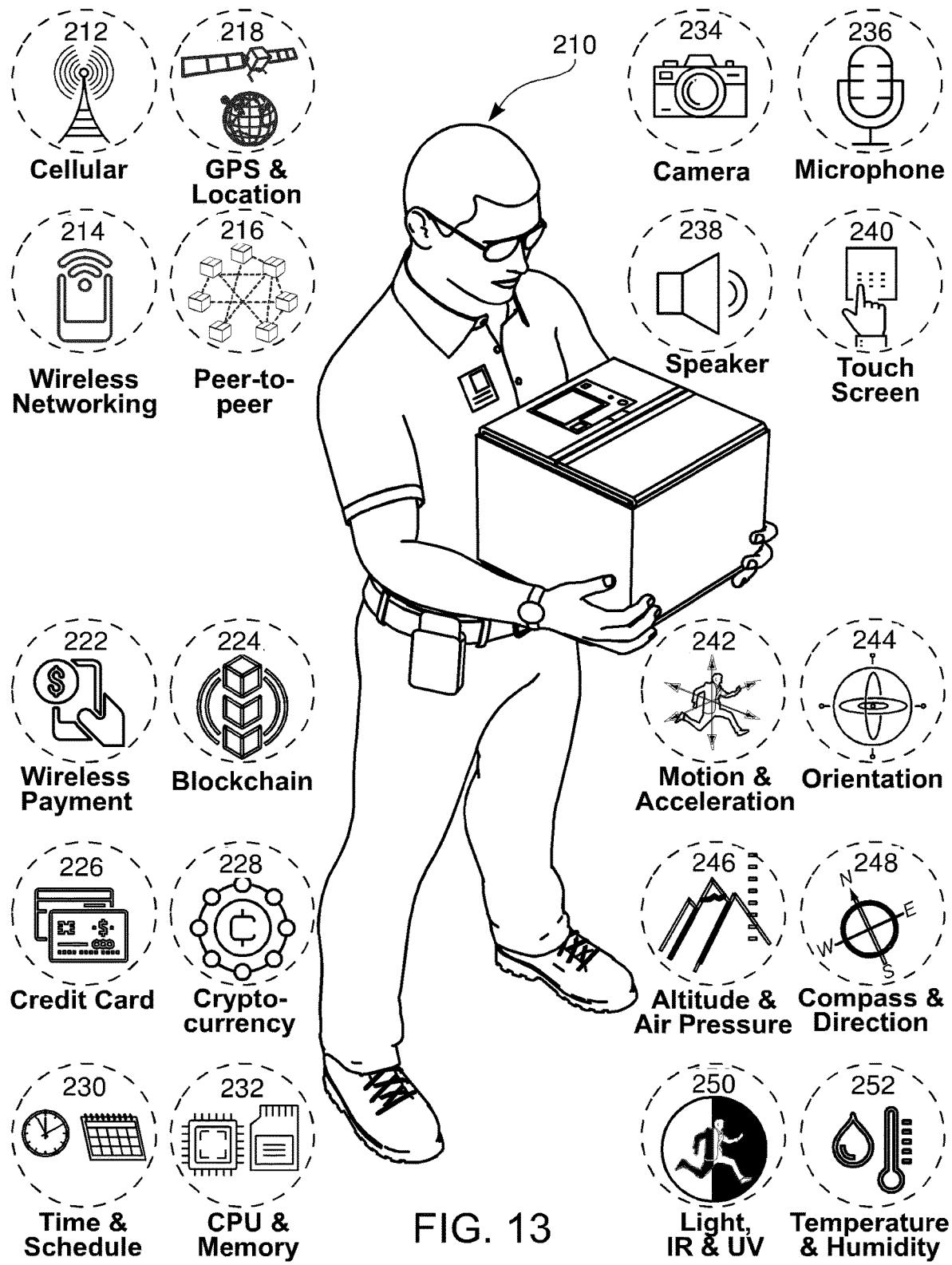
FIG. 13 is a perspective view of the package being carried and/or viewed by a person, and utilizing features of the present technology.

Referring to FIG. 13, a person 210 utilizing the package monitoring system and method 10 of the present technology can be, but not limited to, a shipping or delivery person, a recipient of the package, a handler of the package and/or any person authorized to gain entry into or acquire information regarding the package. The touchscreen or display utilized with the embodiments of the present technology can include actuatable icons or interfaces. These icons or interfaces can be associated with, but not limited to, cellular communications 212, wireless networking (Wi-Fi, Bluetooth, Bluetooth Low Energy (BLE), Radio Frequency (RF), ANT, SigFox, ZigBee, Narrowband Internet of Things (NB-IoT), Radio Frequency for Consumer Electronics (RF4CE), Near-field communication (NFC), RFID, or similar) 214, peer-to-peer networking 216, GPS Location 218, secure wireless networked device authentication 220, wireless payments 222, credit card payments 226, blockchain 224, cryptocurrency 226, time and schedule 230, CPU and memory 232, video or still camera 234, microphone 236, speaker 238, touchscreen Display 240, motion & acceleration 242, orientation 244, altitude & air pressure 246, compass & direction 248, light IR & UV 250, and/or temperature & humidity 252. Many of these technologies support a combination of star, mesh and peer to peer topologies, or a hybrid of any of the above.

Figure 14:
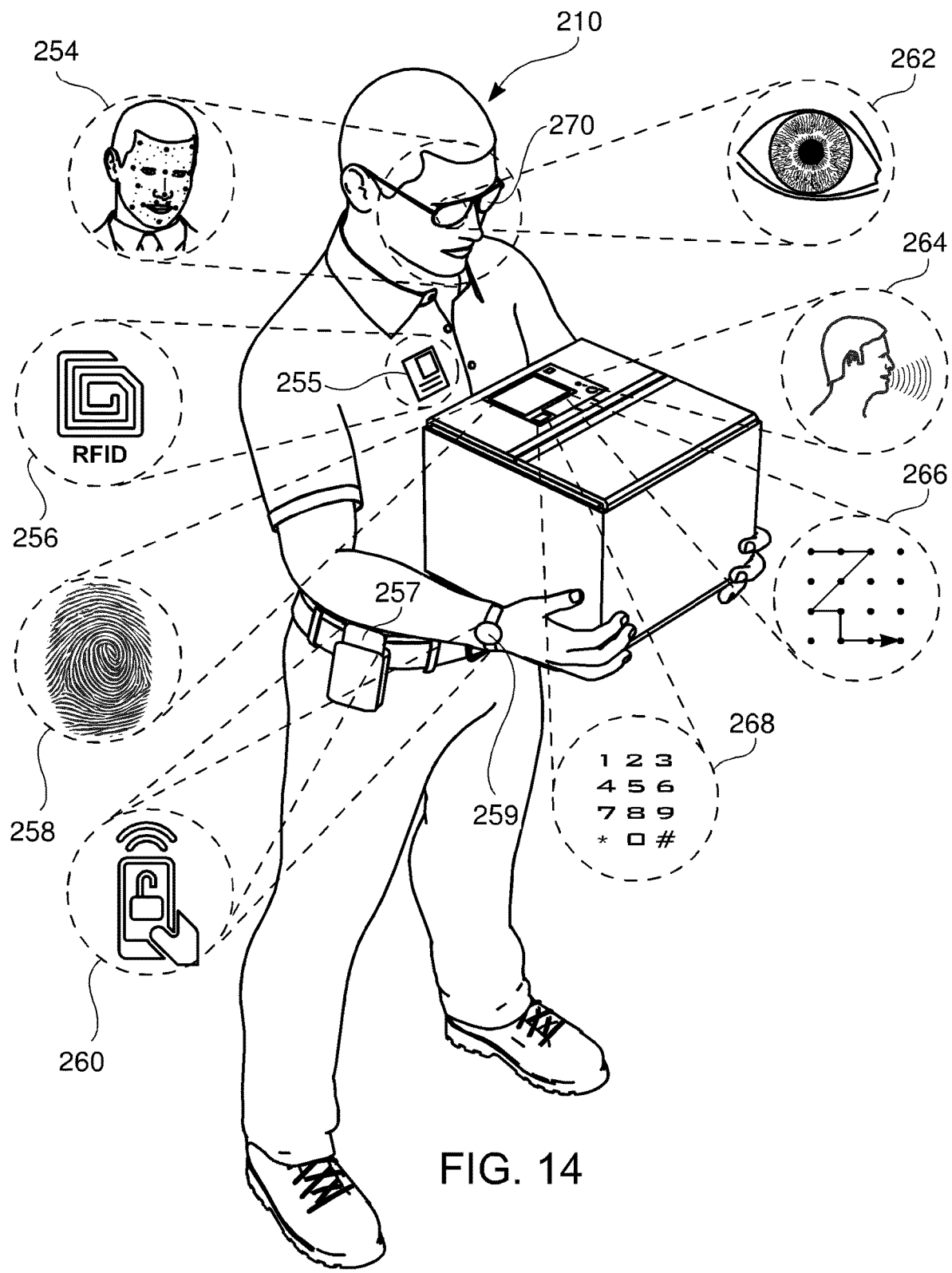
FIG. 14 is a perspective view of the package being carried and/or viewed by a person, and utilizing biometrics and/or security features of the present technology.

Referring to FIG. 14, in some embodiments, the package monitoring system and method 10 of the present technology may also record the worker IDs of persons 210 who are in close proximity to the smart package or interacting with the package. This may be done by means of RFID or other transmitters in ID badges 255, with time and GPS position stamps automatically recorded with the ID data. The recording of shipping worker IDs can also be triggered by actions such as the package being picked up or moved, dropped, or opened. Smart packages or remotely linked external sensors can also be programmed to recognize individuals at specific points in a package's transit, such as when it is delivered or transferred between shipping workers, such as from one a depot worker to a truck driver. Said individuals may be identified by facial recognition 254, RFID 256, fingerprint recognition 258, secure wireless networked device authentication 260, eye/iris recognition 262, voice command/voice recognition 264, pattern authentication 266, alpha-numeric keypad/passcode 268, glasses/smartglasses 270, GPS, Cellular or smart phones 255, watches or smart watches 259, Wi-Fi, Bluetooth, NFC tags or other tags, devices or sensors means. Persons sending a package, such as an online gift-purchaser or business have the option of uploading the photos of individuals authorized to receive said package. Recipient identification and authentication may also be used for recording the delivery of legal documents.

Figure 15A:
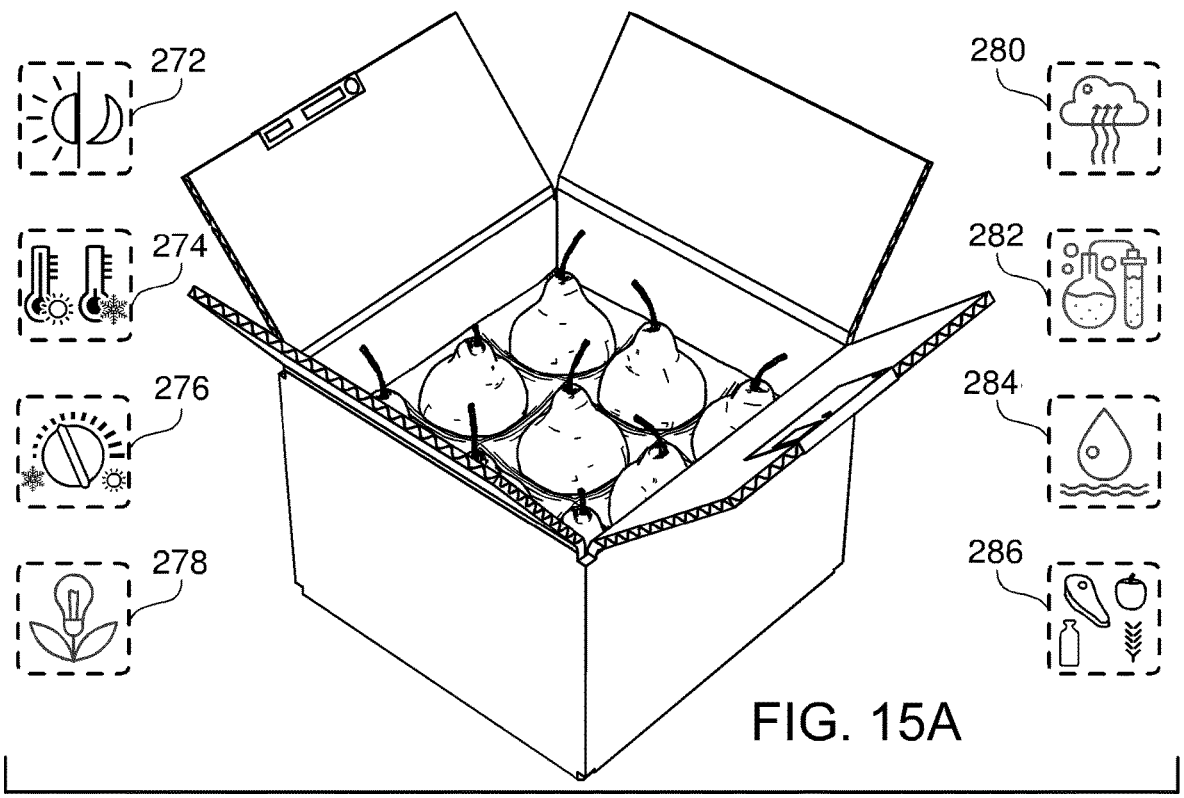
FIG. 15A is a perspective view of an open package with perishable items and utilizing sensors of the present technology.

The package utilizing package monitoring system and method 10 of the present technology can be used to transport perishable goods, as best illustrated in FIG. 15A. Perishable goods, such as but not limited to food and dairy products, are susceptible to changing environmental conditions during transport. The present technology can include light, IR & UV sensors 272, temperature & humidity sensors 274, temperature monitoring and control systems 276, electricity/light/power control systems 278, gas measurement and control systems 280, chemical composition measurement and control systems 282, humidity monitoring and control systems 284, and/or biological content verification and control systems 286.

Figure 15B:
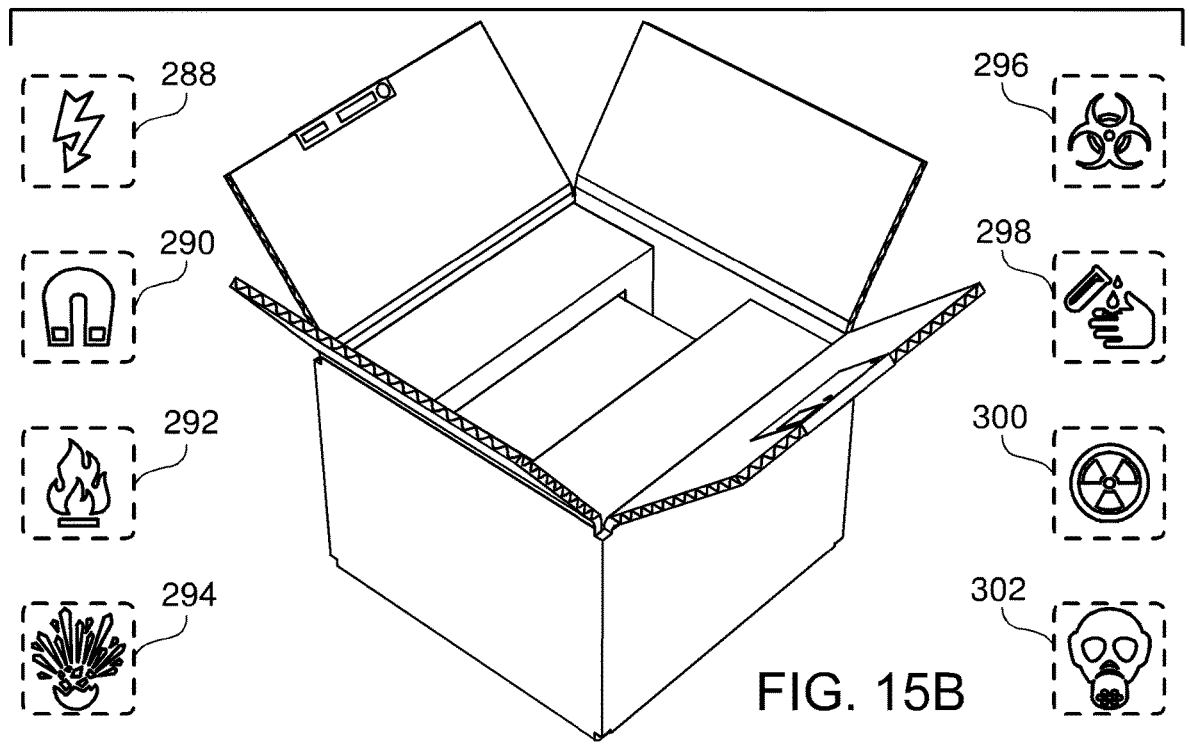
FIG. 15B is a perspective view of an open package receiving an item and utilizing sensors of the present technology.

The package utilizing the package monitoring system and method 10 of the present technology can be used to transport non-perishable goods, as best illustrated in FIG. 15B. Non-perishable goods, such as but not limited to electronic components and chemical products, are susceptible to changing environmental conditions during transport. The present technology can include components, such as but not limited to, electricity monitoring systems 288, electromagnetic monitoring systems 290, fire monitoring systems 292, explosive/combustion monitoring systems 294, biohazard/chemical monitoring systems 296, acid/corrosive substance monitoring systems 298, radiation monitoring systems 300, and/or poisonous gas monitoring systems 302.

Figure 16A:
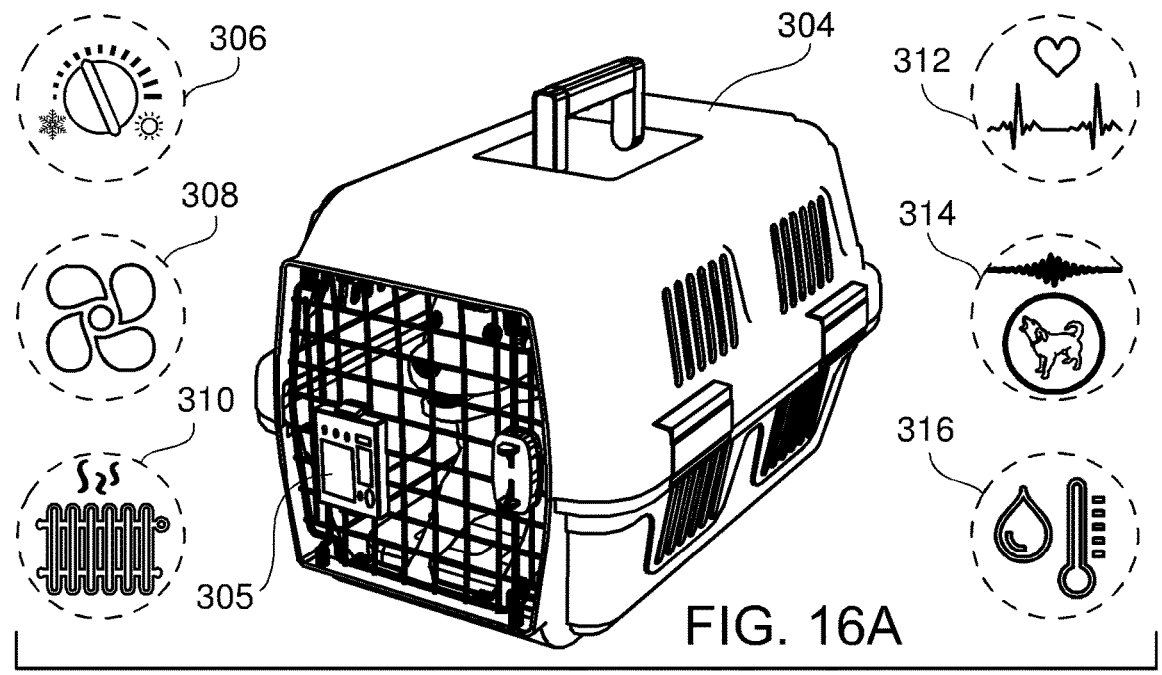
FIGS. 16A and 16B are perspective views of the package in the form of an animal crate with the gate in the open and closed position and utilizing a smart pet carrier computing hub with external and internal monitoring modules of the present technology.
Figure 16B:
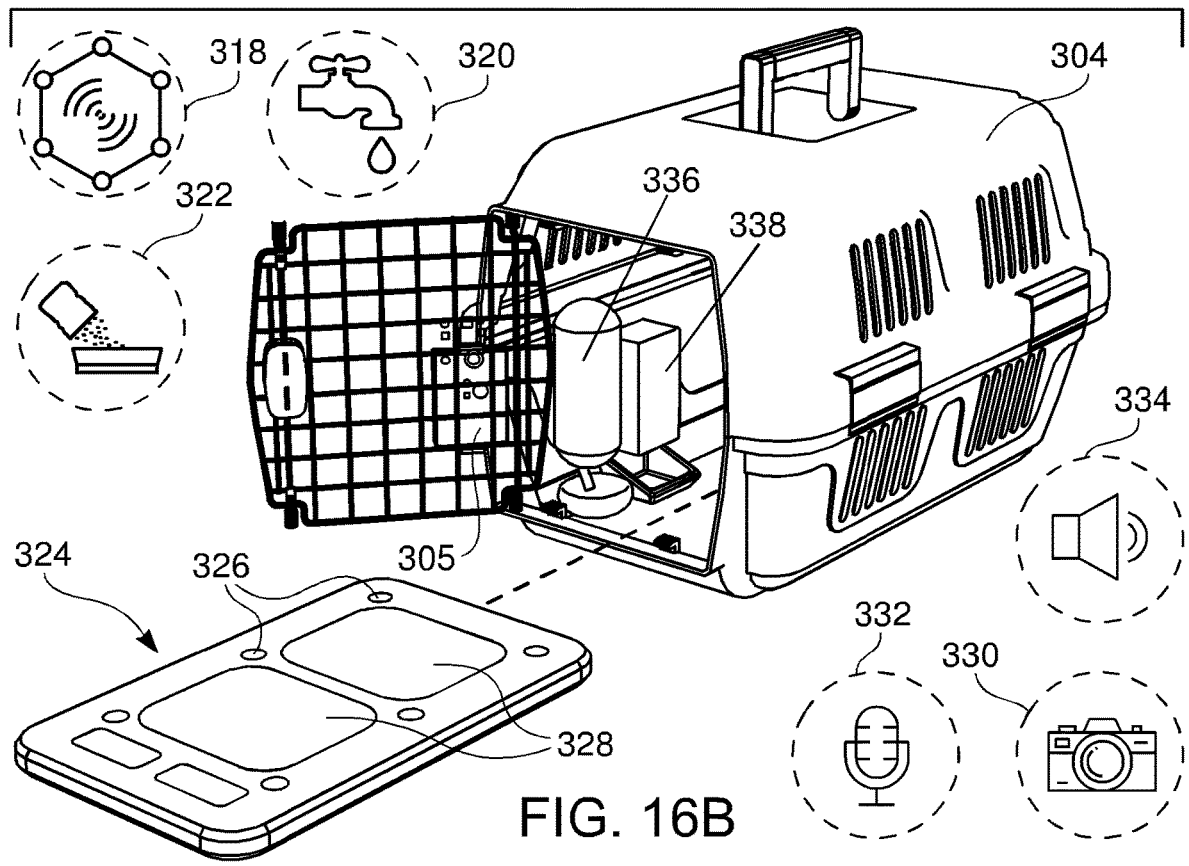

FIGS. 16A-B illustrates an example of the package or enclosure in the form of a smart animal crate 304 including a smart pet carrier computing hub 305 of the present technology. The pet carrier computing hub 305 can be attachable to or incorporated with a door or grate of the crate. The electronics and sensors including with the smart animal crate 304 are configured or configurable to detect a condition, such as but not limited to, opening the door or gate of the crate 304. The smart animal crate 304, as illustrated in FIG. 16A, can be configured or configurable to include components, such as but not limited to, temperature monitoring and control systems 306, a cooling system 308, a heating system 310, a heart/health monitoring system 312, a noise recognition system 314, and/or an animal body temperature/hydration monitoring system 316.

The smart animal crate 304, as illustrated in FIG. 16B, can including components, such as but not limited to, an Internet of Things (IoT)/networking and control system 318, a water dispensing control system 320, a food dispensing control system 322, a smart animal mat 324, a camera 330, a microphone 332, a speaker 334, a networked water dispenser 336, and/or a networked food dispenser 338. The smart animal mat 324 can be configured to be located on a floor of the smart animal crate 304, and can include biometric sensors 326, and/or heating and cooling pads 328. The biometric sensors 326 can be IR, optical, electroencephalography (EEG) and/or hear rate sensors. The networked water dispenser 336 and the networked food dispenser 338 are configured or configurable to be attached to a wall, floor, ceiling or grate of the crate 304, and be activated by receiving a remote signal.

Figure 17A:
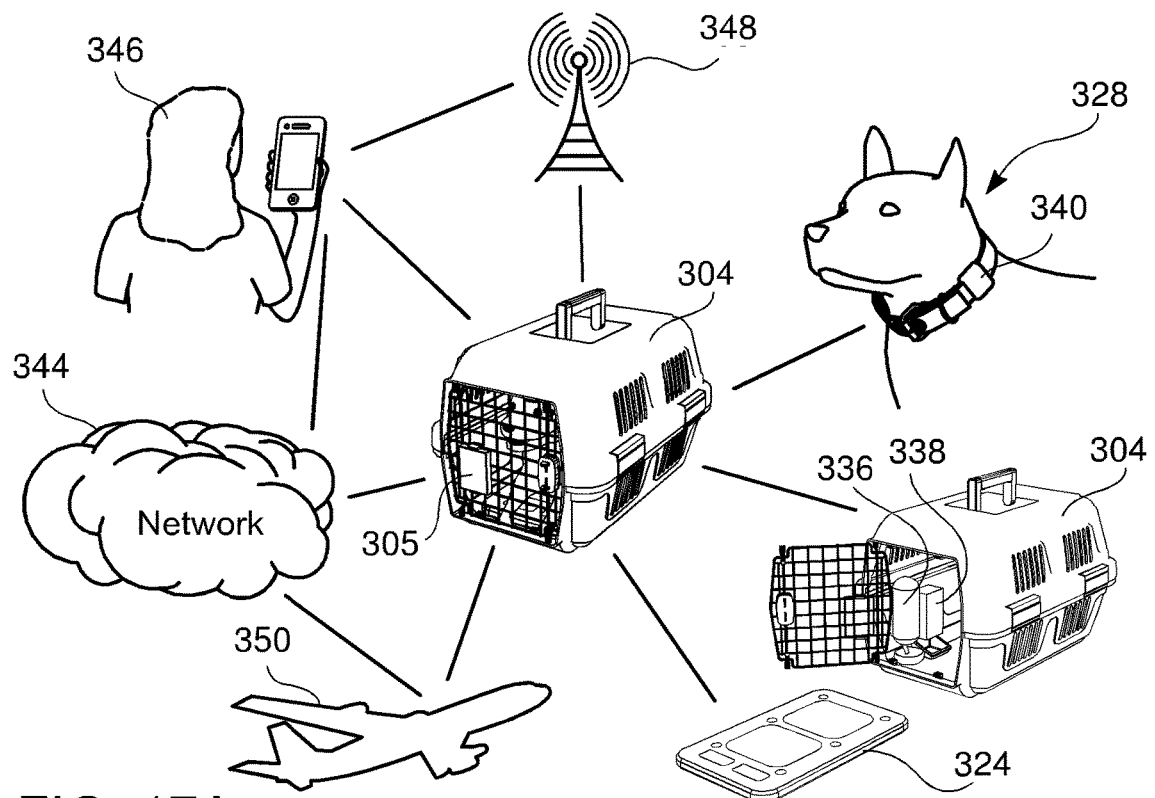
FIGS. 17A and 17B illustrates exemplary electronic computing devices that may be utilized with a network in communication with the animal crate package utilizing an embedded or attachable smart pet carrier computing hub of the present technology.
Figure 17B:
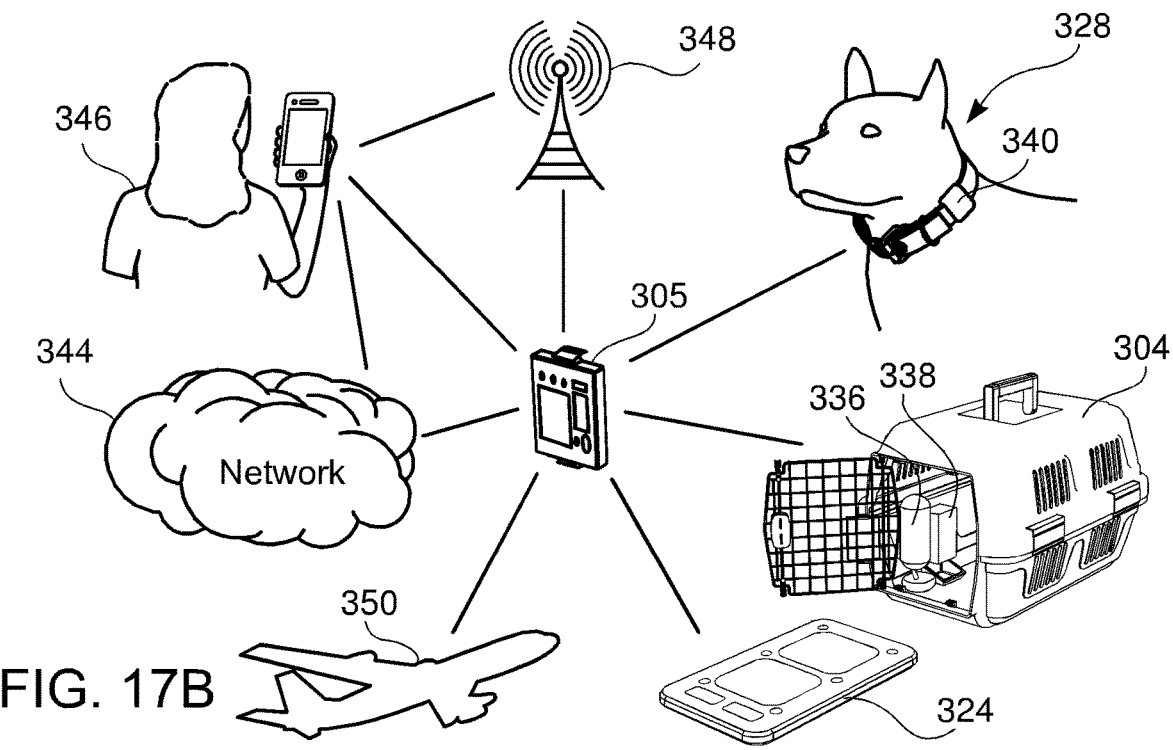

Referring to FIGS. 17A-B, in some embodiments, the smart animal crate 304 and/or the pet carrier computing hub 305 may communicate with another smart crate 304, another pet carrier computing hub 305, another smart animal mat 324, a smart animal collar 340 on an animal 342, a network hub or server 344, a portable electronic device 346, a cellular system or device 348, and/or a transport vehicle computer system 350. The network hub or server 344 can also be in communication with the portable electronic device 346 and the transport vehicle 350. The portable electronic device 346 can also be in communication with the cellular system or device 348. It can be appreciated that the pet carrier computing hub 305 can be replaced or interchangeable with the electronics and sensor unit 20.

Figure 18A:
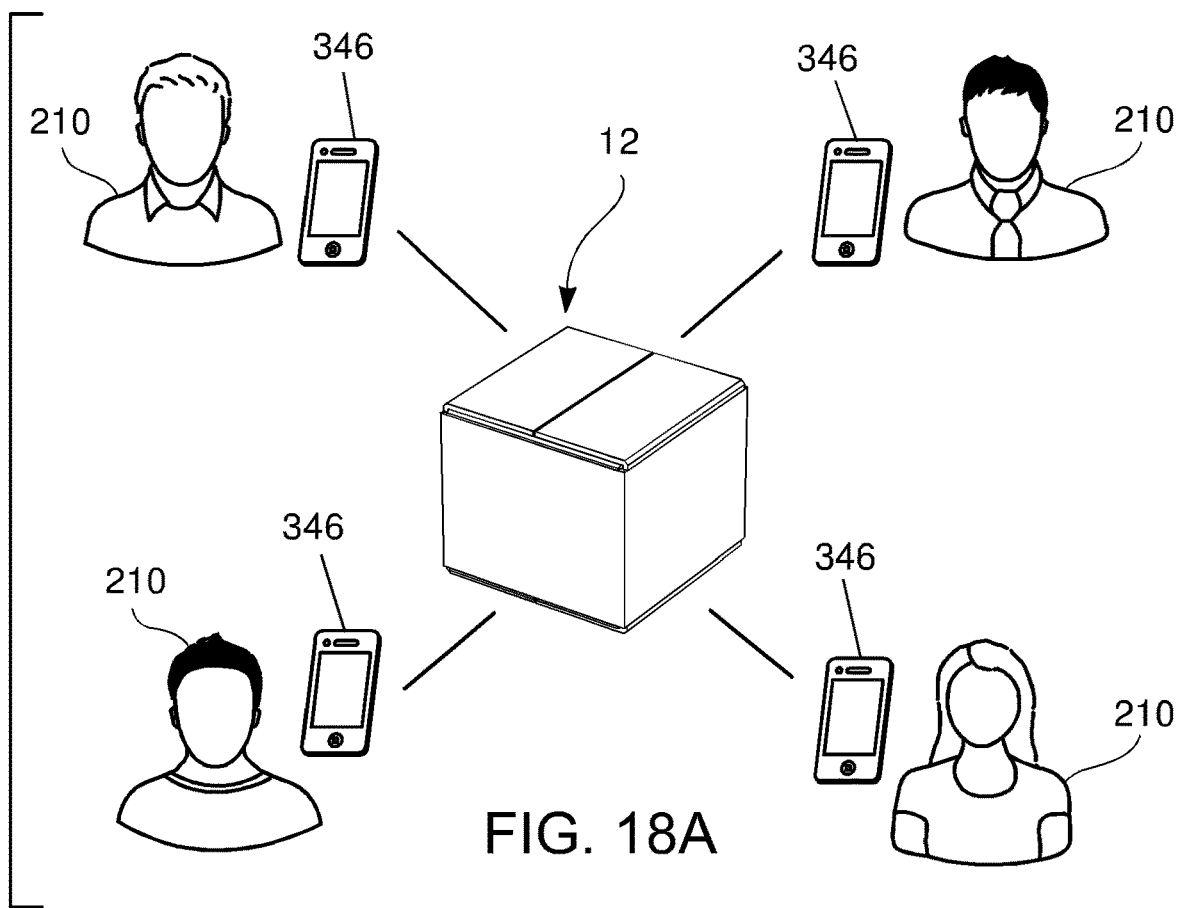
FIG. 18A illustrates exemplary electronic computing devices of users that may be utilized in communication with the package of the present technology.
Figure 18B:
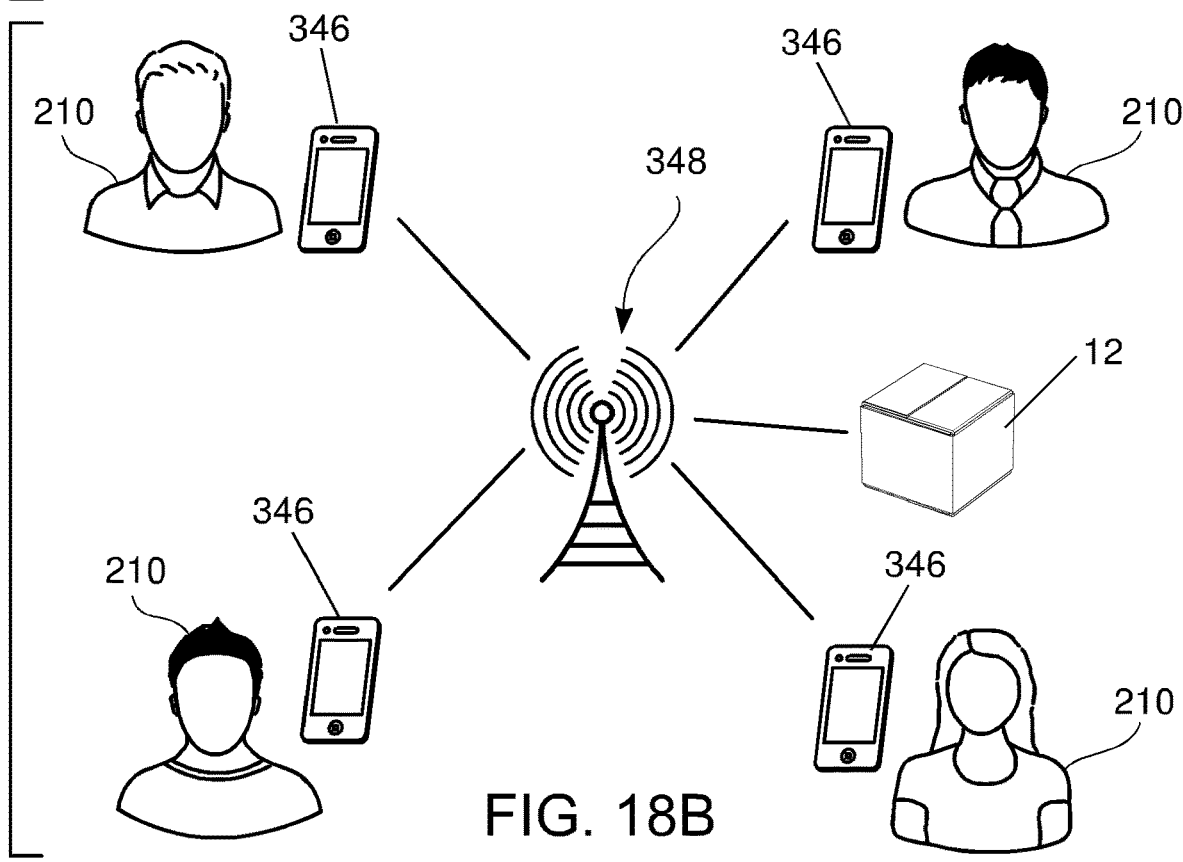
FIG. 18B illustrates exemplary electronic computing devices of users that may be utilized with a cellular network in communication with the package of the present technology.

Referring to FIG. 18A, in some embodiments, users may communicate directly with the electronics and sensor unit 20 of the smart package 12 utilizing external devices 346, such as but not limited to, a smartphone, table, laptop, computer, personal digital assistant or personal data assistant (PDA), a mobile electronic device, and the like. FIG. 18B, in some embodiments, users may communicate directly with the electronics and sensors of the smart package utilizing external devices 346 by way of a cellular or wireless system 348.

Figure 19A:
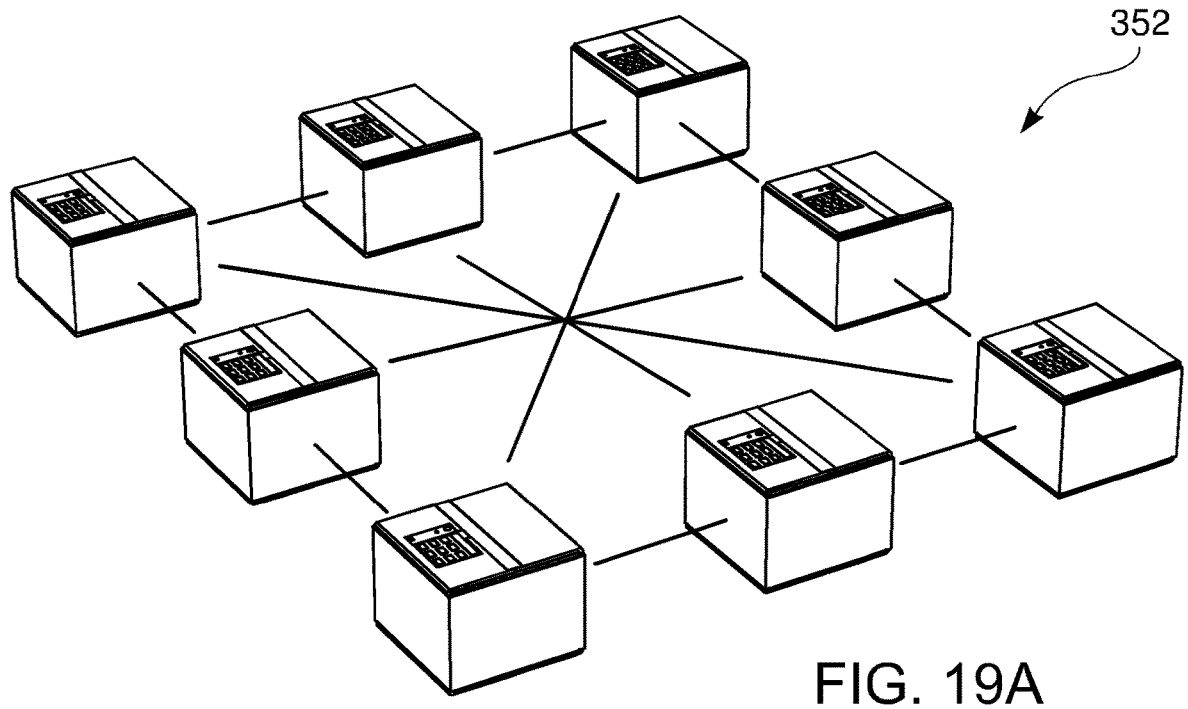
FIGS. 19A and 19B is a perspective view of a plurality of packages of the present technology in communication with each other or utilizing a network.
Figure 19B:
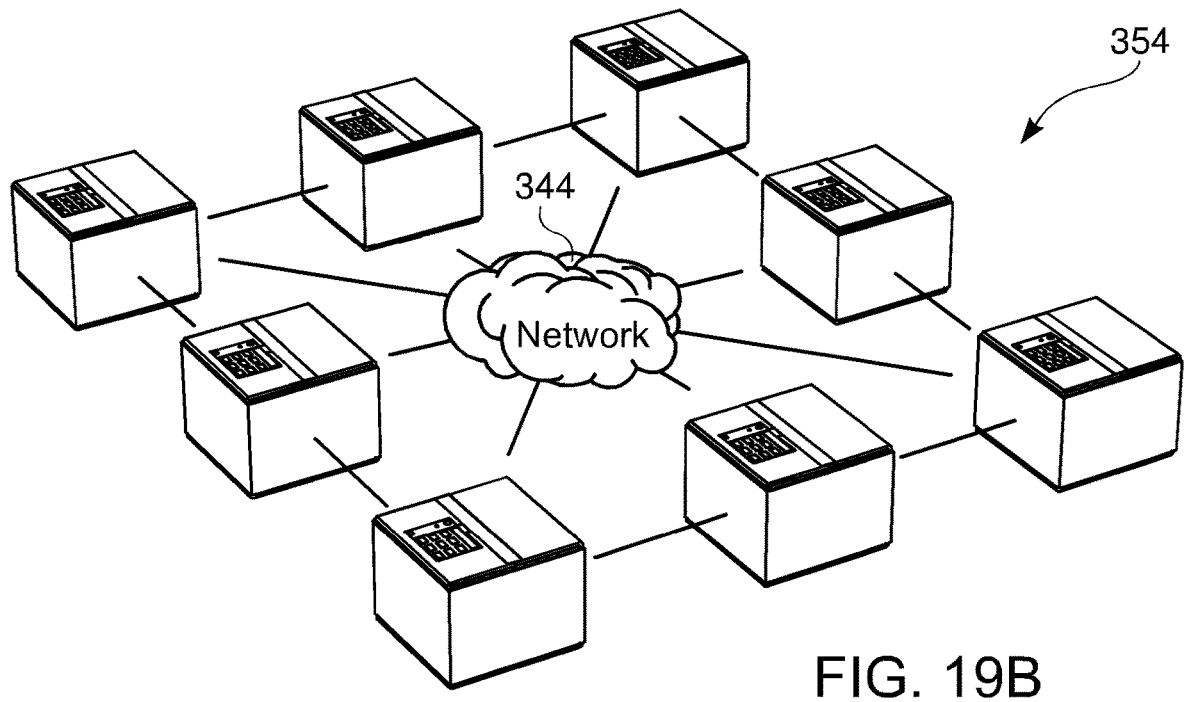

Referring to FIG. 19A, in some embodiments, the network modules of the electronics and sensor unit 20 of the smart packages 12 may communicate directly with each other by way of an ad-hoc peer-to-peer smart package communications network 352. The sensor modules or labels can be configured as a node capable of communicating with another node of another sensor module of another shipping package or with a sensor hub. Thus creating a wireless sensor network with the node and the another node or sensor hub, a smart package platform/network 344. The shipping status message can be configured to comprise an alert indicating that communications between one of the nodes changes in direction, intensity or is disconnected from the network.

Figure 20A:
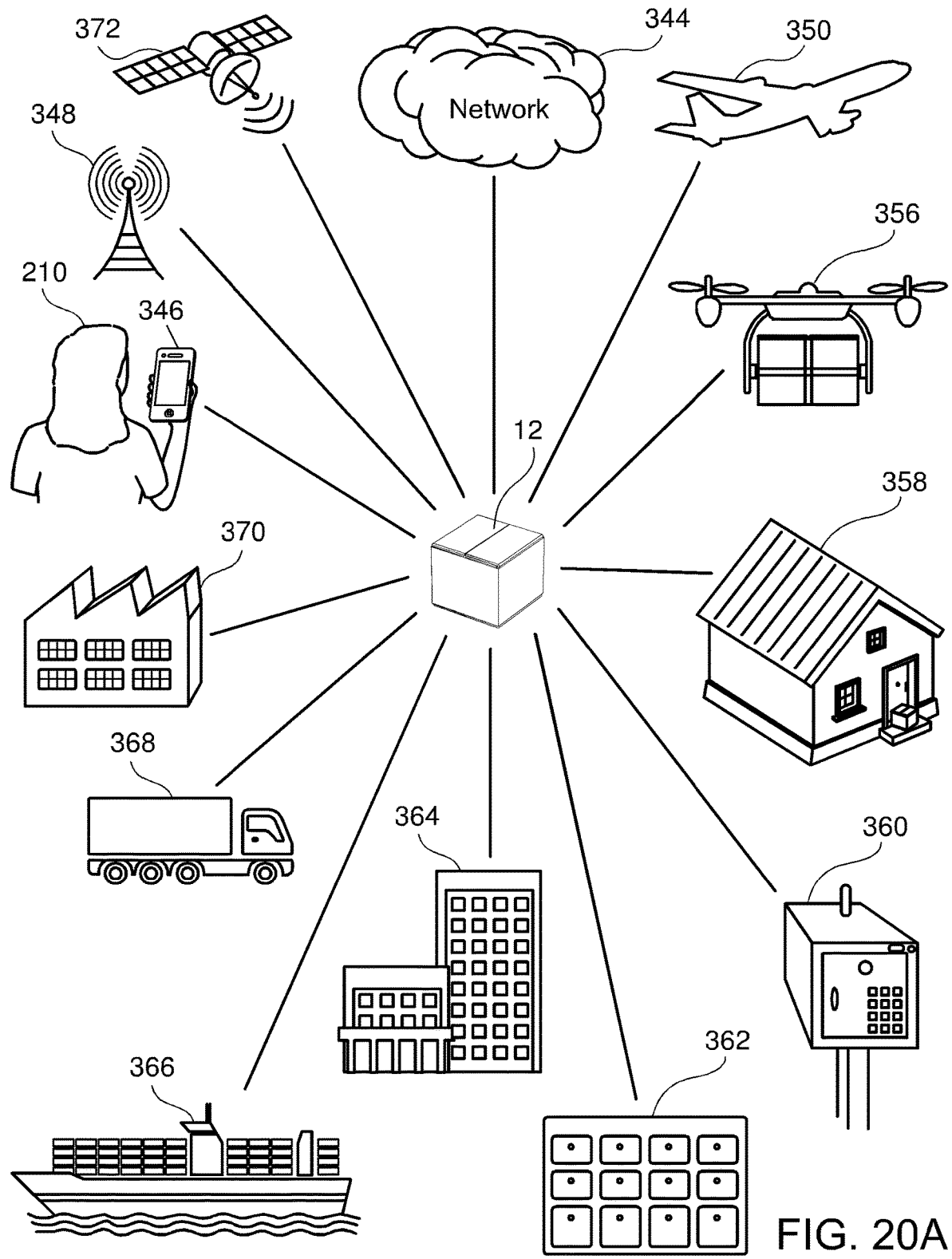
FIG. 20A illustrates exemplary electronic computing devices that may be utilized in communication with the package of the present technology.

In some embodiments, as illustrated in FIG. 20A, the smart packages 12 may communicate directly with a network hub or server 344, a portable electronic device 346, a cellular system or device 348, an airplane computer system 350, a delivery drone/UAV computer system 352, a delivery or pick-up location system 358, a mail box system 360, a mail/delivery station/store system 362, a building/office system 364, a delivery truck/vehicle 368, a shipping center/warehouse system 370, and/or a satellite 372.

Figure 20B:
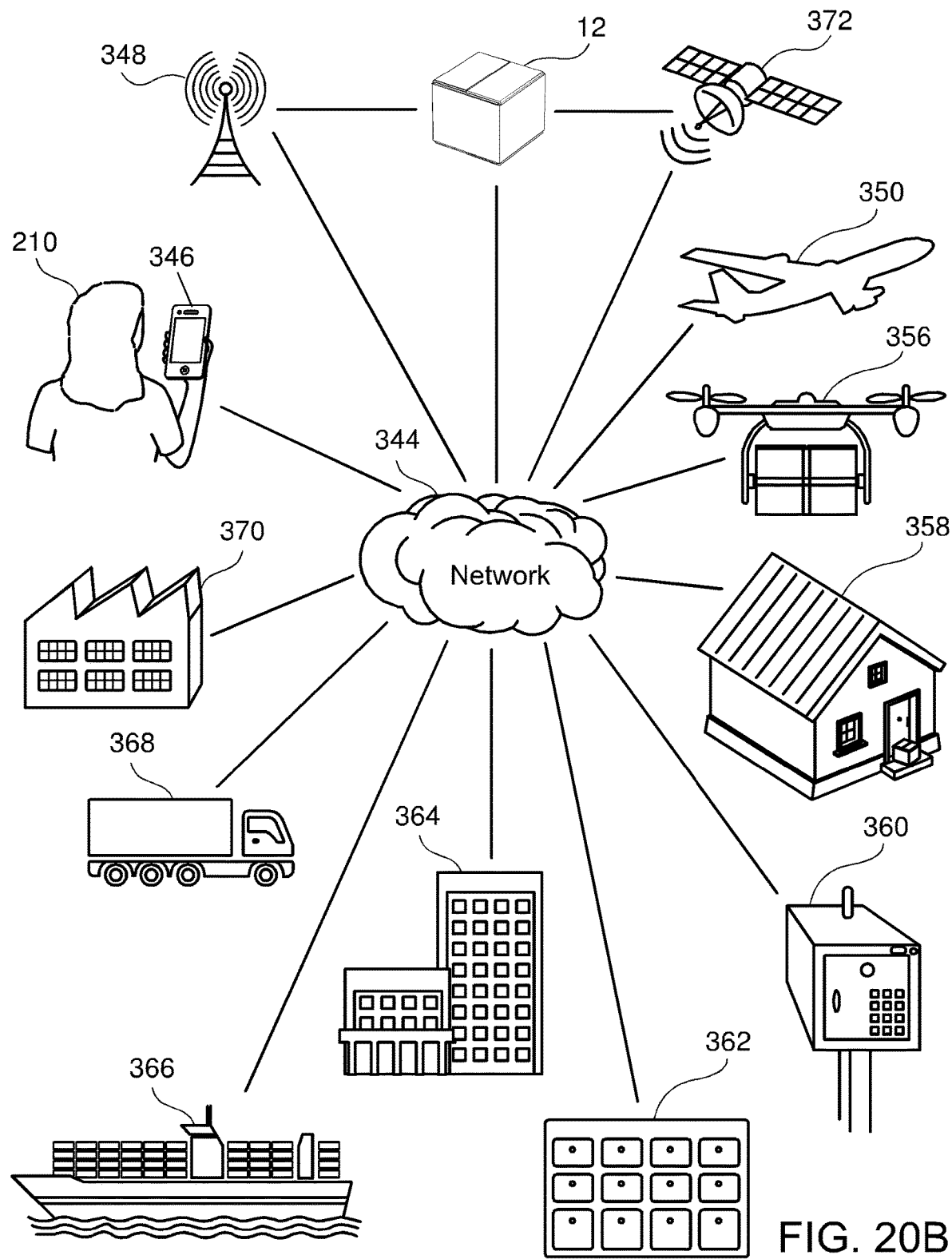
FIG. 20B illustrates exemplary electronic computing devices that may be utilized with a network in communication with the package of the present technology.

In some embodiments, as illustrated in FIG. 20b, the smart packages 12 may communicate directly with a network hub or server 344, a cellular system or device 348 and/or a satellite 372. The network hub or server 344 can also be in communications with other network hubs or servers, such as but not limited to, a truck, building, warehouse, shipping container, pallet, or other location where multiple smart packages may be stored or located.

Figure 21:
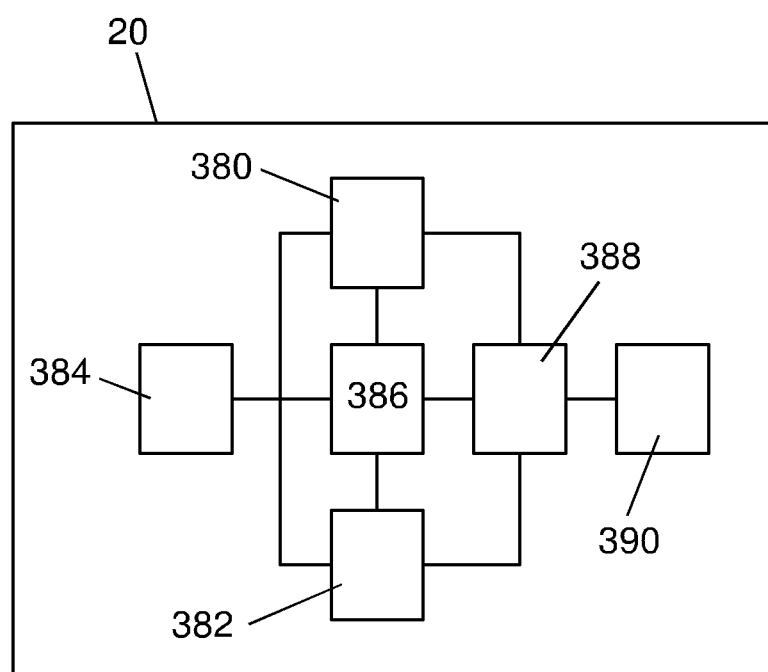
FIG. 21 is a block diagram of the electronics and sensor unit of the present technology.
Figure 22A:
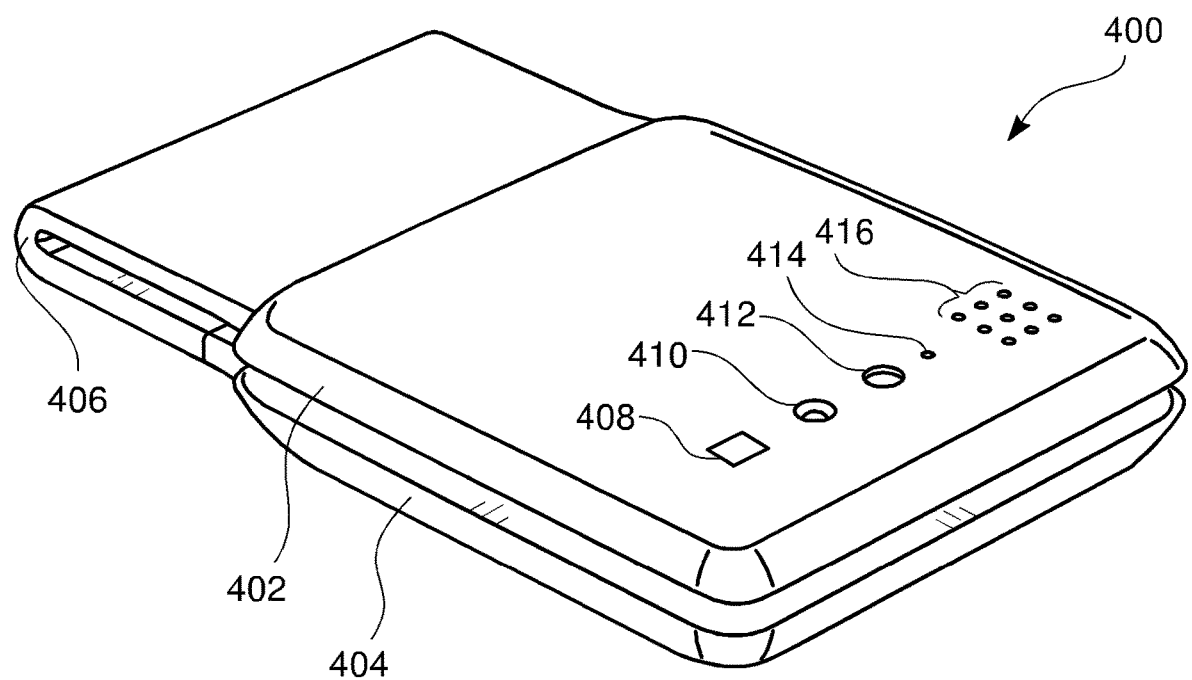
FIGS. 22A and 22B is a perspective view of the embedded micro shipping package computing hub in the form of a clip.
Figure 22B:
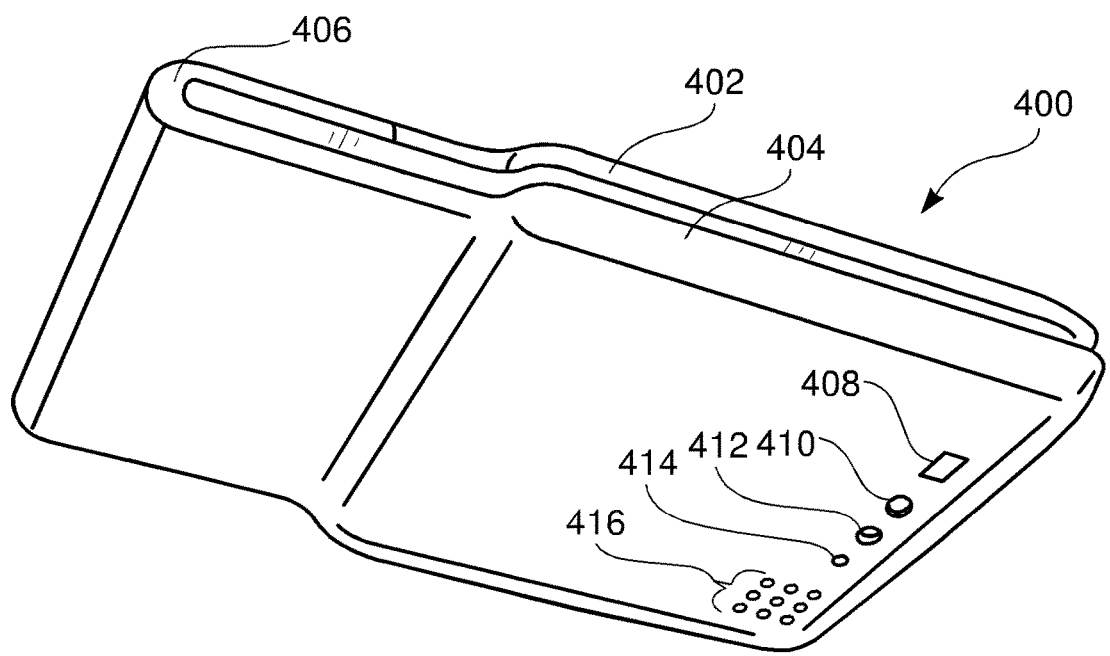
Figure 23A:
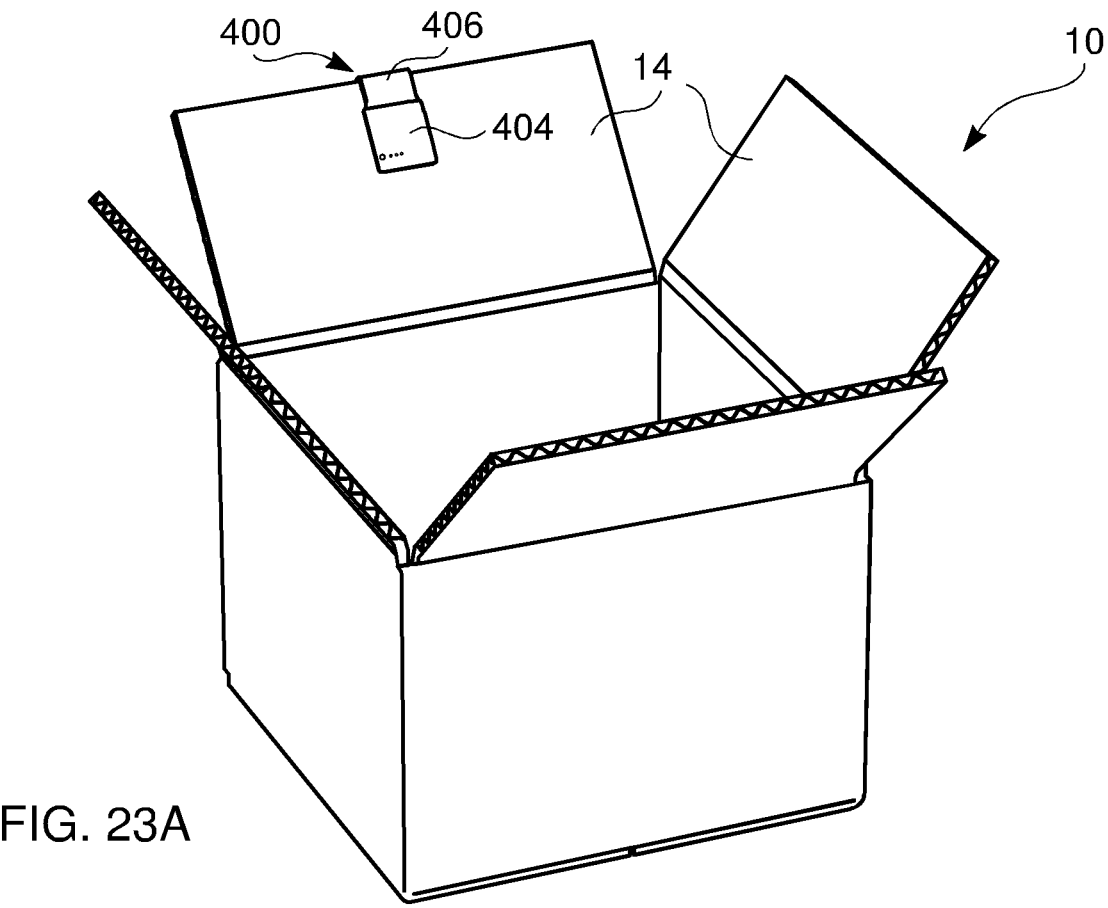
FIG. 23A is a perspective view of the clip attached to the closure flaps of the package in an open position.
Figure 23B:
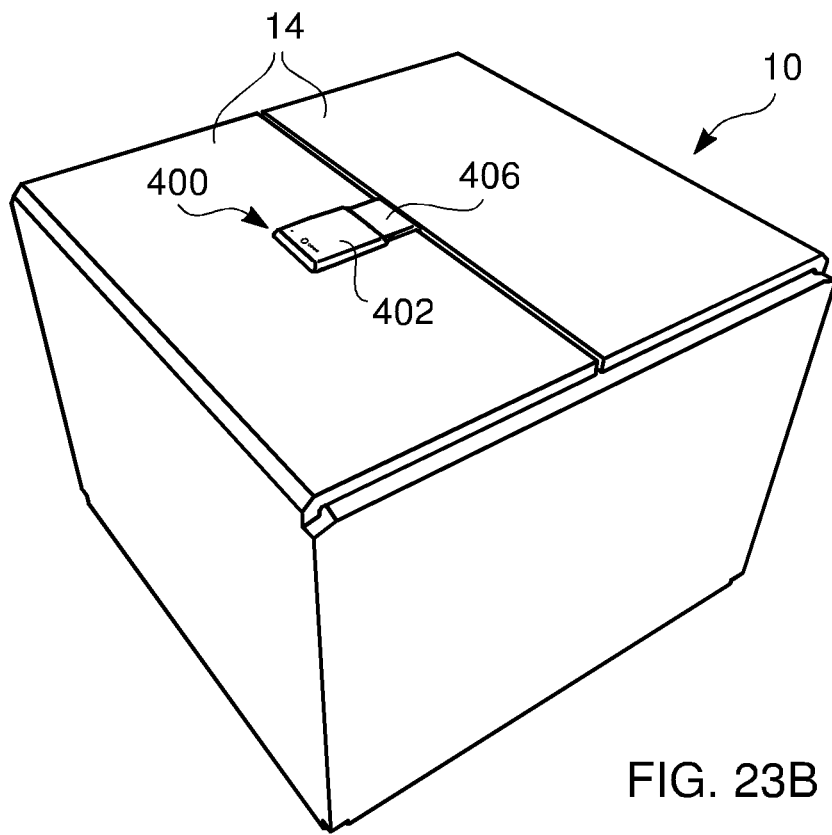
FIG. 23B is a perspective view of the clip attached to the closure flaps of the package in a closed position.

Referring to FIG. 21, in some embodiments, the electronics and sensor unit 20 can include at least one network module 380, at least one sensor module 382, at least one battery module 384, at least one memory module 386 (e.g., volatile and non-volatile memory), one or more processors or microcontrollers 388 (e.g., a central processing unit (CPU), a graphics processing unit (GPU), or both), and at least one user interface 390, all of which may communicate with each other via a bus. The CPU 388 is capable of receiving information from and/or controlling the network module 380, the sensor module 382 and the user interface 390.

Referring to FIGS. 22A-23B, in some embodiments, the present technology can be in the form of one or more smart clips 400 that may or may not include a display and/or interface. The clip 400 can include an external computing and sensor module 402, an internal computing and sensor module 404, and a hinge, clamp or connector 406 pivotably coupling the external module 402 and internal module 404 together or to a portion of the package 10. The clip 400 can be pivoted around an edge of one or more of the closure flaps 14 and/or side walls of the package 10. Alternatively, the clip 400 can be embedded or integral with one or more of the closure flaps 14 and/or side walls of the package 10. The clip 400 can be attached to oppositely located closure flaps 14 to be adjacent or in contact with each other when the closure flaps 14 are closed and sealed.

The external and/or internal modules 402, 404 can include an electronic package including temperature, humidity and/or environmental sensors 408, a light 410, a camera 412, an IR/near IR light 414 and/or a speaker 416. In the exemplary, the external module 402 could have the electronics package orientated with a field or direction of view exterior of the package 10, while the internal module 404 could have the electronics package orientated with a field or direction of view interior of the package 10

Figure 24:
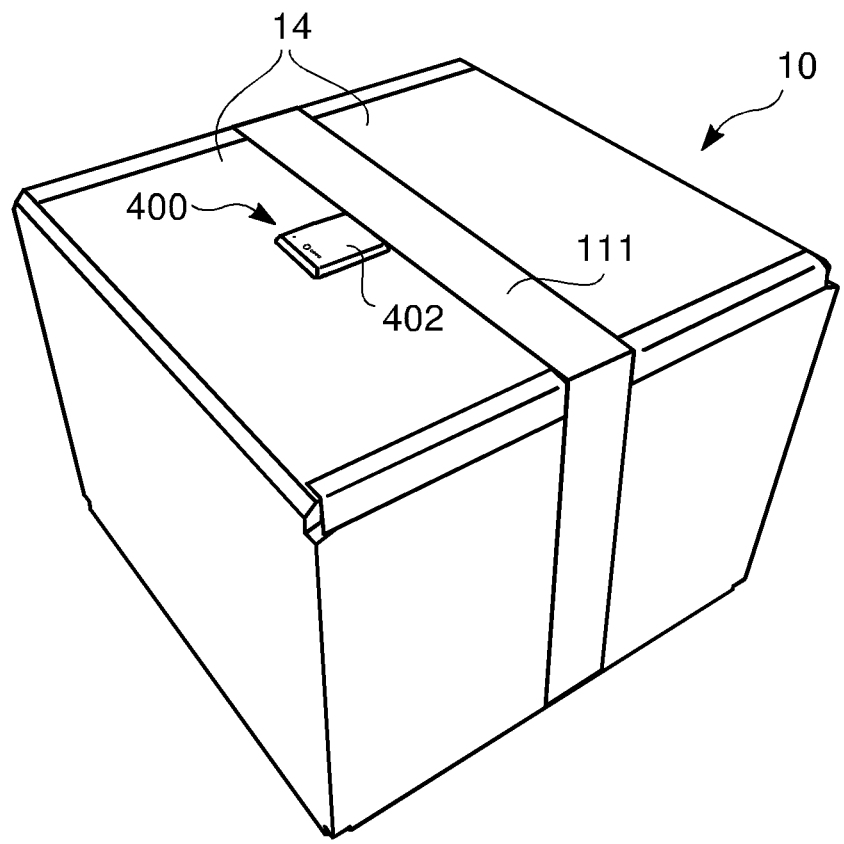
FIG. 24 is a perspective view of the clip attached to the closure flaps in a closed position of the package including the smart packaging tape.

The clip 400 can be utilized with the smart packaging tape 111, as best illustrated in FIG. 24. The tape 111 can be used to secure edges or closure flaps of the package 12, with lengths of the tape 111 being implemented so that at least one end contact sensor hub is intact and useable. The enclosure 12, the adhesive tape 111, closure flaps 14, and the clip 400 may comprise embedded conductive wires, strips, or elements to form a conductive circuit, mesh, or sensor network, to enable detection of the enclosure being opened through unsealing the closure or by cutting a slot or hole in a surface of the enclosure. The conductive elements may be formed by the use of thick or thin wires, conductive strips, conductive surfaces, conductive ink, or any number of similar methods. The conductive elements in the enclosure may be joined at the openings of the enclosure by a closure that is also conductive or has conductive elements. A label with conductive elements may also be used to complete the conductive circuit. The conductive elements form a resistive or capacitive network. Opening the enclosure, cutting, slicing, crushing, or making holes in it will change the resistive or capacitive value of the enclosure and be detected by the smart package electronics. This is detected by incorporated sensors and reported as a tampering or opening event or alert by the CPU over the network.

Figure 25A:
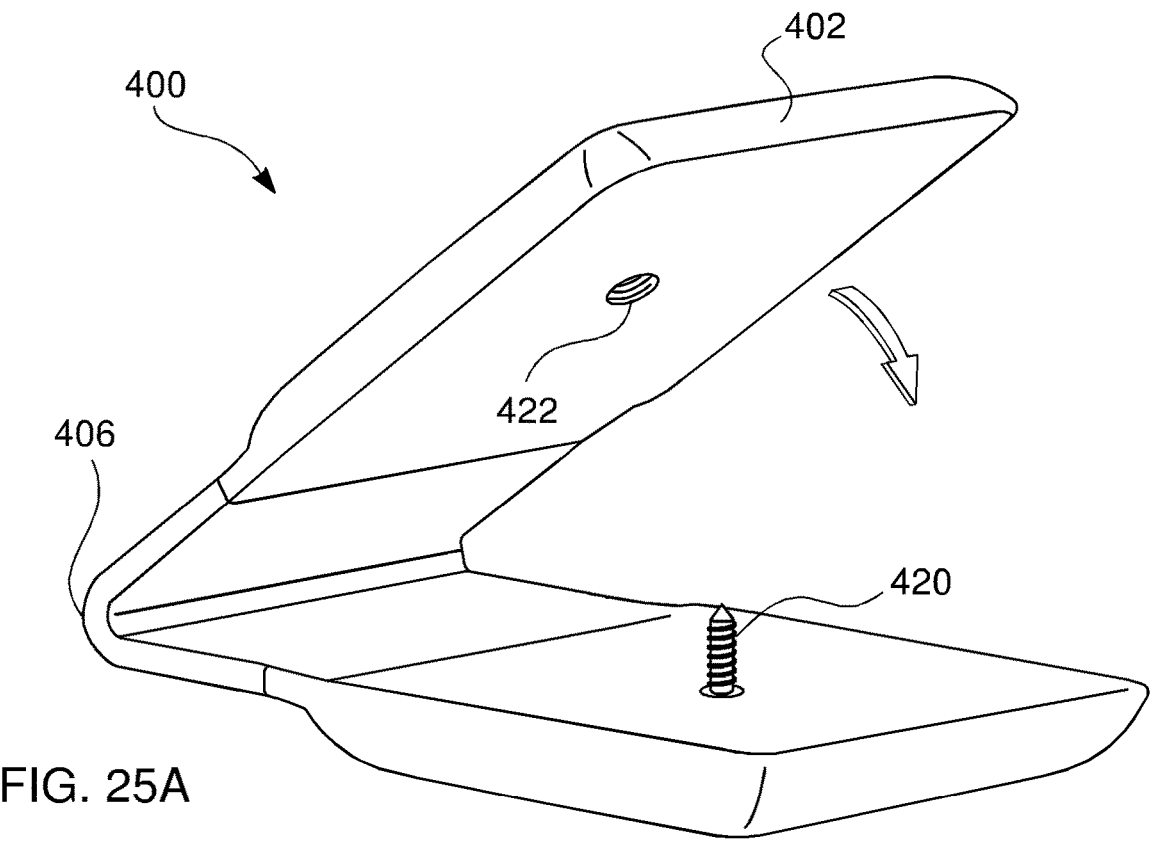
FIG. 25A is a perspective view of the clip in an open configuration utilizing the screw connector and screw connector port.
Figure 25B:
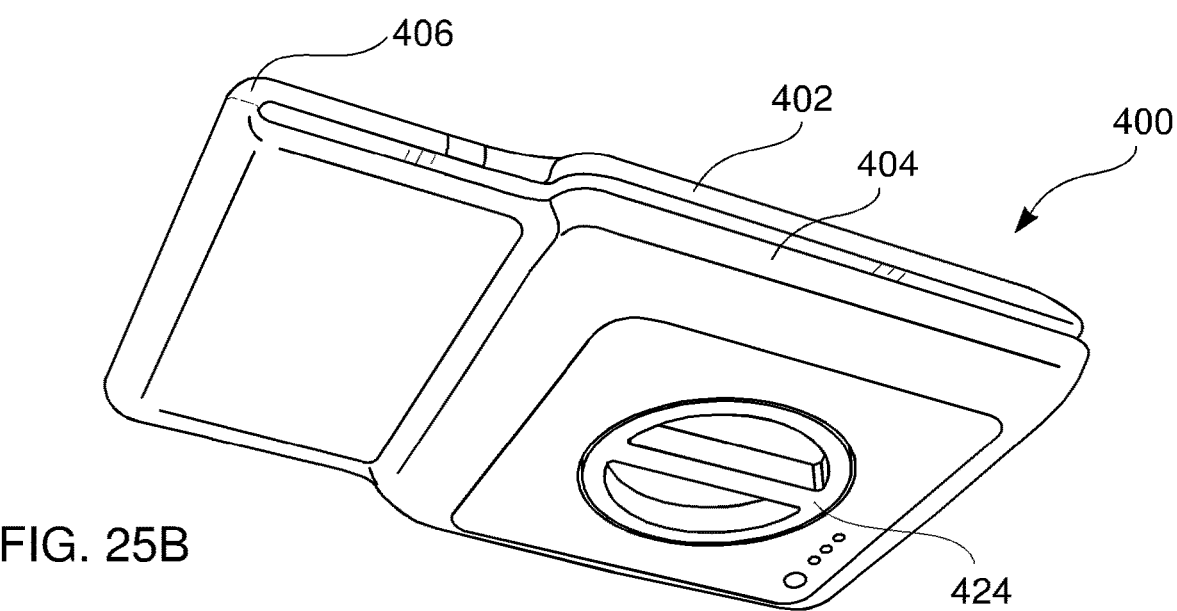
FIG. 25B is a perspective view of the clip in a closed configuration utilizing the tightening/release module.

Referring to FIGS. 25A and 25B, the clip 400 can including a screw connector 420 extending from an internal side of one of the modules 402, 404, with a screw connector port 422 being defined in an internal side of the other module so as to securely receive the screw connector 422 when the clip 400 is pivoted to a closed position.

A tightening/release module 424 can be rotatable located in the module 402, 404 and operable connected with the screw connector 420 for providing a rotational motion in either a clockwise or counter-clockwise direction of the screw connector 420 upon rotation of the tightening/release module 424. Rotating the tightening/release module 424 either tightens and clamps the external and internal modules 402, 404 together, or releases them. The tightening/release module 424 can include recesses and/or grips for being manipulated by fingers of a user.

Figure 26A:
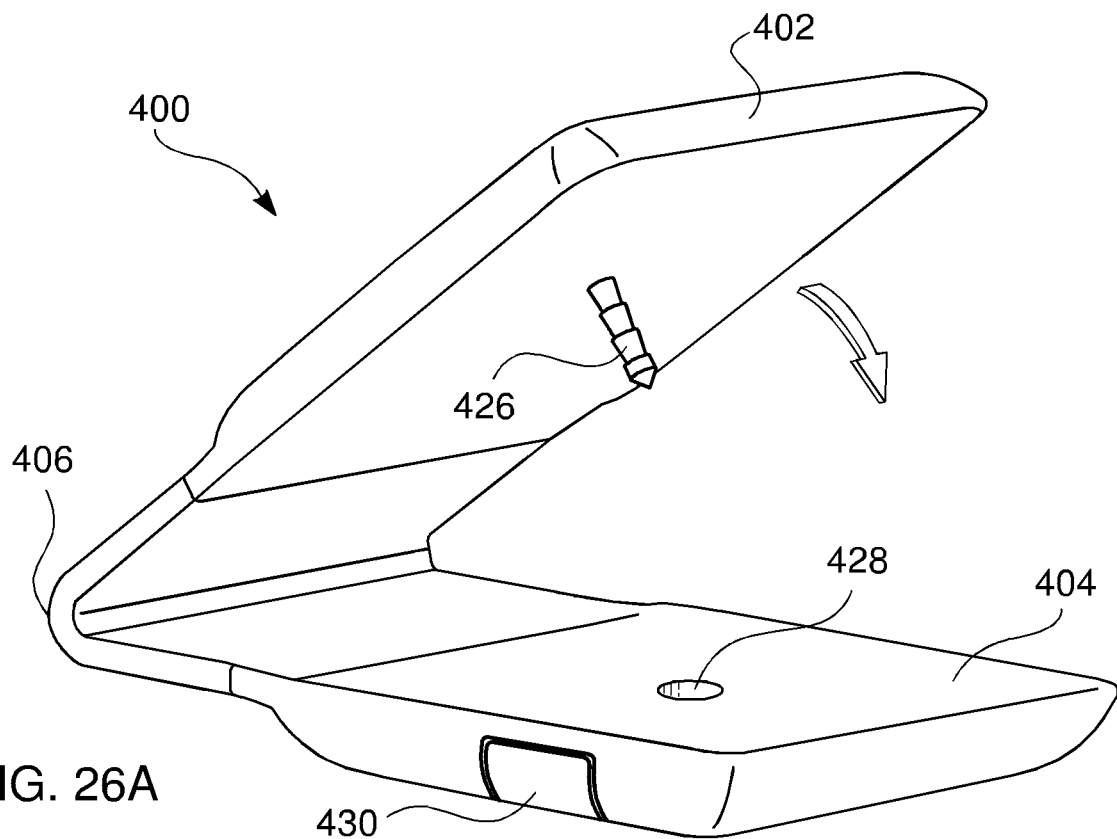
FIG. 26A is a perspective view of the clip in an open configuration utilizing the notched magnetic pin connector and notched magnetic pin connector port.
Figure 26B:
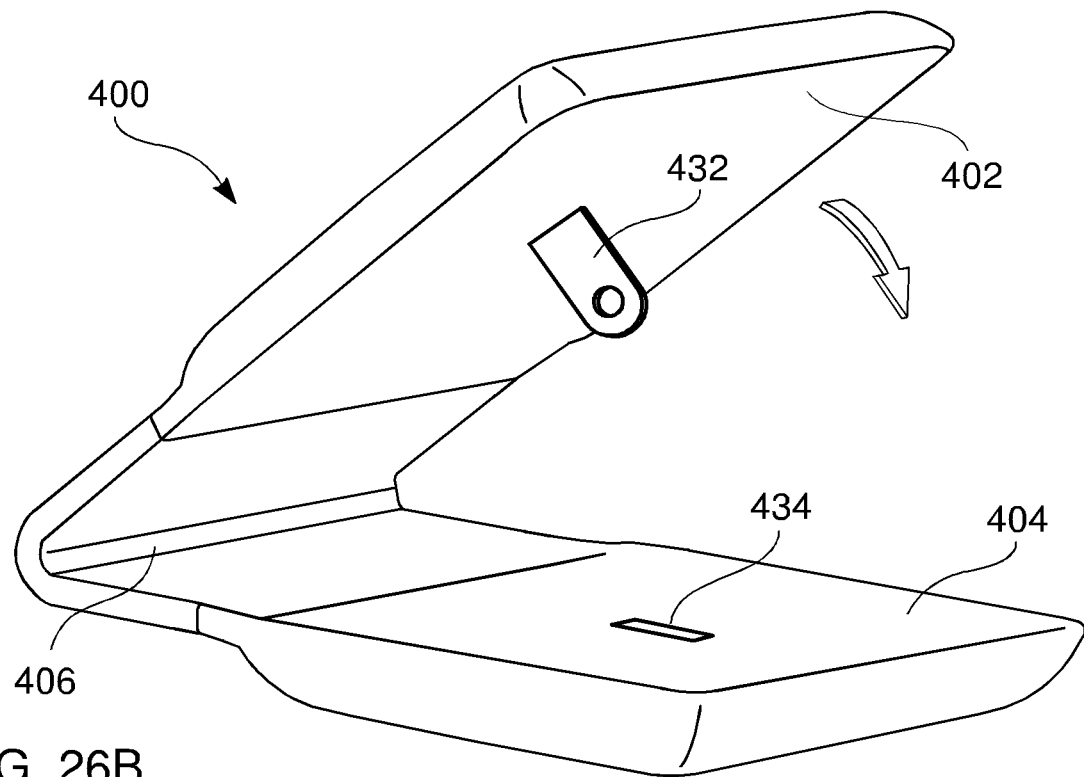
FIG. 26B is a perspective view of the clip in an open configuration utilizing the bolt hole pin connector and bolt hole pin connector port.

Referring to FIG. 26A, the clip 400 can including a notched magnetic pin connector 426 extending from an internal side of one of the modules 402, 404, with a notched magnetic pin connector port 428 being defined in an internal side of the other module so as to securely receive the notched magnetic pin connector 426 when the clip 400 is pivoted to a closed position.

A manual unlock/release system 430 can be moveable associated in the module 402, 404 and operable connected with the screw connector 420 for moving a magnetic or ferrous member in or out of engagement with the notched pin connector 426. Rotating the tightening/release module 424 either tightens and clamps the external and internal modules 402, 404 together, or releases them. The tightening/ release module 424 can include recesses and/or grips for being manipulated by fingers of a user.

Referring to FIG. 26D, the clip 400 can including a bolt hole pin connector 432 extending from an internal side of one of the modules 402, 404, with a bolt hole pin connector port 434 being defined in an internal side of the other module so as to securely receive the bolt hole pin connector 432 when the clip 400 is pivoted to a closed position.

Figure 27A:
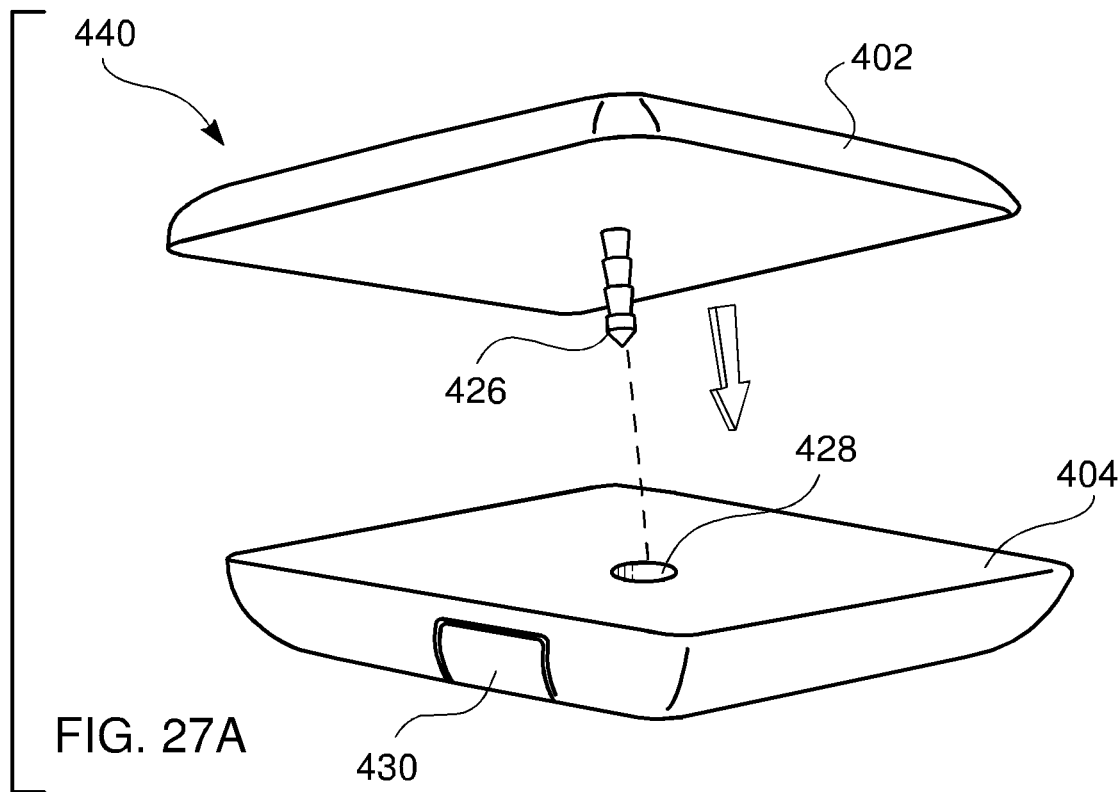
FIG. 27A is a perspective view of the alternate clip in an open configuration utilizing the notched magnetic pin connector and notched magnetic pin connector port.
Figure 27B:
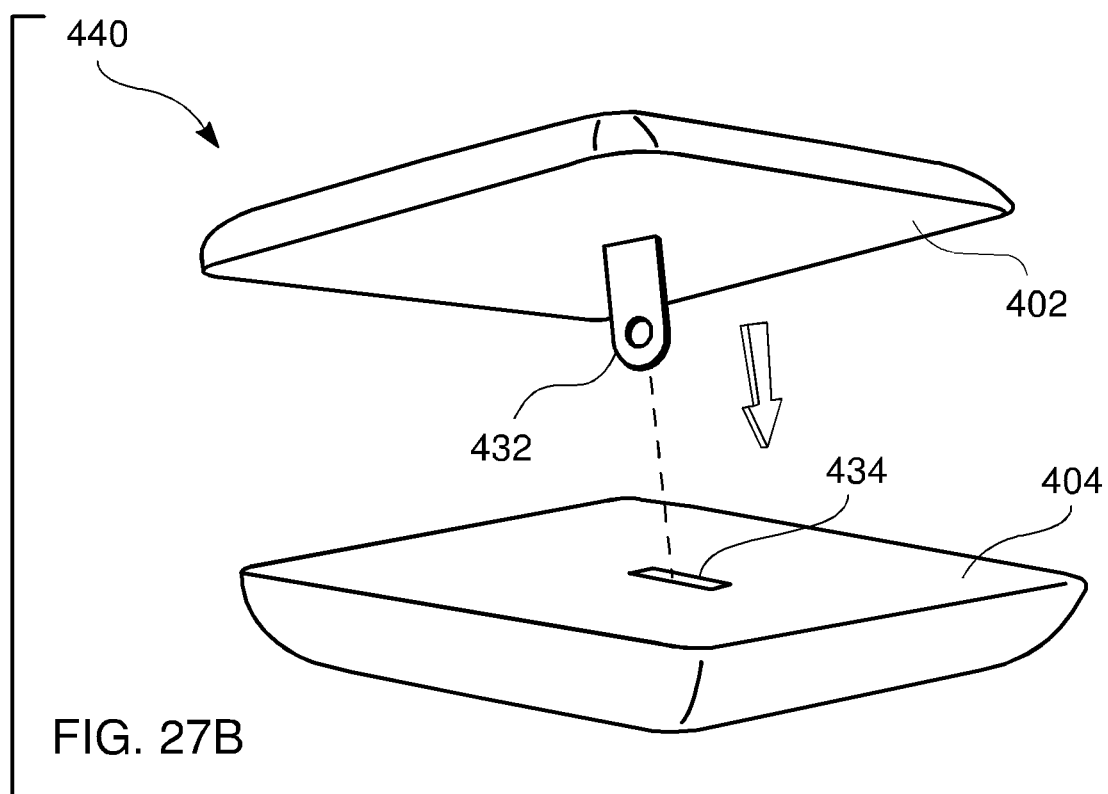
FIG. 27B is a perspective view of the alternate clip in an open configuration utilizing the bolt hole pin connector and bolt hole pin connector port.

Referring to FIGS. 27A and 27B, an alternate embodiment clip 440 can be utilized without the hinge, thus creating separated external and internal modules 402, 404 that are attachable together. In the exemplary, the clip 440 can include the notched magnetic pin connector 426, the notched magnetic pin connector port 428 and manual unlock/release system 430. Further in the exemplary, the clip 440 can include the bolt hole pin connector 432 and the bolt hole pin connector port 434.

It can be appreciated that the clip 440 can include the screw connector, the screw connector port and the tightening/release module, of FIGS. 25A and 25B.

Figure 28A:
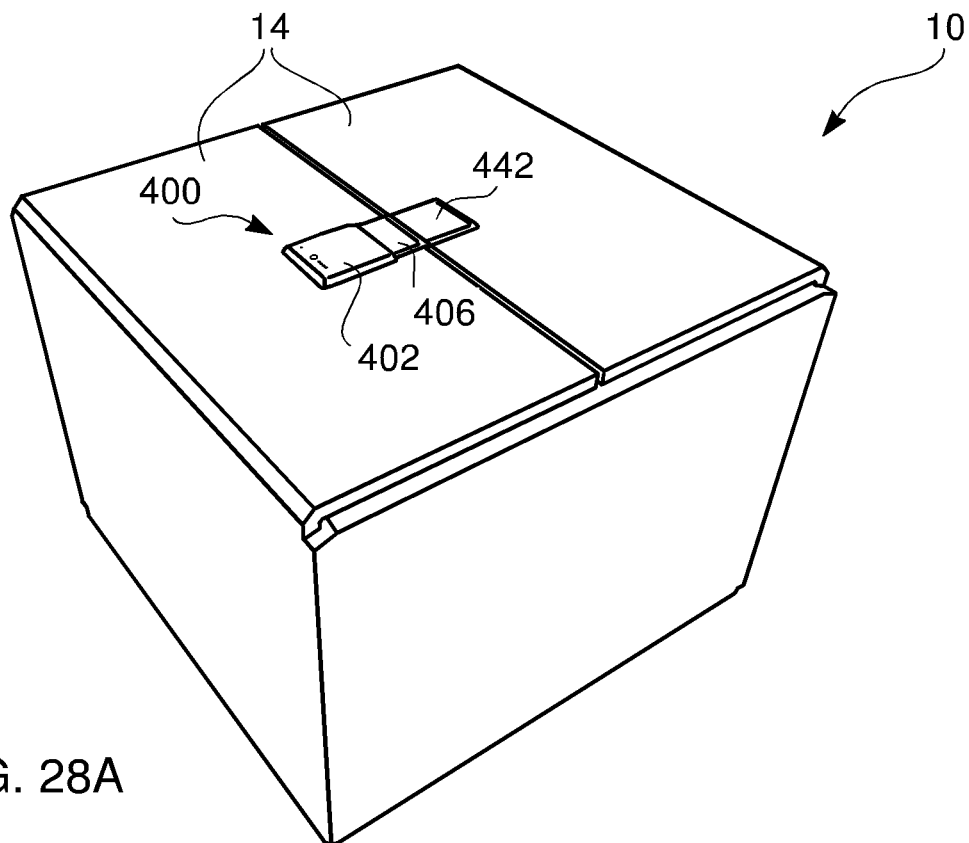
FIG. 28A is a perspective view of the clip and the locking mechanism attached to the closure flaps of the package in a closed position.
Figure 28B:
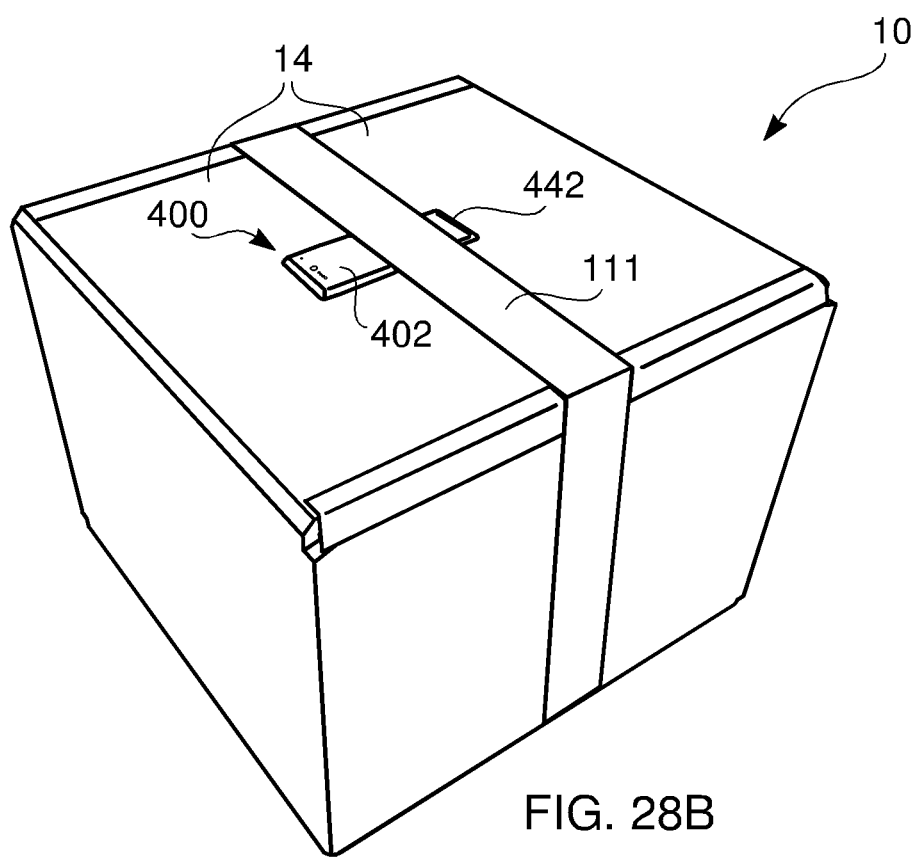
FIG. 28B is a perspective view of the clip the locking mechanism attached to the closure flaps of the package in a closed position including the smart packaging tape.

Referring to FIGS. 28A and 28B, the clip 400 (or clip 440 not shown) can be utilized with a locking mechanism 442 position on the closure flaps 14 and/or side walls of the package 10 that is opposite or adjacent to the clip 400 or the hinge 406. The lock mechanism 442 is configured to securely engage or lock with the clip 400 to prevent unauthorized tampering, opening and/or removal of the clip 400 and/or opening of the closure flaps 14 and/or side walls of the package 10.

An example of use of the present technology would be for a network enabled shipping container in communication with smart packages contained within to be able to effectively manage the networking requirements and traffic of the smart packages. This also allows the smart package to be aware of the container it is being shipped in. It may also allow smart packages to use less power or to recharge from the container via direct or wireless charging. Similarly, a plurality of smart packages may form a mesh network or other ad-hoc network topology either with or without a network hub. When in this configuration a networked container or vehicle, together with a cargo of smart packages may form a networked, ad-hoc system that appears to the external network as a single system.

Further example of the present technology is that the electronics and sensor unit 20 may also be affixed to the enclosure 12, be incorporated into the enclosure 12, form the closure 14, or be an addition to the closure 14. The labels of the present technology can contain printed information as is typically done today and may also include a flat panel display and user interface allowing for user input. A display may use thin-film-transistor (TFT), electronic ink (e-Ink), or other similar technology and may be a rigid or flexible display. Biometric sensors, image sensors, card readers, and speakers may also be included to implement allow for user identification, authentication, or payment processing.

The network may support any one or several protocols as is known in the art including IEEE 802 Wi-Fi, cellular networks, Bluetooth, RFID, NFC, and others. As the smart package is aware of its location, it may be configured to automatically go into "airplane mode" when in an aircraft. It may also automatically disable wireless interfaces that may not be required when it is in a vehicle, container, or building where it is in wireless contact with its immediate surroundings and uses networking hardware in the surroundings as a router, access point, or hub. In many cases, smart packages may connect to a central server or service such as a shipping or delivery company. The shipper, receiver, or other authorized parties are also able to receive package status updates either directly from the package, via a package tracking website, platform, software application or through the shipping company's website. Updates, status changes, and alerts may be queried by external networked devices, be reported by the smart package itself, be logged locally or remotely, or a combination of these methods.

The smart package may also include any of a variety of imaging sensors using visible or non-visible light. These can be used to image the area in which the package is located, to image an external identification tag such as a bar code, or to image a person sending, transporting, receiving, closing, or opening the package. The image sensor(s) may be located on or incorporated into the smart package or incorporated into a smart label, tape or device attached to the package and can be programmed to start imaging when the package is picked up or moved, opened or tampered with. In some cases, a light sensor will be used to turn on the image sensor when light is detected within the interior of the package. Images may be processed or stored in local memory in the smart package electronics or may be uploaded over the network to an external server or device.

Any detected theft of a package can also trigger events, such as the disabling of electronics in the packaged device, the activation of alert systems, including audible or light alarms on or in the package, or in the carrying vehicle or storage space, alert transmission via Cellular, Wi-Fi, Bluetooth, NFC or other remote, wide area, local area and short-distance means to local security or carrier staff or to other agents via the Internet, or the automatic transmission of the thief's IP address and GPS coordinates over a network by the stolen devices, as soon as it is connected to the internet (since the smart package is an IoT—Internet of Things—device). An alert transmission may also be triggered if a package leaves its pre-assigned travel route or may be assigned to intermittently send out transmissions at pre-set time intervals or at pre-set locations of the packages. A shipper or shipping company may assign the shipping and destination locations or additional shipping information such as air, ground or sea transportation routes and assign designated shipping centers and methods such as which airplane, delivery truck and or delivery agent the package is assigned to, and any changes in the shipping route, method or delivery agent will automatically trigger an alert.

In some embodiments, blockchain-based smart contracts can be agreed upon in advance by a package sender, package recipient, and package carriers, or any combination of these entities. Unique blockchain identification codes may be associated with individual packages and optionally also package contents, and the transmission of said codes through the network can be used in rule-based systems to automatically activate a variety of operations, such as the release of funds from an escrow account upon delivery of an untampered package, or the automatic re-ordering of inventory and/or packaging material when a package is shipped, the notification of spoilage of package contents (e.g. food). Fractional blockchain tokens can also be issued as rewards to groups, businesses, or individuals for efficient, safe and timely delivery between the various points in a package's route. Blockchain identifiers may also be used for more efficient coordination of the movement various packages on different delivery platforms, such as when opportunities to consolidate packages from different trucks or delivery services going to the same general area or specific location, onto a single truck, with blockchain tokens shared equitably between different carriers based on relative package weights, sizes, or special handling needs. Blockchain identifiers may also be used to authorize the activation of a delivered product over the Internet, once it has been paid for.

The smart package may also comprise a speaker in order to provide instructions to a person in the vicinity or for other purposes. When combined with a microphone, this may allow for voice communications between the shipper, receiver, service provider and other interested or authorized parties.

Smart packages according to embodiments of the present technology comprise a closable enclosure and may comprise a separate closure or label. The enclosure may be a packing box 12, envelope, bag 104, 108 (FIGS. 7A-B), an animal crate 304 (FIG. 16A-B) cylinder, or any one of a number of shapes and sizes that may be closed or sealed. The enclosure may be reusable. The enclosure may be comprised of cardboard, paper, wood, metal, plastic, or a mix of these or other materials. The enclosure may also comprise a separate coating or attachment that may be plastic, paper or any other suitable material. The coating or attachment may provide protection to the enclosure. The coating or attachment may also contain the electronics and sensors and be used to cover or attach to a conventional, "dumb" box turning a conventional box into a "smart" box.

In some embodiments, the closure flaps 14 may be any type of closure incorporated into the enclosure 12 or may be separate closures. Examples of a closures incorporated into the enclosure can include an adhesive strip, zipper, latch, or clasp. Separate closures can be plastic, paper, metal, or some type of adhesive tape. Closures may be made of a conductive material and may incorporate contact sensors that recognized when a package is open, closed or sealed and may also include a locking mechanism such as a magnetic, electronic or mechanic latch that may be locked and unlocked with a password, biometric identification, RFID chip, or other verification method or methods.

Electronics, portions of the electronics, battery, or multiple batteries may be wholly contained in the enclosure, closure, or label. These active components may also be distributed between the enclosure, closure, or label. In some cases, closing and sealing the enclosure, affixing the closure to seal the package, or attaching the label may cause the electronic circuit to be completed, or enabled in order for the electronics to power up, initialize, configure, and operate. The battery itself can take a number of forms including a replaceable battery such as a common coin battery, a battery having a wide, flat (flexible, low-profile) shape, or a long, flat battery that is also an adhesive tape used to seal the enclosure.

The enclosure 12, a wrapping including electronics and sensor unit 20, adhesive tape 111, closure flaps 14, and labels may comprise embedded conductive wires, strips, or elements to form a conductive circuit, mesh, or sensor network, to enable detection of the enclosure being opened through unsealing the closure or by cutting a slot or hole in a surface of the enclosure. The conductive elements may be formed by the use of thick or thin wires, conductive strips, conductive surfaces, conductive ink, or any number of similar methods. The conductive elements in the enclosure may be joined at the openings of the enclosure by a closure that is also conductive or has conductive elements. A label with conductive elements may also be used to complete the conductive circuit. The conductive elements form a resistive or capacitive network. Opening the enclosure, cutting, slicing, crushing, or making holes in it will change the resistive or capacitive value of the enclosure and be detected by the smart package electronics. This is detected by incorporated sensors and reported as a tampering or opening event or alert by the CPU over the network.

The electronics and battery may be affixed to any internal or external surface of the enclosure 12, closure flaps 14, or label. They may also be embedded between layers of the enclosure, closure, or label.

The network module 380 can include at least one antenna, receiver, transceiver, transmitter or the like. The network module 380 can be configured or configurable to support at least one network protocol, such as but not limited to Bluetooth, cellular, NFC, RFID, and Wi-Fi, and/or a network topology, such as but not limited to mesh, ad-hoc, or point-to-point.

The sensor module 382 can include a GPS, a light detector, one or more conductive elements, a motion detector, a camera module, a still camera, a video camera, temperature sensors, humidity sensors, light sensors, image sensors, spatial, motion, acceleration, orientation and relational position sensors such as an accelerometer, gyroscope, compass, altimeter and wireless and location sensors and systems such as GPS, Satellite, Cellular, Wi-Fi, Bluetooth, NFC, RFID, IR and/or other wireless, optic or fiber optic networking sensors and systems, flight transmitters and sensors, optical and imaging sensors, accelerometers, gyroscope, altitude sensors and other motion, orientation and positioning sensors, air pressure, gas, chemical or biological contaminant sensors and others. It can be appreciated that the sensor module can be remote from and thus in communication with the electronics and sensor unit 20.

The user interface 390 can include at least one input means, a video display (e.g., a liquid crystal display (LCD)), an alpha-numeric input device(s) (e.g., a keyboard), a cursor control device (e.g., a mouse), a voice recognition or biometric verification unit, a drive unit (also referred to as disk drive unit), a signal generation device (e.g., a speaker), a universal serial bus (USB) and/or other peripheral connection. In other embodiments, the electronics and sensor unit 20 may further include a data encryption module (not shown) to encrypt data.

In order to ship goods using a smart package 12 incorporating embodiments of the present technology the following procedure may be used. When in use goods to be shipped will be placed into the enclosure. The enclosure is closed and sealed using either a closure incorporated into the enclosure, a separate enclosure, or a combination of a separate enclosure and a label. In some cases, the label may be part of the enclosure or the closure.

The electronics are then enabled, initialized, and configured. This may happen through a variety of means. The electronics may be enabled automatically when sealing the smart package as the closure and the enclosure form a conductive circuit. The electronics may be enabled by cutting a link, breaking a link, or removing a tab in the battery circuit. The electronics may be automatically enabled by placing the label in proximity to a magnetic field or scanner.

Once the power supply is enabled, the electronics CPU will be configured with parameters of the delivery. In some embodiment, the CPU and electronics will self-configure, connect to the network, and download any relevant updates. It will determine its location. It will then be configured with information such as the contents of the package, source, and destination. The expected route that the package is to take may also be included in the configuration. The contracted level of service may also be configured. This may include allowable parameters on duration of trip, temperature, humidity, maximum drop force experienced, orientation, and any number of other parameters as supported by sensors embedded in the smart package and as defined by the service provider with or without the shipper's or receiver's consent. The battery should be sufficient to power the smart package electronics for the duration of the whole journey, or it may be periodically recharged wirelessly during shipment. The correct operation of sensors may be verified and checked against known parameters at the point of shipment.

While the package is in shipment, it may be configured to periodically report its position, security parameters, and environmental parameters. Adherence to the contract terms may also be verified during transit. Alerts may be generated or logged. The shipper, receiver, or shipping company may also query the package for up to date information at any time the package has network connectivity. Otherwise, the most recent information or historical information may be used. If a package is misplaced, delayed, tampered with, or misdelivered, the package can detect this and report it to the parties involved by sending an alert. The alert can be done in a variety of ways including email, SMS, automated phone call, or one of a variety of messaging applications. Examples of possible alerts are when a package is put on or off a plane, when a motion or acceleration event exceeds a threshold, when a package is picked up, and when a GPS reading indicates that the package has reached a specified location.

At the time of delivery, the package can match its location to the destination configuration it has been configured with and verify that the two locations are within proximity to each other. While in transit, the smart package configuration may be updated. For example, in the case of a package that has been rerouted in transit, the destination location may be updated in the smart package over the wireless network. Configuration information may also be updated just prior to delivery. The smart package may be used to enforce delivery contract restrictions. For example, the user interface and display on the smart label can provide instructions and receive signatures, payments, or other forms of identification such as a NFC tag or fob.

The smart package can be configured to require a password, PIN, or passcode to open it without triggering an alarm. The alarm may be audible, using a speaker, visible, by displaying text of icons, or flashing on an incorporated display. Alarms may also use lights or be silent. In any of these cases, an alert may also be sent wireless to external devices or servers. The smart label may also be able to accept biometric input such as a fingerprint or facial identification to verify the identity of the receiver, the sender, or the delivery person. The smart package can be configured to be considered delivered based on a variety of simple or complex criteria. In some cases, this criterion may be simply a location, in other cases it is a person receiving the package. In other cases, it could be both a receiver and a witness authenticating in order to receive the package. It is also possible to specify a plurality of possible receiving people of which any subset of the total number of specified people are authorized to receive it.

Once the smart package has been received by an authorized person or at an authorized location, the electronics may be powered down, disabled, or put into sleep mode. In some embodiments the packaging may be reused. The reusable portion of the smart package may be the enclosure, label, closure or any combination of the three.

Some embodiments of the present technology allow an authorized person to track a smart package even after it is indicated to have been delivered. This may be done by only allowing a receiving person to disable the electronics module of the smart package or by allowing a remote command to re-enable the electronics.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an present technology as defined in the appended claims.

For purposes of explanation, numerous specific details are set forth in order to provide a thorough understanding of the disclosure. It will be apparent, however, to one skilled in the art, that the disclosure may be practiced without these specific details. In other instances, structures and devices are shown at block diagram form only in order to avoid obscuring the disclosure.

Reference throughout this specification to "one embodiment" or "an embodiment" means that a particular feature, structure, or characteristic described in connection with the embodiment is included in at least one embodiment of the present technology. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand") or a combined version (e.g., "ondemand"), a capitalized entry (e.g., "Software") may be interchangeably used with its non-capitalized version (e.g., "software"), and a plural term may be indicated with or without an apostrophe (e.g., package's or packages). Such occasional interchangeable uses shall not be considered inconsistent with each other.

In addition, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the present technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled", "connected", "connecting", "electrically connected", etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

One skilled in the art will recognize that the network or Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated. Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that is capable of directing a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present technology can introduce multiple embodiments of package computing, tracking, monitoring and peer-to-peer networking devices such as clips, labels, tags, tape, bags, boxes and other devices with attached, enclosed, embedded or networked sensors, processors, batteries and networking systems capable of coordinating with a distributed smart package operating, networking and security system via an array of wireless networks.

Embodiments of the present technology may be composed of technologies in different networking categories, such as but not limited to:

Low Power Wireless

Relatively low bandwidth sometimes-on transmission over low power wireless technologies such as but not exclusive to Bluetooth, Bluetooth Low Energy (BLE), Radio Frequency (RF), ANT, SigFox, ZigBee, NBIoT, RF4CE, RFID or similar. Many of these technologies support a combination of star, mesh and peer to peer topologies, or a hybrid of any of the above.

Location and Navigation

Ultra-low bandwidth Satellite navigation or satnav and global navigation satellite systems (GNSS) such as the United States Global Positioning System (GPS), Russia's GLONASS, the European Union's Galileo and China's BeiDou Navigation Satellite System (BDS) that enable small electronic receivers to determine location (longitude, latitude and altitude/elevation) to high precision using time signals transmitted along a line of sight by radio from satellites. Location may also calculated using the Global System for Mobile Communication (GSM) by calculating a cellular networked device's signal strength to nearby antenna masts using times of arrival (TOAs) of radio signals received from two or more fixed cell tower antenna masts of a Wide Area Network by emitting a roaming signal and may also include Location-Based Services (LBS) that discloses the coordinates of a mobile wireless networked device. Another method for acquiring mobile device location and relational position data is using Peer-to-Peer (P2P) positioning systems, which may operate independently or in cooperation with GNSS systems such as Assisted GPS (aGPS), GSM, Location Based Services (LBS). Peer-to-Peer (P2P) Positioning enables two or more mobile devices to directly network and communicate with each other and/or with one or more fixed position LAN hotspots, routers or cell towers using relatively low bandwidth (Low Power Wireless Networks), Personal Area Networks and slightly higher power and/or always-on transmission Wireless Local Area Networks (LAN) and calculate location by each P2P networked device identifying the relational position and distance to each other and a fixed location using times of arrival (TOA's), signal strength, signal direction and/or triangulation.

Wireless LAN

Slightly higher power always-on transmission to local devices which may include smart package networking devices and hubs, but may also incorporate third party devices and hubs such as networked vehicles including but not limited to cars, vans and trucks, airplanes, marine ships and spaceships and devices such as mobile phones, tablets, laptops, PC's and other multimedia communications devices. Using world wide networking protocols such as WiFi 802.11, WiFi Direct Connect and WiFi P2P.

Wireless Broadband

High-power, high-speed fixed, mobile and satellite wireless Wide Area Networks and networking and communications devices which provide uplinks to the Internet and/or other Cloud Platform and will route signals from one or more Low Power Wireless, Personal, Metro and/or Local Area Network (LAN) to the Internet using high bandwidth cellular networking technologies such as GSM, UMTS, LTE, CDMA, WiMAX and Communications Satellite Networks over 2G, 3G, 4G, 5G and other mid to high bandwidth wireless technologies and/or networks.

Wired Networks

When an Uplink is required for wireless networked packages and packaging systems to interface or route signals between one or more Low Power Wireless, Personal and/or Local Area Network (LAN) and the Internet and/or other Cloud Platform, wireless networked packages will network with a wired routing device or system using technologies such as DSL, Cable, Fiber, Broadband over Power Line or other wired technologies and networks.

Functionality provided by an exemplary embodiment of the present technology may comprise, for example:
- Bi-directional and multi-feed voice, data, and audio-video communications over a cellular, RF and/or a direct peer-to-peer wireless mesh network;
- A ubiquitous virtual machine monitor capable of configuration and interoperability with a variety of mobile device operating systems;
- A modular device management system and ad hoc networking platform scalable for a wide range of networked devices;
- A platform for grouped device intelligence, coordinated task management and data, power, and network optimization;
- Dynamic mesh communications, and real-time coordination of unified, federated, managed, and scalable network configurations;
- Dynamic and secure data channeling over multiple wireless protocols and networks;
- Blockchain networking and peer-to-peer package, device, vehicle, courier or other networked person, system or network identification, verification and secure data processing, storage, streaming, networking and transactions
- Complete system-wide capability-based security settings;
- Complete systems automation for continuous real-time package self-tracking, self-reporting, identification and verification, remote device operations, data processing, management, network selection, communications and security; or
- Dynamic hardware and software configurability.

The present technology may be capable of wireless package networking and peer-to-peer communications over any available Wide, Metro, Local, and Personal Area Network, with any networked device or group of devices; and supporting real-time multi-feed, multi-channel data networking, audio video streaming, communications, sensor monitoring, mesh networking, and coordinated device operations, data, power and network management and remote systems control.

Embodiments of the present technology may comprises a modular data management and package networking system that encompasses such capabilities as duplex-directional data and multimedia networking, power optimization, dynamic device configuration, communications, and data management, while operating within a variety of packaging devices and network topologies. The present technology may serve as a functional model for package self-tracking, self-reporting, automation of individual and group package identification, verification, sensor monitoring, data management, data storage, data channeling, data networking, peer-to-peer networking and network selection, paired, grouped and/or networked device optimization, remote systems control and real-time package interfacing and alerts.

Modular Device Management

Embodiments of the present technology may comprise, such as but not limited to, a computing and/or networking package clip, label, tag, tape, box, bag or other package tracking, networking and computing device that may be attached to, inside of, or embedded into a package, a package container or other packaging materials and external networked devices such as mobile phones, tablets, PC's, vehicles and networking stations are organized into Nodes and Hubs. Nodes may be considered as transducers with little or no onboard data storage and data processing capability. A package node may be may be limited to transmitting data such as an RFID tag or may be capable of receiving and transmitting data and may be used as a peer-to-peer networking relay station to pass on transmitted data received from other packages and devices to a package hub. Nodes may serve as a transmitter for one or more package sensors and may be able to transmit real-time package location data, motion, temperature and other package sensor data to a Package Hub for data storage, processing, channeling and upload to the Internet.

A package hub may be considered as a networking and computing device or platform that serves as data networking, processing, identification and storage system and/or a wired or wireless uplink to upload Personal and LAN data from surrounding package nodes to the Internet via a wired or wireless Local or Wide Area Network (WAN). A package hub may be a standalone computing device with onboard data processing, storage and networking capabilities or may be a networking only device such as a wireless hotspot, wireless access point, wireless router and a wired or wireless data uplink to the Internet or other Cloud Platform.

A package networking and computing hub may be considered as a computing hub, which may be a computing device attached to, inside of, or embedded into a package, a package container or other packaging materials or may be an external device, vehicle or networking station. A computing hub may be assigned to an individual package such as a smart clip, label, tape, tag, box, bag or other packaging materials or a package tracking, networking and computing device that may incorporate one or more of a data processor, data storage drive, battery or other power storage and/or power source, radio transmitter and receiver and one or more sensors such as but not limited to an accelerometer, gyroscope, altimeter, temperature, humidity, light and/or optical sensor, camera, microphone and/or speaker for tracking and monitoring the assigned package, package contents, surroundings and shipping events and networking captured location and sensor data to other networked packages and to the Internet. A computing hub may be a Mobile Internet Device (MID) capable of providing wireless Internet access for the assigned package and for surrounding networked packages or may be an LAN device capable of wirelessly networking with other networked packages, packaging materials, devices, containers and vehicles and identifying, verifying, processing and storing data for upload to the Internet or other assigned Cloud platform whenever a wired or wireless uplink device or router is available.

A package networking and computing hub (computing hub) may also serve as a command center for networking, interfacing with and/or controlling products, sensors, pets and perishable items inside of the package such as a pet location tracker, heart rate monitor or other biometric sensor, a food and/or water dispenser or an internal package heating or cooling unit. As well as interfacing with external devices, vehicles, systems and/or people such as connecting with a transport vehicle's heating or cooling system to maintain a specified temperature or using an onboard package speaker and/or display for a real-time voice and/or video communications, audio and/or video messages to alert a courier if a package contents are altered or damaged during transit or an alarm if a package is picked up or opened by an unauthorized courier or receiving party and wirelessly contacting and alerting the shipping company, sending and receiving parties, other authorized users and/or local authorities if a package has been lost or stolen or if package sensors detect that a package contents and/or networked or neighboring packages contain dangerous, unstable or illegal substances, goods, livestock, people, devices and other equipment and/or materials.

The present technology may comprise a ubiquitous scalable platform for mobile ad-hoc, peer-to-peer mesh networking, dynamic network configuration, peer-to-peer wireless package identification and secure data transfer, channeling, and communications over any wired or wireless network. The present technology may operate on a local device level as embedded software or as a downloadable software application in a device utilizing the present technology, networked device, vehicle or other computing and networking station and/or remotely as an Internet and/or the Cloud Platform remote package, remote package, packaging materials, package contents, products, personnel, vehicles and networked device operating, networking, communications, control, tracking, monitoring, sensor monitoring, data management, processing, analysis, shipping, logistics, transactions and security system.

The present technology may be organized into, but not limited to, the following operating segments:

1. Platform:

A modular device and data management system that encompasses such capabilities as, duplex-directional multimedia networking, power optimization, dynamic configuration, communications, and data management, while operating within a variety of devices and network topologies. The present technology may be a functional model for device automation, modular system and data management, data channeling, paired, grouped and/or networked device optimization and remote systems control and has the ability to run in an embedded environment on a device utilizing the present technology and/or as a downloadable software application on a device or a networked device utilizing the present technology, such as but not limited to, a mobile phone or vehicle and/or as a remote Internet or other Cloud based operating system in which the present technology is authorized to network and interface with and may be operated remotely and dynamically download, upload, install and execute new tasks and the ability to control task execution locally and/or remotely.

2. Device:

Many battery powered electronic devices have a power management system limited to shutting down most components at once after a period of time to extend battery life. The present technology may be configured or configurable to perform device, power, data, network and security management functionalities dynamically by constantly monitoring, managing and optimizing power use for all local and networked package hub device systems of the present technology, components and applications based on factors such as component characteristics, power use history, time since last used, available data storage, available sensors, available networks, network topology, and preferences and all networking characteristics, such as network type, bandwidth, connection, network geography (location and distance) priority settings, security level, and the number of paired or networked devices and characteristics of all networked devices, networked data type, size, necessary bandwidth and priority of networked data. In package hub devices of the present technology the subsystems such as onboard processor (CPU) cores and computing speed, data storage, random access memory (RAM), radio transmitters, receivers, sensors and other components are grouped into module stacks for example all computer processing systems may be organized into individual module stacks by component or function or may be grouped into one module stack by system, for example all power management, storage and charging systems, sensors and components may grouped into another module stack and all networking and communications systems, transmitters, receivers sensors and components are grouped into another module stack, all audio-video sensors, components and systems such as light emitters, optical sensors, cameras, microphones and speakers may be grouped into another module stack module stacks may be generated for major processes and all related systems such present technology device location systems, present technology device motion, orientation, altitude and related spatial positioning systems and additional sensors such as temperature, humidity, pressure, chemical, biomedical, radiation or other environmental sensors and networked sensors such a heart rate or other biometric monitoring and or security sensor on a shipped pet or other livestock or worn by an assigned package courier and/or delivery personnel may be organized into additional module stacks. These modules and module stacks may be recognized locally and globally on all standalone and networked present technology devices, systems and networks and all present technology nodes and hubs.

2.1 Group Device Networking and Coordination

It may be appreciated that when two or more autonomous present technology enabled devices join or connect as a unified, federated, managed, or coordinated group over any combination of wired and wireless protocols and network topologies the module stack (MS) of each of the autonomous devices expands to include the module stacks of the other present technology devices, thus generating a single collective present technology grouped module stack (GMS) that is mirrored by each of the grouped devices.

In a GMS, the individual module stacks of each present technology device acknowledges and adopts the module stacks and all related components, systems and applications of the module stacks of all networked present technology devices in a networked present technology device group. The GMS may be a virtual embodiment of all remote module stacks and related components. Once a GMS has been generated, each individual device module stack then independently calculates the most efficient distribution of system priorities, tasks, and responsibilities for the collective group of devices. The device and/or devices with the fastest processing speed and/or largest onboard data storage are dynamically selected as primary or lead device or devices to ensure the most rapid updating, identification, verification and storage of data. The present technology device and or devices with the highest bandwidth available wired or wireless network uplink to the Internet or other Cloud Platform and with the largest power supply can be assigned as the uplink for the present technology device group. When more than one present technology device in a present technology device group shares similar wired or wireless networking characteristics and availability, the data networking may be assigned and shared by more than one device. A standard refresh rate can also be selected for the GMS based on the average networking speed across all grouped devices. A new lead present technology device can be automatically selected if the existing lead present technology device disconnects from the group. A battery powered package hub device with wide area networking capabilities assigned to an individual package may also serve as a scheduled (sometimes-on) wireless uplink to the Internet or other Cloud Platform for other networked packages although whenever available an present technology device or device group will select an always-on wired or wireless networked uplink to the Internet and/or other Cloud Platform as the primary networking hub.

A present technology device group may include both present technology enabled and non-present technology enabled networked devices. For example a present technology enabled package hub device may network with one or more non-present technology enabled devices with more limited operating and/or networking capabilities and not operating with the present technology such as other wireless networked packaging devices, mobile phones, PC's, vehicles or other wired or wireless networking hub. Without installing or downloading the present technology software, non-present technology enabled packaging devices may be limited to being identified as a package node where a package hub may receive and store data for scheduled upload to the Internet from a networked non-present technology enabled device with little or no real-time package identification, verification, peer-to-peer networking or other present technology functionality, or prioritization of networked data. For non-present technology enabled networking hubs such as a wired or wireless networking device, vehicle hot spot, or other wireless router, an present technology device may recognize and connect to the networking hub as a basic uplink to the Internet or other Cloud Platform for one or more networked present technology devices in a present technology device group, with all operating, processing and peer-to-peer networking functions managed by one or more present technology package hubs in the present technology device group.

3. Data:

All data collected and managed by each module can operate as an independent channel with all modules and data coordinated with other modules and can either be grouped with other module data and sent out collectively over a single wired or wireless network or broadcast independently via a unique data channel over multiple available networks. Using this model, a Low Power Network and/or Personal Area Network only device may communicate with a LAN or WAN only device by mesh networking with one or more Low Power, Personal, LAN and WAN enabled devices, hotspots and/or wireless routers, which relay the data stream to and from two or more present technology devices. Data sent or received by a present technology device may be assigned a priority level based on type of sensor alert or alerts, with higher priority level data being streamed or uploaded first. For example when a WAN enabled battery powered package hub with scheduled uploads receives a high priority alert from another networked device in a device group, the package hub, if capable may make an unscheduled data upload to the Internet and/or may transfer the high priority data via LAN to another networked wired or wireless uplink device for real-time data upload and/or streaming to the Internet or other Cloud Platform or based on settings and network availability, send an SMS text message alert or make a direct voice or audio-video call to one or more assigned remote monitoring devices and users.

The present technology, Smart Package System (SPS), can introduce a distributed plug-and-play (PnP) hardware and software model for package shipping, logistics and predictive analytics where functional capabilities are performed in both a local and a networked topology using local and remote hardware and software. Software within an embodiment of the present technology SPS, SPS Cloud Platform and all SPS enabled and/or networked devices (SPS Devices) are partitioned into sequentially, autonomous code, referred to herein as "Modules". Each Module may be configured to communicate with hardware and software of other SPS Modules. Collectively a set of Modules for a single SPS Device are referred to herein as the Device Module stack (DMS). When a group of SPS Devices network and collaborate as an SPS Device Group they form a Device Group Module Stack (GMS) that is reflected by each of the networked SPS Devices. Depending on the security settings set by one or more authorized user(s), user group and/or managed network, each module in a DMS and each DMS in a GMS may be turned on or off, disconnected or dynamically re-configured by one or more authorized user(s), SPS Device, Group, Network and/or Cloud Platform Manager(s) and or authorized Representatives of an authorized shipping, delivery or other company, organization, government agency or Group User of the Smart Package System (SPS).

New Modules may be plugged into a Device Module Stack (DMS) as embedded firmware and/or software, connected via a USB and/or other BUS, port or other wired network connection or wirelessly paired or networked with an SPS Device and Device Module Stack (DMS) via one or more wireless networks. Similarly, a Device Module Stack may be wired or wirelessly networked, plugged into and added to a Device Group Module Stack (GMS) and wired or wirelessly networked, plugged into and added to the Cloud Module Stack (CMS) and/or plugged into and added to the Cloud Module Stack (CMS) and networked with all authorized SPS Devices. All data collected and managed by each Module may operate as an independent channel with all Modules and data coordinated with other modules and can either be grouped with other module data and sent out collectively over a single wired or wireless network or broadcast independently via a unique data channel over multiple available networks. Using this model, a cellular only SPS Device can communicate with a WiFi only SPS Device either by mesh networking with one or more Cellular and WiFi enabled SPS Devices in an SPS Device Group generating an SPS Device Group Module Stack (GMS) and/or by two or more devices connecting via the SPS Cloud Platform where one device may connect with the SPS Cloud Platform directly via an onboard Cellular or other wired or wireless Wide Area Network or by networking with a wired or wireless router, hotspot or other Networking Hub and Uplink to the Internet and then generating an SPS Device Group Module Stack (GMS) remotely via the SPS Device Cloud Platform and universal Cloud Module Stack (CMS) which is then updated locally on each SPS Device connected with the SPS Cloud Platform and Cloud Module Stack (CMS).

An SPS Device or Device Group may be assigned by one or more authorized user(s), user group(s) or network manager(s) to operate independently of the SPS Cloud Platform and Cloud Module Stack (CMS). One or more SPS Device Modules may be authorized to only manage and store data locally on a Private SPS Device Module Stack (PDMS) and/or to generate a Private Device Group Module Stack (PGMS) with one or more other authorized SPS Devices in a Private SPS Device Group. An SPS Device or Device Group may also be assigned to share some Module data with the SPS Cloud Platform and Cloud Module Stack while privately encrypting and locally storing other Module data. An SPS Device may also network and stream Private Module Data directly to one or more authorized SPS Devices and Users via one or more wired or wireless networks.

An SPS Module may be assigned to one or more sensors and/or hardware and/or software components that perform similar tasks and/or gather a similar type of data for example all temperature and humidity sensors hardware and software may be assigned to a Module and all directional motion, orientation and acceleration sensors hardware and software such as accelerometers and gyroscopes may be assigned to another Module. Modules may include but are not limited to Location and Position, Networking and Communications, Power Management and Storage, Data Management and Storage, Data Processing and Analysis, Operations and Controls and sensor Modules such as Motion, Orientation and Acceleration, Altitude and Pressure, Temperature and Humidity, Biometrics, Illumination, Optics and Imaging and many more. New hardware and software Modules may be developed, authorized and plugged into the Smart Package System (SPS). All data collected by each Module is given a Module identification code in addition to the SPS Device MAC Address ID Code of the SPS Device in which the Module is embedded, attached or networked and plugged into the SPS Device Module Stack (DMS) and each sensor assigned to a Module is given an ID Code correlating to a Transducer Electronic Data Sheet (TEDS) enabling the specifications and accuracy of each sensor and data collected by each sensor to be processed, analyzed and compared with other identical, similar and/or related sensors in a single Device Module (Module), a Device Module Stack (DMS), a Device Group Module Stack (GMS) and/or the Cloud Module Stack (CMS).

3.1 Scheduled Data Networking

When one or more battery powered Package Hub Devices with Wide Area Networking capabilities are the only available Uplinks to the Internet, a Package Hub Device may select to only receive and store data from its assigned package and/or surrounding networked Package Nodes and/or other SPS or non SPS enabled Devices in an SPS Device Group and upload data wirelessly via a Wide Area Network only at scheduled intervals to conserve power. If a Package Hub has limited remaining onboard memory and data storage capabilities, it may select to receive data from surrounding networked devices at scheduled intervals and directly transfer data wirelessly to another Package Hub or a Communication Hub via a Local Area Network (LAN) for storage and scheduled upload and/or a direct Uplink to the Internet and/or SPS Cloud Platform.

Data Networking may be scheduled based on pre-set or pre-programmed time intervals, may be dynamically scheduled based on available power and networks or scheduled based on real-time contextual variables such as when an SPS Device recognizes that it is on an airplane and in flight based on networked data from the airplane and/or SPS Device location and sensor data such as GPS, motion and altitude, the SPS Device may schedule peer-to-peer data networking and uploads to the Internet at longer time increments to save power.

3.2 Shipping and Logistics

Modern shipping and logistics systems rely heavily on predictive analytics, the use of data and statistical algorithms and machine learning techniques to identify and quantify the likelihood of future outcomes. Existing shipping and logistics systems often incorporate predictive analytics to collect and analyze data from past events to identify patterns and calculate which processes led to the most effective results for example studying traffic patterns to identify which roads are busiest at what times and the locations where the most accidents occur to calculate the most efficient delivery routes for each major city and neighborhood and the average amount of time it will take to deliver a package to an office building versus a residential home in order to predict the most likely delivery time for each package. The issue with existing predictive analytics in package shipping and logistic platforms is that it they are more predictive then real-time solutions. Although they may incorporate real-time GPS tracking data from a shipping company's delivery truck and vehicle fleets, many do not include any real-time sensor data from individual packages and are not capable of incorporating real-time actions, tasks, transactions and other firmware, software and manual programs and applications to prevent packages and package contents from being damaged, lost or stolen and other methods of improving the package management, handling, shipping and delivery process in real-time.

In addition to expanding predictive analytics to include real-time sensor data received from all networked packages, packaging materials, package and package content tracking and monitoring devices and other networked computing devices, people, pets and livestock, food and perishables, products, vehicles and other objects, organisms, materials and systems, the present technology SPS introduces a dynamic response system to real-time sensor data. The SPS Dynamic Response System (DRS) introduces a Plug and Play (PnP) software application model in which networked hardware and software applications may be developed and plugged into the SPS Cloud Platform and SPS Cloud Module Stack (CMS) and assigned to an individual Device Module, a Device Module Stack (DMS), a Device Group Module Stack (GMS), an assigned Module or Modules across a specified product line, network and/or other device group or an assigned module or modules across all networked SPS Devices and Device Groups or the complete SPS Cloud Module Stack (CMS) across all SPS Modules, Devices, Device Groups and the Cloud Platform.

An example of a DRS firmware and software application plugged into a single module across all networked devices is a Temperature and Humidity Alert System. In the event that one or more networked SPS Devices monitors a steep rise or drop in temperature and/or humidity from one or more embedded, attached or networked temperature and humidity sensors plugged in to one or more SPS Device's Temperature and Humidity Module, Device Module Stack (DMS) or Device Group Module Stack (GMS), the DRS Temperature and Humidity Alert System Application running locally on one or more independent or networked SPS Devices, Device Groups or globally on the SPS Cloud Platform, may be programed to identify and calculate the real-time temperature and humidity sensor measurements received from all networked SPS devices within a specified distance and/or geographic area surrounding the SPS Device or Devices that initially reported the significant change in temperature and/ or humidity using GPS and/or other real-time location and relational positioning data received from the Location and Positioning Module of all networked SPS Devices within the defined area. The Temperature and Humidity DSR Application may then automatically perform one or more automated or user authorized tasks to respond to the temperature and humidity event in real-time, at scheduled intervals or in coordination with the Module Sensor Data such as networking with SPS enabled networked transport vehicle or storage facility temperature control system to alter and/or maintain a specified or dynamically optimized temperature for all networked SPS packages, packaging systems and package contents in an assigned container, compartment, cabin, vehicle, facility or other specified area.

Other DSR Applications may incorporate multiple Modules such as real-time audio-video capture and streaming from a single SPS Device, SPS Device Group and/or the SPS Cloud Platform utilizing one or more operating, networking and control Modules activated by one or more Sensor Modules such as location and position, motion, orientation, shock, package tampering, altitude and pressure, temperature and humidity or other sensor module and related DSR application and response systems.

Based on real-time collected, processed and analyzed data the Temperature and Humidity Alert System, Motion, Orientation and Acceleration Alert System, Altitude and Pressure Alert System, Shock and Tampering Alert System, Audio-Video Networking, Communications, Verification and Alert System, Biometrics Monitoring and Alert System and other PnP firmware and software application may activate one or more pre-programmed processes, tasks and/or actions that may be taken automatically or with User Authorization to further identify, resolve or improve the situation and/or to alert one or more authorized Users and systems of the monitored event, package, package contents, device, device group, vehicle, network, platform or other system status.

In the event that a single SPS Device or SPS Device Group of networked devices in close proximity has more than one temperature and humidity sensor measuring both the inside and outside of one or more assigned packages and the temperature and humidity sensors monitoring the inside of one of the packages and package contents registers a much higher temperature than the embedded, attached or networked temperature and humidity sensors monitoring the outside of the package and/or surrounding packages, the Temperature and Humidity Application may be authorized to automatically contact one or more Users such as the sending and receiving parties, the shipping company and/or the driver or courier who is transporting and/or delivering the package. Should the Device Module Stack (DMS) or Device Group Module Stack (GMS) of the identified package and/or surrounding packages may also include fire, smoke, chemical, biohazard, radiation and/or other emergency sensors, monitoring systems and corresponding Modules with higher and response settings. In the event that a sensor Module with a higher priority setting is also alerted to a rapid change in monitored package, package contents or surrounding packages and/or environmental levels, the Module and corresponding DSR Application and response system assigned to the higher priority Module may take precedence over the temperature and humidity sensor Module and corresponding Temperature and Humidity DSR application and response system tasks and protocols.

An example of DSR application and response tasks and actions may include but are not limited to direct networking with a vehicle or storage facility heating and cooling system to manage, set and maintain the optimum cabin or facility temperature for all networked packages contained and or stored in the vehicle or facility or an assigned section of a vehicle or facility or may include activating a fire safety system such as an alarm, cabin pressurization, chemical retardant, sprinkler system or other fire prevention system plugged in the SPS Device Module Stack (DMS), Device Group Module Stack and/or SPS Cloud Module Stack. Some DSR applications pre-programmed or real-time tasks and actions may require one or more User Authorizations or depending on the level of priority, may be automatically performed by an SPS Device, SPS Device Group and/or the SPS Cloud Platform. Different priority levels and authorization may be assigned to individual Modules, Module Stacks, Users and other SPS Device, Device Group and Cloud Platform systems, processes applications, events, tasks and operations.

3.3 Routing and Re-Routing

In the event that a package is sent by a sending party to a receiving party at a specified address and the address is incorrect or has changed because the receiving party is in a different location, there are currently limited options for re-routing a package while en route. This also includes packages that are misplaced, delivered to the wrong address or the sending or receiving party cancels delivery while the package is en route and packages are simply returned to the sender at the initially specified address or returned to the shipping center nearest to the sending party's address for pickup. Until now there have limited processes, systems, firmware and software applications in place that enable shipping and delivery companies and couriers to automatically redirect and re-route packages during the shipping and/or delivery process by enabling packages to route and re-route themselves and automatically update and re-direct the shipping company, personnel and/or courier with the updated shipping and delivery information and automatically calculate the updated shipping route, scheduled delivery time, address, location and cost and if required, charge the sending and/or receiving party in real-time or upon delivery.

The present technology SPS enables packages to automatically update the shipping, routing and delivery information for each package in real-time on the SPS package and/or embedded, attached or networked SPS packaging device, materials or other SPS package computing and/or networking system (SPS Device), updated on the SPS Cloud Platform, networked to the delivery vehicle and alerting the delivery personnel and courier or couriers in real time with the updated package shipping and delivery information.

4. Networks:

The present technology may combine the methods and capabilities of multiple routing protocols and network topologies for Mobile ad hoc and Mesh Networking (MANET) such as reactive and proactive (Hybrid) routing, Hierarchical Routing, Temporally-ordered Routing Algorithm (TORA), Geographical Routing (Geocasting), Power-aware and Multicast Routing, Dynamic Source Routing (DSR) and Concurrent Multi-path Routing (CMR) into one dynamic scalable, platform and peer-to-peer device network. Standard Low Power Networks, Personal Area Networks such as Bluetooth and Peer-to-Peer networks such as WiFi P2P may be used across all present technology devices. When new wired and wireless networks and communications protocols are introduced, they may also be adopted across all SPS devices and systems. Wide Area Networks may be assigned for individual devices based on the wireless networking capabilities, requirements and/or applications of a single device or an entire product line or may be assigned based on one or more selected wireless carriers based on price, network bandwidth, availability, scalability and other variables.

4.1 Data Channeling and Network Selection

An SPS device hub or device group may select the optimum network and/or communications method to send, receive, stream, communicate, transfer, share and/or upload data via one or more wired or wireless networks based on network availability, bandwidth and signal strength, available power and power use schedule, available memory and RAM, number of networked devices, data type and size, data priority, functionality and applications and other variables. For example if an SPS device with an onboard video camera is assigned to a package that is dropped or opened causing an alert event that requires audio-video capture and either a direct wireless video call with one or more pre-assigned devices and users or live video streaming to the Internet or other Cloud Platform for real-time viewing by one or more authorized users, the SPS device or device group may select to stream the audio-video feed over LAN because a communications hub such as a vehicle hotspot and always-on uplink to the Internet is available and networked with the SPS device or device group requiring lower power and processing. Should the SPS device not be connected with an external communications hub the device may select to stream the audio-video data to the Internet or other Cloud Platform over its own cellular WAN uplink requiring less power and processing than a direct cellular call. If the assigned internet hub is not available, the SPS device may make a direct cellular voice or video call to one or more authorized phones and users.

When multiple networks are available and/or multiple data streams received from one or more networked devices, an SPS device hub may select to channel different streams of data over one or more networks based on data type for example if a SPS device hub is receiving basic package identification and low bandwidth sensor data such as location, time and date, temperature, humidity, altitude and other data that may be streamed as an alphanumeric code, the SPS device may group all low bandwidth data received from all networked devices and streamed over a low power network or LAN. Should the alerts from one of the networked packages be assigned a higher priority or require a higher bandwidth network such as audio-video streaming and/or voice and video communications, it may be channeled and streamed over a Wide Area Network.

5. User:

An authorized Smart Package System (SPS) Sender, Receiver, Courier and other Authorized User, User Group, Device, Device Group, Network and/or Cloud Platform Manager and/or an Authorized Representative of a Shipping, Delivery or other Company, Organization or Government Agency may make varying levels of programming, functionality, customization, alteration and systems control of an SPS Device, Device Group, Network and/or Cloud Platform and related Modules, Device Module Stacks (DMS), Device Group Module Stacks (GMS) and the Cloud Module Stack (CMS) and select their preferences for SPS Dynamic Response System available Hardware and Software Applications and preferences for systems control, power and data management, device and sensor monitoring, analysis, alerts and responses, access and security, channeling, networking, communications, payments and transactions and other processes, tasks, programs, applications, products, people, devices, vehicles, networks, systems and services.

6. Security:

The present technology SPS may operate as a custom Blockchain system and network with all transactions recorded in an open distribution ledger that records all alerts, transactions and communications and is verified individually by all SPS devices, collectively by all SPS device groups and globally on the SPS cloud platform.

5.1 Data Encryption and Network Security

Each SPS device may be assigned one or more random key encryption codes with each key including a public key to be shared on a global SPS directory and a private key stored on the SPS device for signing, encrypting and decrypting all alerts, transactions and communications performed by each individual SPS device, SPS device group and the SPS cloud platform and logged on each SPS device ledger, verified by an SPS device group ledger and/or the global SPS cloud platform ledger. A SPS device group ledger may be a collective ledger generated by two or more networked SPS devices and stored on all networked SPS devices in a SPS device group. In addition to signing records, key encryption may also be used to encrypt stored and networked data and real-time voice, data and audio-video communications. All Records may be time stamped and signed by each SPS device, SPS device group and/or the SPS cloud platform. Records may also be location stamped and/or stamped with other unique local SPS device sensor data for one or more additional layers of identification.

5.2 User Identification, Authorization & Biometrics

Specific transactions such as a package delivery may require additional layers of verification such as courier and receiver identification which may be acquired by imputing a passcode onto a touchpad or touchscreen enabled SPS package hub device or a user's networked SPS device such as an authorized mobile phone, tablet, laptop or other networked computing device with SPS embedded software or downloadable software application. A transaction may require one or more user verification methods, other verification methods include but are not limited to biometric identification such as fingerprint, voice, eye and facial recognition. A transaction may also require real-time video verification in the form of a video call between two or more SPS enabled devices and two or more authorized members of a package's sending and receiving party. In a scenario where the sending and/or receiving party is a company, the representative of the sending and/or receiving party may need to input a pre-assigned company and/or employee identification code in addition to user verification in the form of a user passcode and/or biometric identification.

An Authorized User, User Group, Manager or Authorized Representative may be assigned varying levels of authorization and control over an individual SPS Device, Device Group, Network and/or SPS Cloud Platform and related Modules, Module Stacks and SPS firmware and software applications. Certain Authorized Users or User Groups such as couriers and shipping personnel may be assigned differing levels of access and control of an SPS Device, Device Group, Network and/or Cloud Platform Modules, Module Stacks, hardware and software systems and applications based on their assigned tasks and responsibilities. A User such as a Package Sending and/or Receiving Party may also be required to perform pre-assigned tasks and transactions such as User Identification and real-time Video Verification and/or may be authorized and assigned differing levels of security access and control based on their requested services, tasks and transactions and other variables.

User Authorization may be assigned based on User type, number of devices, device group, network and or platform responsibilities, company authorization level, management level and security level and/or based on SPS Device, Device group, Network and/or SPS Cloud Platform Modules, Module Stacks, applications, transactions and/or other hardware and software programs, tasks, alerts, controls and systems security protocols. Some changes to one or more devices, modules, platforms, networks, applications and systems settings and controls may require more than one method of User Authorization, Identification and/or Verification and/or may require two or more Authorized Users, User Groups, Managers, and/or Representatives to authorize and process.

The flowchart and/or block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, is configured or configurable to be implemented by special purpose hardware-based systems that perform the specified functions or acts, or combinations of special purpose hardware and computer instructions.

While embodiments of the present technology have been described in detail, it should be apparent that modifications and variations thereto are possible, all of which fall within the true spirit and scope of the present technology. With respect to the above description then, it is to be realized that the optimum dimensional relationships for the parts of the present technology, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present technology. For example, any suitable sturdy material may be used instead of the above-described. And although shipping packages have been described, it should be appreciated that the present technology herein described is also suitable for use with any container, receptacle, bottle, vehicle or transportable vessel.

Therefore, the foregoing is considered as illustrative only of the principles of the present technology. Further, since numerous modifications and changes will readily occur to those skilled in the art, it is not desired to limit the present technology to the exact construction and operation shown and described, and accordingly, all suitable modifications and equivalents may be resorted to, falling within the scope of the present technology.

What is claimed as being new and desired to be protected by Letters Patent of the United States is as follows:

1. A shipping package comprising:
   an enclosure for receiving content within;
   a closure for sealing the enclosure;
   a label comprising shipping information;
   a network module configured or configurable for transmitting a shipping status message to an external device;
   a sensor module configured or configurable for providing location information to the network module; wherein the sensor module comprises a light detector, and the shipping status message comprise an alert indicating that light has entered the enclosure; and
   a battery module configured or configurable for providing power to the network module and the sensor module.

2. The shipping package of claim 1, wherein the sensor module comprises a global positioning system (GPS), and the shipping status message comprise a location of the shipping package.

3. The shipping package of claim 1 further comprising a memory module coupled to the network module, the battery module and the sensor module, wherein the sensor module comprises a light detector, and the shipping status message comprise an alert indicating that light entering the enclosure had exceeded a predefined threshold.

4. The shipping package of claim 1, wherein the enclosure comprises a first conductive element and the closure comprises a second conductive element, the first conductive element and the second conductive element forming an electrical circuit when the closure is disposed to seal the enclosure, the sensor module is configured or configurable to detect breaking of a portion of the electrical circuit during transit being, the shipping status message further comprising an alert indicating that electric circuit has been damaged.

5. The shipping package of claim 1, wherein the battery module is initially in a disabled state, the battery module is configured or configurable to enter an enabled state when the enclosure is sealed with the closure, the battery module providing power to the network module and the sensor module.

6. The shipping package of claim 1, wherein the sensor module comprises a camera module, the camera module is configured or configurable to be activated when the enclosure is opened.

7. The shipping package of claim 6, wherein the camera module comprises a still camera.

8. The shipping package of claim 6, wherein the camera module comprises a video camera.

9. A shipping package comprising:
   an enclosure for receiving content within;
   a closure for sealing the enclosure;
   a label comprising shipping information;
   a network module configured or configurable for transmitting a shipping status message to an external device;
   a sensor module configured or configurable for providing location information to the network module; wherein the enclosure comprises a conductive element, the sensor module being configured or configurable to detect breaking of a portion of the conductive element during transit, the shipping status message comprising an alert indicating that the enclosure has been damaged; and
   a battery module configured or configurable for providing power to the network module and the sensor module.

10. The shipping package of claim 9, wherein the closure comprises a second conductive element, the sensor module is configured or configurable to detect a portion of the second conductive element during transit, the shipping status message further comprising an alert indicating that the enclosure has been damaged.

11. The shipping package of claim 10, wherein the label comprises a third conductive element and the electrical circuit further comprises the third conductive element when the label is fixed to the shipping package.

12. A shipping package comprising:
an enclosure for receiving content within;
a closure for sealing the enclosure;
a label comprising shipping information;
a network module configured or configurable for transmitting a shipping status message to an external device;
a sensor module configured or configurable for providing location information to the network module;
a battery module configured or configurable for providing power to the network module and the sensor module; and
a memory module coupled to the network module, the battery module and the sensor module, wherein the memory module is configured or configurable with a level of service, and
wherein the sensor module is configured or configurable to detect when the level of service is broken, and the shipping status message comprise an alert indicating that the level of service has been broken.

13. The shipping package of claim 12, wherein the sensor module comprises a motion detector, and the level of service comprises a maximum motion associated with the shipping package.

14. A shipping package comprising:
an enclosure for receiving content within;
a closure for sealing the enclosure;
a label comprising shipping information;
a network module configured or configurable for transmitting a shipping status message to an external device;
a sensor module configured or configurable for providing location information to the network module;
a battery module configured or configurable for providing power to the network module and the sensor module; and
and a memory module coupled to the network module, the battery module and the sensor module, wherein the memory module is configured or configurable with a shipping route, the sensor module comprising a GPS and is configured or configurable of detecting when a traveled route of the shipping package deviates from the shipping route, and the shipping status message comprise an alert indicating that the shipping package is not following the shipping route.

15. The shipping package of claim 14, wherein the shipping route comprises a destination, and when an end point of the traveled route varies from the destination, the shipping status message further comprising an alert indicating that the shipping package has been delivered to a wrong destination.

16. A shipping package comprising:
an enclosure for receiving content within;
a closure for sealing the enclosure;
a label comprising shipping information; wherein the label comprises a user interface, the user interface being configured or configurable of accepting an input, the input comprising a delivery indication or a payment;
a network module configured or configurable for transmitting a shipping status message to an external device;
a sensor module configured or configurable for providing location information to the network module; and
a battery module configured or configurable for providing power to the network module and the sensor module.

17. The shipping package of claim 16, wherein the user interface further comprises a display to provide information to a human observer.

18. The shipping package of claim 16, wherein the user interface further comprises a biometric sensor configured or configurable for authenticating a receiver of the shipping package.

* * * * *